US008842198B2

(12) United States Patent
Sekiya et al.

(10) Patent No.: US 8,842,198 B2

(45) Date of Patent: Sep. 23, 2014

(54) AUDIO SIGNAL PROCESSING DEVICE, AUDIO SIGNAL PROCESSING METHOD, AND PROGRAM

(75) Inventors: Toshiyuki Sekiya, Kanagawa (JP); Keiichi Osako, Tokyo (JP); Mototsugu Abe, Kanagawa (JP)

(73) Assignee: Sony Corporation, Tokyo (JP)

( * ) Notice: Subject to any disclaimer, the term of this patent is extended or adjusted under 35 U.S.C. 154(b) by 370 days.

(21) Appl. No.: 13/330,272

(22) Filed: Dec. 19, 2011

(65) Prior Publication Data

US 2012/0162471 A1 Jun. 28, 2012

(30) Foreign Application Priority Data

Dec. 28, 2010 (JP) ............................... P2010-293305

(51) Int. Cl.
*H04N 5/76* (2006.01)
*G10L 21/0208* (2013.01)
*G10L 21/0232* (2013.01)

(52) U.S. Cl.
CPC ......... *G10L 21/0208* (2013.01); *G10L 21/0232* (2013.01)
USPC ....................................................... 348/231.4

(58) Field of Classification Search
CPC ........................ G10L 21/0208; G10L 21/0232
USPC ....................................................... 348/231.4
See application file for complete search history.

(56) References Cited

U.S. PATENT DOCUMENTS

| | | | | |
|---|---|---|---|---|
| 2005/0063553 | A1 * | 3/2005 | Ozawa | 381/92 |
| 2005/0213778 | A1 * | 9/2005 | Buck et al. | 381/94.3 |
| 2005/0238183 | A1 * | 10/2005 | Ozawa | 381/94.1 |
| 2006/0132624 | A1 * | 6/2006 | Yuyama | 348/241 |
| 2006/0176546 | A1 * | 8/2006 | Wakui | 359/337 |
| 2006/0265218 | A1 * | 11/2006 | Samadani | 704/233 |
| 2007/0058822 | A1 * | 3/2007 | Ozawa | 381/94.1 |
| 2008/0317261 | A1 * | 12/2008 | Yoshida et al. | 381/94.1 |
| 2011/0032390 | A1 * | 2/2011 | Lee et al. | 348/240.99 |
| 2011/0063461 | A1 * | 3/2011 | Masuda | 348/208.11 |
| 2011/0096206 | A1 * | 4/2011 | Okazaki | 348/241 |
| 2012/0154610 | A1 * | 6/2012 | Rahbar et al. | 348/207.99 |

FOREIGN PATENT DOCUMENTS

| | | |
|---|---|---|
| JP | 2006-279185 | 10/2006 |
| JP | 2009-276528 | 11/2009 |

* cited by examiner

*Primary Examiner* — James Hannett
(74) *Attorney, Agent, or Firm* — Sherr & Jiang, PLLC

(57) ABSTRACT

An audio signal processing device includes a first microphone configured to pick up audio and output a first audio signal; a second microphone configured to pick up the audio and output a second audio signal; a first frequency converter configured to convert the first audio signal to a first audio spectrum signal; a second frequency converter configured to convert the second audio signal to a second audio spectrum signal; an operating sound estimating unit configured to estimate, based on the correlation between a sound emitting member that emits an operating sound and the first and second microphones, an operating sound spectrum signal indicating the operating sound, by calculating the first and second audio spectrum signals; and an operating sound reducing unit configured to reduce the estimated operating sound spectrum signal from the first and second audio spectrum signals.

13 Claims, 41 Drawing Sheets

——— AVERAGE SPECTRUM DURING MOTOR OPERATION
----- AVERAGE SPECTRUM WHILE MOTOR OPERATION IS STOPPED

POWER
ORIGINAL MECHANICAL SOUND SPECTRUM
Zreal
FREQUENCY
DESIRED SPECTRUM
W1
SPECTRUM INCLUDING MECHANICAL SOUND
X1

ORIGINAL MECHANICAL SOUND SPECTRUM
W2
X2

AUDIO SIGNAL PROCESSING DEVICE, AUDIO SIGNAL PROCESSING METHOD, AND PROGRAM

BACKGROUND

The present disclosure relates to an audio signal processing device, audio signal processing method, and program.

A device having a moving image imaging function such as with a digital camera, video camera, or the like, picks up audio in the device periphery (external audio) with a microphone while imaging a moving picture, and records the audio together with the moving picture. During imaging of the moving picture, in accordance with imaging operations of zooming operations and auto-focus operations and the like, a mechanical sound is emitted from a driving device (zoom motor, focus motor, and the like) that drives the imaging optical system. The mechanical sound mixes in to the external audio that the user desires, as noise, and is recorded together. Accordingly, with the device having a moving picture imaging function with audio, it is desirable for the mechanical sound accompanying the zooming operations and the like during moving picture imaging (zoom noise and the like) to be appropriately reduced, and only the external audio desired by the user to be recorded.

With Japanese Unexamined Patent Application Publication No. 2006-279185 for example, the mechanical sound spectrum of the motor sound accompanying the zooming operation is actually measured, and stored beforehand in a storage unit as a template, and during zooming operations, the template of the mechanical sound spectrum is subtracted from the spectrum of the input audio, thereby reducing the zooming sound. Also, in Japanese Unexamined Patent Application Publication No. 2009-276528, a proposal has been made to use a microphone for noise to record primarily mechanical noise, besides the microphone for recording external audio, thereby reducing the mechanical sound.

SUMMARY

However, there are differences in driving devices such as the zoom motor or the like, and imaging devices wherein the driving device is installed, so there are differences from one device to another with regard to the mechanical sounds such as motor sound or the like. Further, even within the same device, changes in mechanical sound can occur with each operation of the driving device.

Accordingly, with a method to use a fixed mechanical sound spectrum template to uniformly reduce the mechanical sound, differences in mechanical sound according to individual devices and changes in mechanical sound according to each operation of the driving device are not handleable. For example, in the case of using an average type of mechanical spectrum template that measures several tens of cameras, the differences in mechanical sound of the individual devices are not handleable, so sufficient mechanical sound reduction effects is unobtainable with individual cameras. On the other hand, in the case of using the mechanical sound spectrum template to individually adjust all of the cameras, the adjustment cost will increase significantly and accordingly is unrealistic.

Also, with a method of separately installing a noise microphone besides the audio recording microphone, as disclosed in Japanese Unexamined Patent Application Publication No. 2009-276528, a noise microphone has to be disposed at an appropriate location within the casing. However, in digital cameras of which miniaturization is advancing, disposing a noise microphone at a appropriate location is difficult, and the mechanical noise is not sufficiently reduced.

It has been found to be desirable to adequately reduce operating sound which mixes into the external audio together with the operation of a sound emitting member such as a driving device or the like during recording, without measuring the mechanical sound spectrum beforehand.

According to an embodiment of the present disclosure, an audio signal processing device is provided, which includes a first microphone configured to pick up audio and output a first audio signal $x_L$; a second microphone configured to pick up the audio and output a second audio signal $x_R$; a first frequency converter configured to convert the first audio signal $x_L$ to a first audio spectrum signal $X_L$; a second frequency converter configured to convert the second audio signal $x_R$ to a second audio spectrum signal $X_R$; an operating sound estimating unit configured to estimate, based on the correlation between a sound emitting member that emits an operating sound and the first and second microphones, an operating sound spectrum signal Z indicating the operating sound, by calculating the first and second audio spectrum signals $X_L$ and $X_R$; and an operating sound reducing unit configured to reduce the estimated operating sound spectrum signal Z from the first and second audio spectrum signals $X_L$ and $X_R$.

The sound emitting member may be a driving device; the operating sound may be a mechanical sound emitted at the time of operation of the driving device; and the operating sound estimating unit may estimate a mechanical sound spectrum signal Z that indicates the mechanical sound as the operating sound spectrum signal.

The operating sound estimating unit may calculate the first and second audio spectrum signals so as to attenuate audio components arriving to the first and second microphones from a direction other than the driving device, thereby dynamically estimating the mechanical sound spectrum signal Z during operation of the driving device.

The audio signal processing device may further include a mechanical sound correcting unit configured to correct the estimated mechanical sound spectrum signal Z for each frequency component of the first or second audio spectrum signals $X_L$ and $X_R$, based on the difference dX in frequency features of the first or second audio spectrum signals $X_L$ and $X_R$ before and after the start of operation of the driving device.

The mechanical sound correcting unit may include a first mechanical sound correcting unit configured to calculate a first correcting coefficient $H_L$ for each frequency component of the first audio spectrum signal $X_L$, based on the difference $dX_L$ in frequency features of the first audio spectrum signal $X_L$ before and after the start of operation of the driving device and a second mechanical sound correcting unit configured to calculate a second correcting coefficient $H_R$ for each frequency component of the second audio spectrum signal $X_R$, based on the difference $dX_R$ in frequency features of the second audio spectrum signal $X_R$ before and after the start of operation of the driving device; and the operating sound reducing unit may include a first mechanical sound reducing unit configured to reduce a signal wherein the estimated mechanical sound spectrum signal Z is multiplied by the first correcting coefficient $H_L$, from the first audio spectrum signal $X_L$ and a second mechanical sound reducing unit configured to reduce a signal wherein the estimated mechanical sound spectrum signal Z is multiplied by the second correcting coefficient $H_R$, from the second audio spectrum signal $X_R$.

The mechanical sound correcting unit may update a correcting coefficient H for correcting the estimated mechanical sound spectrum signals Z, based on the difference dX in frequency features of the first or second audio spectrum signals $X_L$ and $X_R$ before and after the start of operation of the driving device, each time the driving device is operating.

When the driving device is operating, degree of change of the external audio before and after the start of operation of the driving device may be determined, based on comparison results of the frequency features of the first or second audio spectrum signals $X_L$ and $X_R$ before and after the start of operation of the driving device, and comparison results of the frequency features of the first or second audio spectrum signals $X_L$ and $X_R$ during the operation of the driving device; with determination being made as to whether or not to update the correcting coefficient H, according to the degree of change of the external audio; and the correcting coefficient H being updated based on the difference dX, only in a case of determining to update the correcting coefficient H.

The mechanical sound correcting unit may control the update amount of the correcting coefficient H based on the difference dX, according to the level of the first or second audio signal $x_L$, and $x_R$ or the level of the audio spectrum signal $X_L$ and $X_R$, when the driving device is operating.

The audio signal processing device may further include a storage unit configured to store the average mechanical sound spectrum signal Tz that indicates an average-type of spectrum of the mechanical sound and a mechanical sound selecting unit configured to select one or the other of the estimated mechanical sound spectrum signal Z or the average mechanical sound spectrum signal Tz, according to the sound source environment in the periphery of the audio signal processing device; with the operating sound reducing unit reducing the mechanical sound spectrum signal selected by the mechanical sound selecting unit from the first and second audio spectrum signals $X_L$ and $X_R$.

The mechanical sound selecting unit may calculate a feature amount indicating the sound source environment of the periphery of the audio signal processing device, based on the level of the first or second audio signals $x_L$, and $x_R$, and selects one or the other of the estimated mechanical sound spectrum signal Z or the average mechanical sound spectrum signal Tz.

The mechanical sound selecting unit may calculate a feature amount indicating the sound source environment of the periphery of the audio signal processing device, based on the correlation of the first audio spectrum signal $X_L$ and the second audio spectrum signal $X_R$, and select one or the other of the estimated mechanical sound spectrum signal Z or the average mechanical sound spectrum signal Tz, based on the feature amount.

The mechanical sound selecting unit may calculate a feature amount indicating the sound source environment of the periphery of the audio signal processing device, based on the level of the estimated mechanical sound spectrum signal Z, and select one or the other of the estimated mechanical sound spectrum signal Z or the average mechanical sound spectrum signal Tz, based on the feature amount.

The audio signal processing device may be provided to an imaging device having a function to record the external audio together with a moving picture during imaging of the moving picture; and the driving device may be a motor that is provided within a housing of the imaging device, and mechanically moves an imaging optical system of the imaging device.

According to another embodiment of the present disclosure, an audio signal processing method includes converting a first audio signal $x_L$, output from a first microphone configured to pick up audio into a first audio spectrum signal $X_L$ and converting a second audio signal $x_R$ output from a second microphone configured to pick up the audio into a second audio spectrum signal $X_R$; estimating an operating sound spectrum signal that indicates the operating sound, by calculating the first and second audio spectrum signals $X_L$ and $X_R$, based on the relative position of a sound emitting member that emits an operating sound and the first and second microphones; and reducing the estimated operating sound spectrum signal Z from the first and second audio spectrum signals $X_L$ and $X_R$.

According to another embodiment of the present disclosure, a program is provided, which causes a computer to execute: converting of a first audio signal $x_L$, output from a first microphone configured to pick up audio into a first audio spectrum signal $X_L$ and converting a second audio signal $x_R$ output from a second microphone configured to pick up the audio into a second audio spectrum signal $X_R$; estimating of an operating sound spectrum signal that indicates the operating sound, by calculating the first and second audio spectrum signals $X_L$ and $X_R$, based on the relative position of a sound emitting member that emits an operating sound and the first and second microphones; and reducing of the estimated operating sound spectrum signal Z from the first and second audio spectrum signals $X_L$ and $X_R$. Also provided is a computer-readable storage medium in which in the program is stored.

According to the above-described configuration, the relative position of multiple microphones for recording external audio and the sound emitting member such as a driving device or the like, which is the sound emitting source of the mechanical sound, is used to adequately calculate a two-system audio spectrum signal obtained from multiple microphones. Thus, an operating sound such as the mechanical sound that mixes in with the external audio in accordance with operations by the sound emitting member, can be dynamically estimated at the time of recording. Accordingly, the operating sound can be accurately estimated, and reduced, at the actual time of recording, for each individual device and each operation, without using an operating sound spectrum template measured beforehand.

As described above, according to the present disclosure, operating sound that mixes into external audio in accordance with operations by a sound emitting member such as a driving device or the like at time of recording can be adequately reduced, without measuring the mechanical sound spectrum beforehand.

DETAILED DESCRIPTION OF EMBODIMENTS

Figure 1:
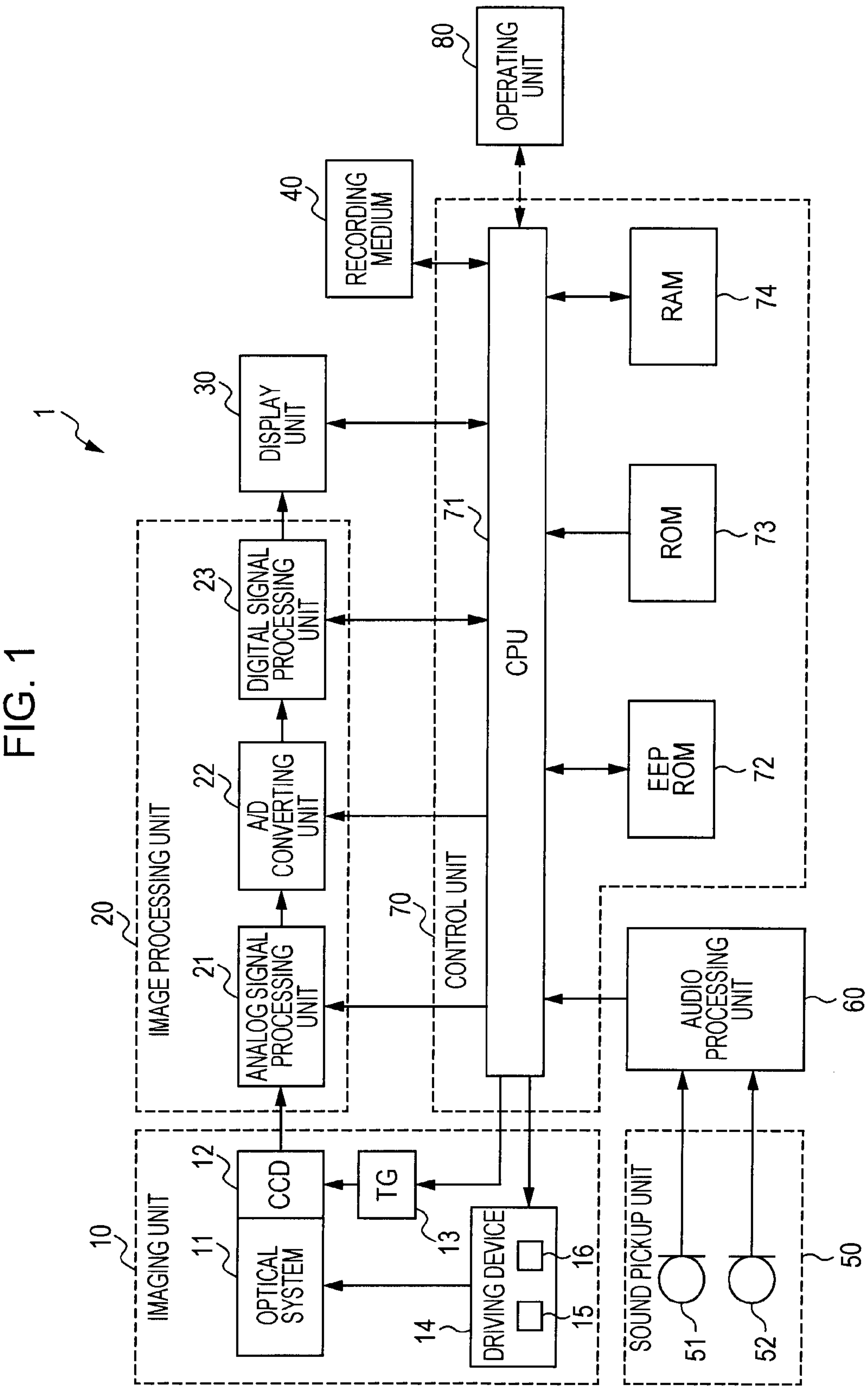
FIG. 1 is a block diagram illustrating a hardware configuration of a digital camera to which an audio signal processing device according to an embodiment of the present disclosure has been applied.

Preferred embodiments of the present disclosure will be described in detail with reference to the appended diagrams. Note that in the present Specification and diagrams, the same reference numerals will be appended to components having substantially the same functional configuration, thereby omitting duplicate descriptions.

Descriptions will be performed in the following order.

1. First Embodiment
   - 1.1. Overview of Mechanical Sound Reduction Method
   - 1.2. Configuration of Audio Signal Processing Device
     - 1.2.1. Hardware Configuration of Audio Signal Processing Device
     - 1.2.2. Functional Configuration of Audio Signal Processing Device
   - 1.3. Details of Mechanical Sound Estimating Unit
     - 1.3.1. Configuration of Mechanical Sound Estimating Unit
     - 1.3.2. Principle of Mechanical Sound Spectrum Estimating 1.3.3. Operations of Mechanical Sound Spectrum Estimating
1.4. Details of Mechanical Sound Correcting Unit
1.4.1. Configuration of Mechanical Sound Correcting Unit
1.4.2. Concept of Mechanical Sound Correcting
1.4.3. Basic Operations of Mechanical Sound Correcting
1.4.4. Detailed Operations of Mechanical Sound Correcting
1.5. Details of Mechanical Sound Reducing Unit
1.5.1. Configuration of Mechanical Sound Reducing Unit
1.5.2. Operations of Mechanical Sound Reducing Unit
2. Second Embodiment
2.1. Concept of Mechanical Sound Correcting
2.2. Operations of Mechanical Sound Correcting
3. Third Embodiment
3.1. Concept of Mechanical Sound Correcting
3.2. Operations of Mechanical Sound Correcting
4. Fourth Embodiment
4.1. Overview of Mechanical Sound Reducing Method
4.2. Functional Configuration of Audio Signal Processing Device
4.3. Details of Mechanical Sound Correcting Unit
4.3.1. Configuration of Mechanical Sound Selecting
4.3.2. Basic Operations of Mechanical Sound Selecting
4.3.3. Detailed Operations of Mechanical Sound Selecting Unit
4.4. Details of Mechanical Sound Selecting Unit
4.4.1. Concept of Mechanical Sound Selecting
4.4.2. Basic Operations of Mechanical Sound Selecting
4.4.3. Detailed Operations of Mechanical Sound Selecting
5. Fifth Embodiment
5.1. Functional Configuration of Audio Signal Processing Device
5.2. Principle of Mechanical Sound Selecting
5.3. Basic Operations of Mechanical Sound Selecting
5.4. Detailed Operations of Mechanical Sound Selecting
6. Sixth Embodiment
6.1. Functional Configuration of Audio Signal Processing Device
6.2. Details of Mechanical Sound Selecting Unit
7. Conclusion

1. First Embodiment

1.1. Overview of Mechanical Sound Reduction Method

First, an overview of a mechanical sound reducing method with an audio signal processing device and method according to a first embodiment of the present disclosure will be described.

The audio signal processing device and method according to the present disclosure relates to technology of a recording device wherein noise (working sound) that is emitted due to operations of a sound-emitting member built into the recording device is reduced. Particularly, according to the present embodiment, with an imaging device having a moving picture imaging function, mechanical noise that is emitted in accordance with imaging operations of a driving device built into an imaging device when recording peripheral audio while imaging a moving picture (mechanical sound) is targeted for reduction.

Now, the driving device is a driving device built into an imaging device for performing imaging operations using an imaging optical system, and for example, includes a zoom motor that moves a zoom lens, focus motor that moves a focus lens, and driving mechanism that controls the diaphragm or shutter, and the like. Also, the mechanical sound that is emitted in accordance with imaging operations is, for example, a driving sound of a comparatively long time such as the driving sound of the zoom motor (zooming sound), driving sound of the focus motor (focus sound), but may also be an instantaneous driving sound such as the diaphragm sound or shutter sound. The description below will be given for an example wherein the audio signal processing device is a small digital camera having a moving picture imaging function, and the mechanical sound is the zooming sound that is emitted in accordance with the optical zoom operation of the digital camera. However, the audio signal processing devices and mechanical sounds of the present disclosure are not limited to this example.

Upon a user performing a zooming operation during imaging and recording with a digital camera, the zoom motor within the camera drives and a zooming sound is emitted. A microphone of the digital camera then picks up not only the audio of the camera periphery desired by the user (arbitrary audio recorded by the microphone such as environmental sounds, voice, and so forth, for example (hereinafter referred to as "desired sound")), but also the zooming sound that is emitted within the camera. Therefore, since the zooming sound is recorded in a state of being mixed in as noise with the desired sound, the zooming sound that is mixed in with the desired sound is disagreeable to the user when the recorded audio is played back. For example, frequency bands of the desired sound are largely distributed in the range of 1 to 4 kHz, and the mechanical sounds such as the zooming sound and so forth are largely distributed in the range of 5 to 10 kHz. Thus, since the frequency bands of the mechanical sound and desired sound are dissimilar, when mechanical sound is mixed in with the desired sound, the mechanical sound stands out when playing the recorded audio. Accordingly, technology has been desired which can appropriately remove the mechanical sound such as the zooming sound at the time of recording the moving picture and audio, and can record only the desired sound.

With mechanical sound reducing technology in related art, as disclosed in Japanese Unexamined Patent Application Publication No. 2006-279185, the mechanical sound spectrum is measured beforehand using multiple cameras and an average value of the mechanical sound spectrum (template) is found, and mechanical sound is reduced by subtracting the mechanical sound spectrum from the recorded sound spectrum at the time of recording (see Japanese Unexamined Patent Application Publication No. 2006-279185). However, since individual differences exist in the individual cameras, even by using an average mechanical sound spectrum, mechanical sound is not sufficiently reduced with the individual cameras.

Also, as disclosed in Japanese Unexamined Patent Application Publication No. 2009-276528, a method to detect the mechanical sound by installing an additional microphone dedicated to noise in the casing of the camera, other than the microphone for audio recording, has been proposed. However, securing installation space and adjustment of the disposal of the various parts, in order to newly install a microphone dedicated to noise in digital cameras that are becoming increasingly miniaturized, has been difficult.

Now, while the miniaturization of digital cameras as described above is advancing, device types that can perform stereo recording instead of monaural recording to improve recording quality, while improving moving picture imaging functions, have been increasing greatly. Multiple microphones (stereo microphones) are installed on the exterior of the camera to perform stereo recording.

Now, with the present embodiment, rather than increasing the number of microphones dedicated to noise, the multiple audio signals obtained from the multiple stereo microphones already installed on the digital camera will be utilized to reduce the mechanical sound. The stereo microphone has at least two microphones that are disposed adjacent to each other, and are installed on the exterior of the camera for sound pickup of the peripheral audio of the camera (desired sound) with high quality. The stereo microphone herein differs from a microphone dedicated to noise which is disposed within the casing of the camera. If such a pre-installed stereo microphone can be effectively utilized, the problems of providing a microphone dedicated to noise within the camera (problems of securing installation space and adjustment of the disposal of the various parts) do not occur.

It goes without saying that, the multiple microphones making up the stereo microphone also pick up the mechanical sound that is emitted within the camera, but the mechanical sound included in the audio signals can be estimated by analyzing the multiple audio signals output from the multiple microphones. That is to say, the relative position of the multiple microphones provided on the exterior of the camera and the driving device provided within the camera (mechanical sound emitting source such as the zoom motor) is fixed. Also, the distances from the driving device to the various microphones differ. Accordingly, a phase difference occurs between the mechanical sound that transmits from the driving device to one of the microphones and the mechanical sound that transmits to the other microphone.

Thus, according to the present embodiment, based on the relative position of the multiple microphones and the driving device, the multiple audio signals output from the multiple microphones are computed. Thus, the sound that reaches each microphone from the direction of the driving device (primarily the mechanical sound) can be emphasized, and sound reaching each microphone from directions other than from the driving device (primarily the desired sound) can be attenuated, whereby the mechanical sound can be estimated. Now, the direction of the driving device is the direction facing the multiple microphones from the driving device.

Thus, according to the present embodiment, multiple audio signals can be used from the stereo microphone without using the mechanical sound spectrum template, whereby the mechanical sound during recording can be estimated and corrected, and the mechanical sound can be appropriately reduced. Thus, by dynamically estimating and correcting the mechanical sound during recording by each camera, the mechanical sound that differs by individual camera can be correctly obtained and sufficiently reduced. Also, mechanical sound that differs by operation of driving devices within the same camera can also be correctly obtained and sufficiently reduced. A mechanical sound removal method according to the present embodiment will be described in detail below.

1.2. Configuration of Audio Signal Processing Device 1.2.1. Hardware Configuration of Audio Signal Processing Device First, a hardware configuration example of a digital camera to which the audio signal processing device according to the present embodiment has been applied will be described. FIG. 1 is a block diagram illustrating the hardware configuration of a digital camera 1 to which the audio signal processing device according to the present embodiment has been applied.

The digital camera 1 according to the present embodiment is an imaging device that can record audio along with moving pictures during moving picture imaging. The digital camera 1 images a subject, and converts the imaging image (either still image or moving picture) obtained by the imaging into image data with a digital method, and records this together with the audio on a recording medium.

As shown in FIG. 1, the digital camera 1 according to the present embodiment, largely has an imaging unit 10, image processing unit 20, display unit 30, recording medium 40, sound pickup unit 50, audio processing unit 60, control unit 70, and operating unit 80.

The imaging unit 10 images a subject, and outputs an analog image signal expressing the imaging image. The imaging unit 10 has an imaging optical system 11, imaging device 12, timing generator 13, and driving device 14.

The imaging optical system 11 is made up of various types of lenses such as a focus lens, zoom lens, correcting lens and so forth, and optical parts such as an optical filter that removes unnecessary wavelengths, a shutter, diaphragm, and so forth. An optical image irradiated from a subject (subject image) is formed on an exposure face of the imaging device 12, via the various optical parts in the imaging optical system 11. The imaging device 12 (image sensor) is made up of a solid-state imaging device such as a CCD (Charge Coupled Device) or CMOS (Complementary Metal Oxide Semiconductor), for example. The imaging device 12 subjects the optical image guided from the imaging optical system 11 to photoelectric conversion, and outputs an electric signal expressing the imaging image (analog image signal).

A driving device 14 for driving the optical parts of the imaging optical system 11 is mechanically connected to the imaging optical system 11. The driving device 14 includes, for example, a zoom motor 15, focus motor 16, diaphragm adjusting mechanism (unshown), and so forth. The driving device 14 drives the optical parts of the imaging optical system 11 according to instructions from a later-described control unit 70, and moves the zoom lens and focus lens, and adjusts the diaphragm. For example, the zoom motor 15 moves the zoom lens in telephoto/wide direction, thereby performing zooming operations to adjust the field angle. Also, the focus motor 16 moves the focus lens, thereby performing focusing operation to focus on the subject.

Also, the timing generator (TG) 13 generates operational pulses for the imaging device 12, according to instructions from the control unit 70. For example, the TG 13 generates various types of pulses such as a four-phase pulse for vertical transferring, field shift pulse, two-phase pulse for horizontal transferring, shutter pulse, and so forth, and supplies these to an imaging device 12. By driving the imaging device 12 with this TG 13, the subject image is imaged. Also, by the TG 13 adjusting the shutter speed of the imaging device 12, the exposure amount and exposure time period of the imaging image are controlled (electronic shutter functions). The image signals output by the imaging device 12 are input in the image processing unit 20.

The image processing unit 20 is made up of an electronic circuit such as a microcontroller, subjects the image signals output from the imaging device 12 to predetermined image processing, and outputs the image signals after image processing to the display unit 30 and control unit 70. The image processing unit 20 has an analog signal processing unit 21, analog/digital (A/D) conversion unit 22, and digital signal processing unit 23.

The analog signal processing unit 21 is a so-called analog front end that pre-processes the image signal. The analog signal processing unit 21 performs CDS (correlated double sampling) processing, gain processing with a programmable gain amplifier (PGA), and so forth. The A/D conversion unit 22 converts the analog image signals input from the analog signal processing unit 21 into digital image signals, and outputs to the digital signal processing unit 23. The digital signal processing unit 23 subjects the input digital image signals to digital signal processing such as noise removal, white balance adjusting, color correcting, edge adjusting, gamma correction, and so forth, and outputs to the display unit 30 and control unit 70.

The display unit 30 is made up of a display device such as a liquid crystal display (LCD) or organic EL display, for example. The display unit 30 displays various types of input image data according to control by the control unit 70. For example, the display unit 30 displays an imaging image input in real-time from the image processing unit 20 during imaging (through image). Thus, the user can operate the digital camera 1 while viewing the through image during imaging. Also, when the imaging image that has been recorded on the recording medium 40 is played, the display unit 30 displays the playing image. Thus, the user can confirm the content of the imaging image that is recorded on the recording medium 40.

The recording medium 40 stores various types of data such as the data of the above-mentioned imaging image, the metadata thereof, and so forth. A semiconductor memory such as a memory card, or a disk-form recording medium such as an optical disc, hard disk, or the like, for example, can be used for the recording medium 40. Note that the optical disc includes a Blu-ray Disc, DVD (Digital Versatile Disc), or CD (Compact Disc), and so forth, for example. Note that the recording medium 40 may be built into the digital camera 1, or may be removable media that is detachable from the digital camera 1.

The sound pickup unit 50 picks up external audio in the periphery of the digital camera 1. The sound pickup unit 50 according to the present embodiment is made up of a stereo microphone made up of two external audio recording microphones 51 and 52. The two microphones 51 and 52 each output the audio signals obtained by picking up external audio. With this sound pickup unit 50, external audio can be picked up during moving picture imaging, and this can be recorded together with the moving picture.

The audio processing unit 60 is made up of an electronic circuit such as a microcontroller, and subjects the audio signals to predetermined audio processing and outputs audio signals for recording. The audio processing include AD conversion processing, noise reduction processing, and so forth. The present embodiment has noise reduction processing with the audio processing unit 60 as a feature, and the details thereof will be described later.

The control unit 70 is made up of an electronic circuit such as a microcontroller, and controls the overall operations of the digital camera 1. The control unit 70 has, for example, a CPU 71, EEPROM (Electrically Erasable Programmable ROM) 72, ROM (Read Only Memory) 73, RAM (Random Access Memory) 74. The control unit 70 controls various parts within the digital camera 1. For example, the control unit 70 controls the operations of the audio processing unit 60 to reduce the mechanical sound, which are emitted from the driving device 14 from the audio signals picked up by the microphones 51 and 52, as noise.

A program to cause the CPU 71 to execute various types of control processing is stored in the ROM 73 in the control unit 70. The CPU 71 operates based on this program, and executes computing/controlling processing for various controls described above, using the RAM 74. The program may be stored beforehand in a storage device built in to the digital camera 1 (e.g., EEPROM 72, ROM 73, and so forth). Also, the program may be stored in a disc-form recording medium or a removable medium such as a memory card, and provided to the digital camera 1, or may be downloaded to the digital camera 1 via a network such as a LAN, the Internet, and so forth.

Now, a specific example of control by the control unit 70 will be described. The control unit 70 controls the TG 13 and driving device 14 of the imaging unit 10 to control the imaging processing with the imaging unit 10. For example, the control unit 70 performs automatic exposure control (AE function) with diaphragm adjusting of the imaging optical system 11, electronic shutter speed setting of the imaging device 12, AGO gain setting of the analog signal processing unit 21, and so forth. Also, the control unit 70 moves the focus lens of the imaging optical system 11 to modify the focus position, thereby performing auto-focus control (AF function) which automatically focuses the imaging optical system 11 as to an identified subject. Also, the control unit 70 moves the zoom lens of the imaging optical system 11 to modify the zoom position, thereby adjusting the field angle of the imaging image. Also, the control unit 70 records various types of data such as imaging image, metadata, and so forth as to the recording medium 40, and reads out and also plays the data stored in the recording medium 40. Further, the control unit 70 generates various types of display images to display on the display unit 30, and controls the display unit 30 to display the display images.

The operating unit 80 and display unit 30 function as user interfaces for the user to operate the operations of the digital camera 1. The operating unit 80 is made up of various types of operating keys such as buttons, levers, and so forth, or a touch panel or the like. For example, this includes a zoom button, shutter button, power button, and so forth. The operating unit 80 outputs instruction information to instruct various types of imaging operations to the control unit 70, according to the user operations.

1.2.2. Functional Configuration of Audio Signal Processing Device

Figure 2:
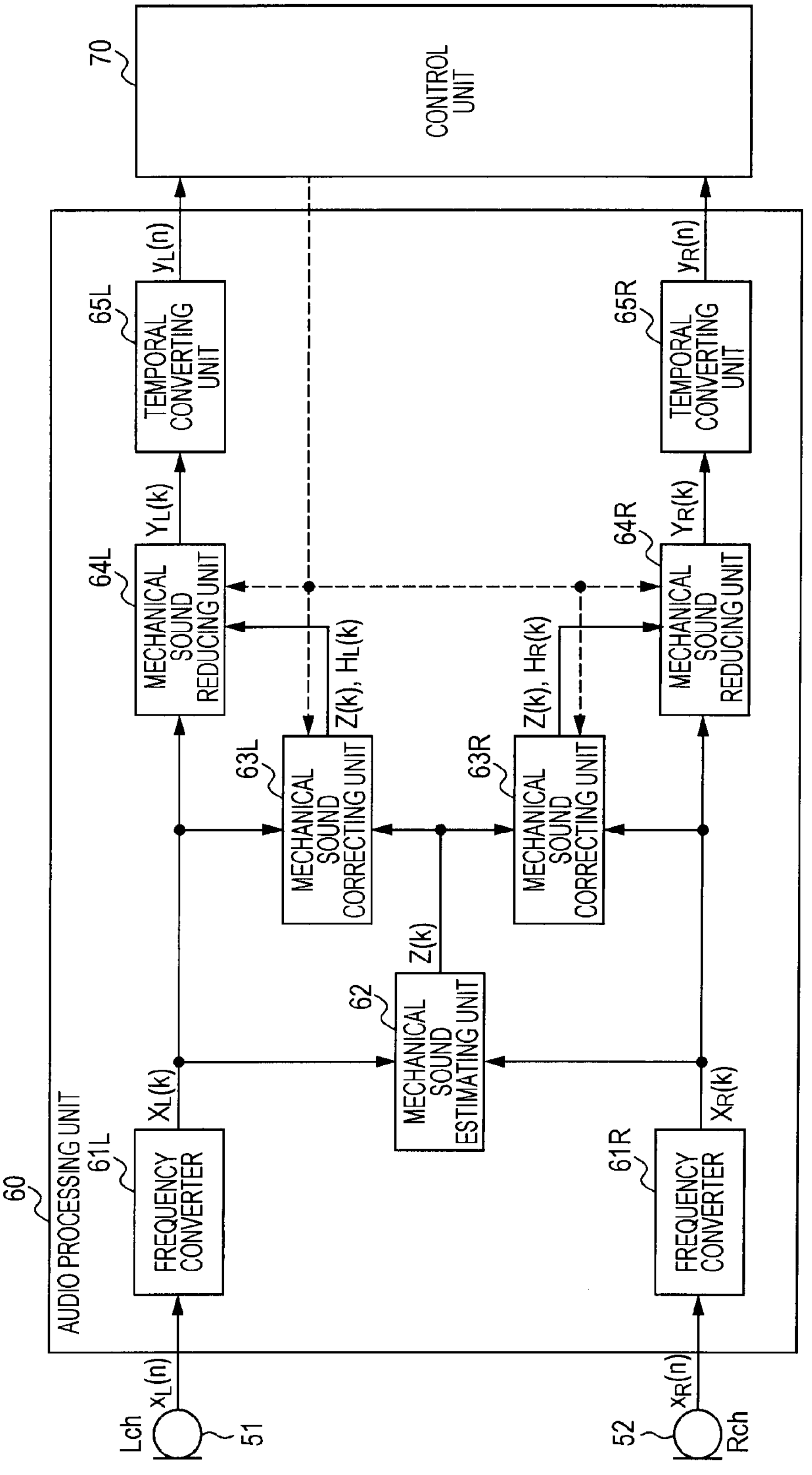
FIG. 2 is a block diagram illustrating a functional configuration of an audio signal processing device according to the embodiment.

Next, a functional configuration example of the audio signal processing device applied to a digital camera 1 according to the present embodiment will be described with reference to FIG. 2. FIG. 2 is a block diagram illustrating a functional configuration of the audio signal processing device according to the present embodiment.

As shown in FIG. 2, the audio signal processing device has two microphones 51 and 52, and an audio processing unit 60. The audio processing unit 60 has two frequency converters 61L and 61R, a mechanical sound estimating unit 62, two mechanical sound correcting units 63L and 63R, two mechanical sound reducing units 64L and 64R, and two temporal converters 65L and 65R. The various units of the audio processing unit 60 may be configured with dedicated hardware, or may be configured with software. In the case of using software, a processor provided to the audio processing unit 60 may execute the program to realize the functions of the various functional units described below. Note that in FIG. 2, the solid line arrow indicates a audio signal data line, and the broken arrow indicates a control line.

The microphones 51 and 52 make up the above-described stereo microphone. The microphone 51 (first microphone) is a microphone to pickup audio on an L channel, and pickups up the external audio transmitted from outside of the digital camera 1 and outputs a first audio signal $x_L$. The microphone 52 (second microphone) is a microphone to pickup audio on an R channel, and pickups up the external audio transmitted from outside of the digital camera 1 and outputs a second audio signal $x_R$.

The microphones 51 and 52 are microphones for recording external audio in the periphery of the digital camera 1 (desired sounds such as environmental sound, conversation sound, and so forth). However, at the time of operation of the driving device 14 (zoom motor 15, focus motor 16, and so forth) provided within the digital camera 1, the mechanical sound (zooming sound, focusing sound, and so forth) from the driving device 14 mixes in with the external audio mentioned above. Accordingly, not only desired sound components, but also mechanical noise components are included in the audio signals $X_L$ and $x_R$ that are input through the microphones 51 and 52. Thus, in order to remove the mechanical sound components from the audio signals $X_L$ and $x_R$, the parts described below are provided.

The frequency converters 61L and 61R (hereafter collectively referred to as "frequency converter 61") have a function to convert audio signals $x_L$ and $x_R$ of a temporal region into audio spectrum signals $X_L$ and $X_R$ of a frequency region. A spectrum here means a frequency spectrum. The frequency converter 61L (first frequency converter) divides the audio signal $X_L$ input from the Left channel microphone 51 by frame increments of a predetermined time, and subjects the divided audio signal $X_L$ to Fourier transform, thereby generating an audio spectrum signal $X_L$ indicating power for each frequency. Similarly, the frequency converter 61R (second frequency converter) divides the audio signal $x_R$ input from the Right channel microphone 52 by frame increments of a predetermined time, and subjects the divided audio signal $x_R$ to Fourier transform, thereby generating an audio spectrum signal $X_R$ indicating power for each frequency.

The mechanical sound estimating unit 62 is an example of an operating sound estimating unit that estimates the operating sound spectrum. The mechanical sound estimating unit 62 has a function to estimate the mechanical sound spectrum expressing the mechanical sound, using the audio spectrum signals $X_L$ and $X_R$. The mechanical sound estimating unit 62 computes the audio spectrum signals $X_L$ and $X_R$, based on the relative positions of the driving device 14 and the microphones 51 and 52, thereby generating a mechanical sound spectrum signal Z that indicates the mechanical sound.

By providing the mechanical sound estimating unit 62, the mechanical sound can be dynamically estimated for each camera and each imaging operation, without using an average mechanical sound spectrum, and the mechanical sound can be appropriately reduced. There are cases below wherein a mechanical sound spectrum signal X estimated by the mechanical sound estimating unit 62 will be called "estimated mechanical sound spectrum Z". Note that details of the mechanical sound estimating processing by the mechanical sound estimating unit 62 will be described later.

The mechanical sound correcting units 63L and 63R (hereafter, collectively referred to as "mechanical sound correcting unit 63") have a function that uses an operating time period of the driving device 14 (mechanical sound emitting time period) and corrects the error between the actual mechanical sound spectrum Zreal input in the microphones 51 and 52 and the estimated mechanical sound spectrum Z. The mechanical sound correcting unit 63L (first mechanical sound correcting unit) computes a correcting coefficient $H_L$ (first correcting coefficient) to correct the estimating mechanical sound spectrum Z for the audio spectrum signal $X_L$ (for the Left channel), based on a frequency feature difference $dX_L$ of the audio spectrum signal $X_L(k)$ before and after operation start of the driving device 14, for each frequency component $X_L(k)$ of the audio spectrum signal $X_L$. Similarly, the mechanical sound correcting unit 63R (second mechanical sound correcting unit) computes a correcting coefficient $H_R$ (second correcting coefficient) to correct the estimating mechanical sound spectrum Z for the audio spectrum signal $X_R$ (for the Right channel), based on a frequency feature difference $dx_R$ of the audio spectrum signal $X_R(k)$ before and after operation start of the driving device 14, for each frequency component $X_R(k)$ of the audio spectrum signal $X_R$. Note that the frequency component X(k) is the audio spectrum signal X for the various blocks when all frequency bands of the audio spectrum X is divided into multiple (L number of) blocks (k=0, 1, . . . L−1).

By providing the mechanical sound correcting unit 63, the estimating mechanical sound spectrum Z can be corrected so as to match the actual mechanical sound spectrum Zreal for each frequency component XL(k) of the audio spectrum signal XL, and adjust to an accurate mechanical sound spectrum, so erasing not enough of, or erasing too much of, the mechanical sound by the mechanical sound reducing unit 64 can be suppressed. Note that details of the mechanical sound spectrum correcting processing by the mechanical sound correcting unit 63 will be described later.

The mechanical sound reducing units 64L and 64R (hereafter, collectively referred to as "mechanical sound reducing unit 64") have a function to reduce the estimated mechanical sound spectrum Z that has been corrected by the mechanical sound correcting units 63L and 63R from the audio spectrum signals $X_L$ and $X_R$ input from the frequency changing units 61L and 61R. The mechanical sound reducing unit 64L (first mechanical sound reducing unit) reduces the estimated mechanical sound spectrum Z, which has been corrected with the correcting coefficient $H_L$, from the audio spectrum signal $X_L$, thereby generating an audio spectrum signal $Y_L$ from which the mechanical sound has been removed. Similarly, the mechanical sound reducing unit 64R (second mechanical sound reducing unit) reduces the estimated mechanical sound spectrum Z, which has been corrected with the correcting coefficient $H_R$, from the audio spectrum signal $X_R$, thereby generating an audio spectrum signal $Y_R$ from which the mechanical sound has been removed. Note that details of the mechanical sound spectrum Z reduction processing by the mechanical sound reducing unit 64 will be described later.

The temporal converters 65L and 65R (hereafter, collectively referred to as "temporal converter 65") have a function to inversely convert the audio spectrum signals $Y_L$ and $Y_R$ of a frequency region to audio signals $y_L$, and $y_R$ of a temporal region. The temporal converter 65L (first temporal converter) subjects the audio spectrum signal $Y_L$ input from the mechanical sound reducing unit 64L to inverse Fourier transform, thereby generating an audio signal $y_L$ for each frame increment. Similarly, the temporal converter 65R (second temporal converter) subjects the audio spectrum signal $Y_R$ input from the mechanical sound reducing unit 64R to inverse Fourier transform, thereby generating an audio signal $y_R$ for each frame increment. The audio signals $y_L$ and $Y_R$ are audio signals having desired sound components after the mechanical sound components included in the audio signals $X_L$ and $X_R$ have been adequately removed.

A functional configuration of the audio processing unit 60 of the audio signal processing device according to the present embodiment has been described above. The audio processing unit 60 can use the audio signals input from the stereo microphones 51 and 52 during moving picture and audio recording by the digital camera 1 to accurately estimate the mechanical sound spectrum included in the external audio spectrum, and adequately remove the mechanical sound from the external audio.

Accordingly, with the present embodiment, mechanical sound can be removed, even without using a mechanical sound spectrum template as in related art. Thus, the adjustment costs of measuring the mechanical sound using multiple cameras and creating a template as in the related art can be reduced.

Further, a mechanical sound spectrum can be dynamically estimated and removed for each imaging operation wherein the mechanical sound is emitted, within each digital camera 1, whereby a desired reduction effect can be obtained, even if there are varying mechanical sounds according to individual differences in the digital cameras 1. Also, the mechanical sound spectrum is estimated constantly during recording, whereby this applies also to temporal changes of the mechanical sound during operation of the driving device 14.

Also, with the mechanical sound correcting unit 63, the estimated mechanical sound spectrum is corrected so as to match the actual mechanical sound spectrum, whereby there is little over-estimating or under-estimating of the mechanical sound. Accordingly, erasing too much or erasing too little of the mechanical sound with the mechanical sound reducing unit 64 can be prevented, whereby sound quality deterioration of the desired sound can be reduced.

1.3. Details of Mechanical Sound Estimating Unit

Next, a configuration and operations of the mechanical sound estimating unit 62 according to the present embodiment will be described.

1.3.1. Configuration of Mechanical Sound Estimating Unit

Figure 3:
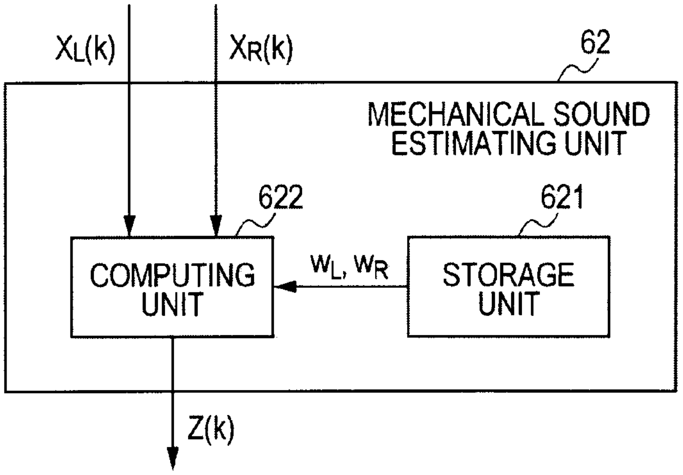
FIG. 3 is a block diagram illustrating a configuration of a mechanical sound estimating unit according to the embodiment.

First, a configuration of the mechanical sound estimating unit 62 according to the present embodiment will be described with reference to FIG. 3. FIG. 3 is a block diagram illustrating a configuration of the mechanical sound estimating unit 62 according to the present embodiment.

As shown in FIG. 3, the mechanical sound estimating unit 62 has a storage unit 621 and a computing unit 622. Audio spectrum signals $X_L$ and $X_R$ from the frequency converter 61 for the Left channel and Right channel are input into the computing unit 622.

The storage unit 621 stores later-described filter coefficients $W_L$ and $W_R$. The filter coefficients $W_L$ and $W_R$ are coefficients that are multiplied by the audio spectrum signals $X_L$ and $X_R$ in order to attenuate the audio components that reach the microphones 51 and 52 from directions other than the driving device 14. The computing unit 622 uses the filter coefficients $W_L$ and $W_R$ to compute the audio spectrum signals $X_L$ and $X_R$ thereby generating the estimated mechanical sound spectrum Z. The estimated mechanical sound spectrum Z generated by the computing unit 622 is output to the mechanical sound reducing unit 64 and the mechanical sound correcting unit 63.

1.3.1. Principle of Mechanical Sound Spectrum Estimating

Figure 4:
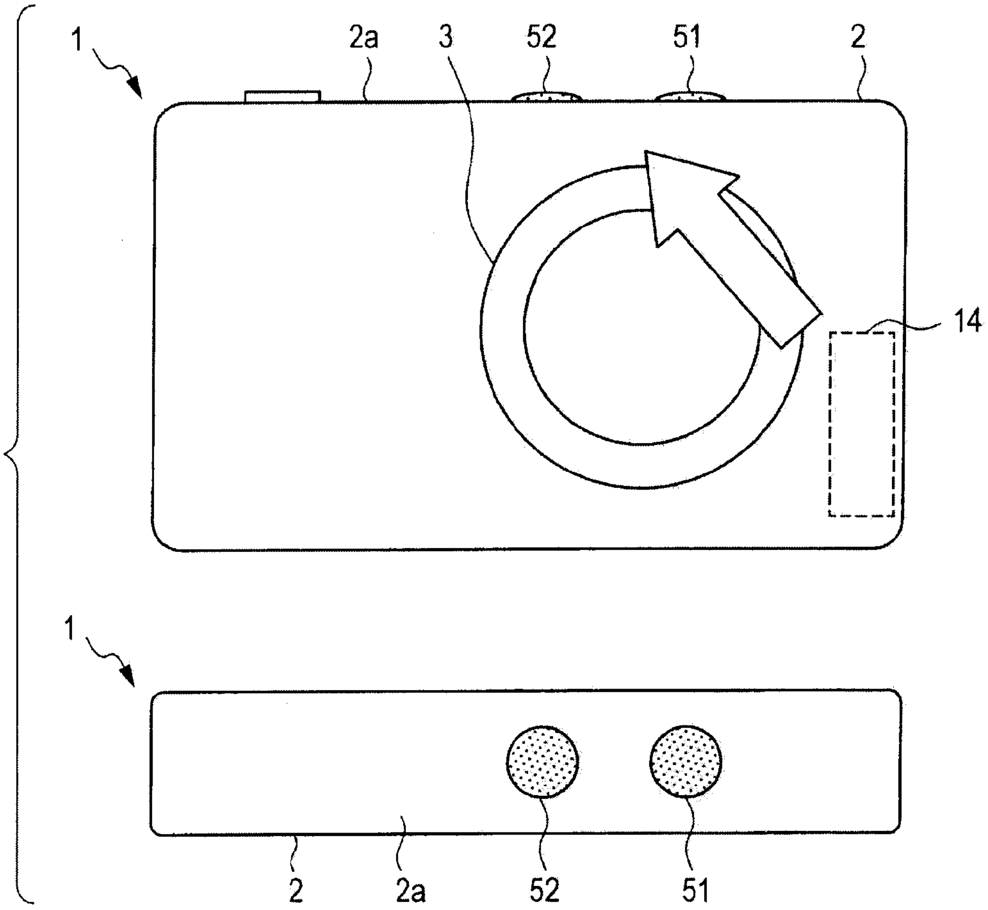
FIG. 4 is a frontal diagram and top diagram illustrating a digital camera according to the embodiment.
Figure 5:
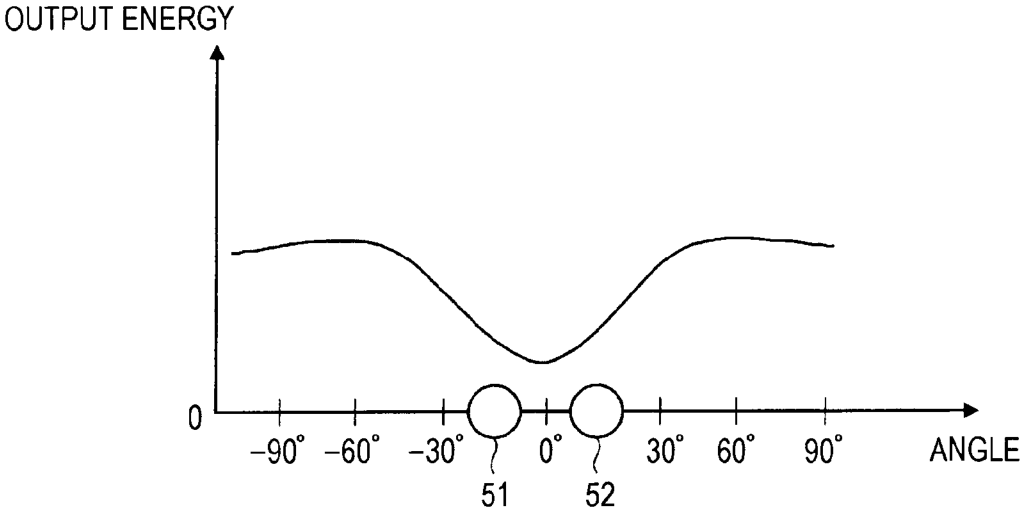
FIG. 5 is an explanatory diagram illustrating the relation between the input direction of audio as to a stereo microphone and the feature of output energy of an audio signal, according to the embodiment.

Next, the principle of using the stereo microphones 51 and 52 to estimate the mechanical sound spectrum will be described with reference to FIGS. 4 and 5. FIG. 4 is a frontal diagram and top diagram illustrating the digital camera 1 according to the present embodiment. FIG. 5 is an explanatory diagram illustrating the relation between the input direction of audio as to the stereo microphones 51 and 52 and the feature of output energy of the audio signal, according to the present embodiment.

As shown in FIG. 4, with a single type of digital camera 1, the relative position of the two microphones 51 and 52 and the driving device 14 (zoom motor 15, focus motor 16, and the like), which is the mechanical sound emitting source, is fixed. That is to say, the relative position of both does not change for each digital camera 1 or for each imaging operation.

In the example in the diagram, the two microphones 51 and 52 are disposed so as to be arrayed in the orthogonal direction as to the camera front face direction (imaging direction), on the upper face 2*a* of the casing 2 of the digital camera 1. With this array, the microphones 51 and 52 can favorably pick up external audio (desired sound) that arrive from the camera front face direction. Also, the driving device 14 is disposed on the lower right corner within the casing 2 of the digital camera 1, so as to be adjacent to the lens unit 3.

According to the relative positions between the microphones 51 and 52 and the driving device 14, the distance from the driving device 14 to one microphone 51 and the distance from the driving device 14 to the other microphone 52 differ. Accordingly, when a mechanical sound is emitted with the driving device 14, a phase difference occurs between the mechanical sound picked up by the microphone 51 and the mechanical sound picked up by the microphone 52.

Now, the mechanical sound estimating unit 52 uses the relative positions between the microphones 51 and 52 and the driving device 14 to perform signal processing whereby the audio signal components (primarily desired sound) that arrive at the microphones 51 and 52 from directions other than the driving device 14 are attenuated, and audio signal components (primarily the mechanical sound) that arrive at the microphones 51 and 52 from the driving device 14 are emphasized. Thus, the mechanical sound can be extracted in an approximated manner from the external audio input in the two microphones 51 and 52.

That is to say, filter coefficients $w_L$, and $w_R$ for extracting the mechanical sound from the two audio spectrum signals $X_L$ and $X_R$ obtained by the two microphones 51 and 52 are stored in the storage unit 621 of the mechanical sound estimating unit 62. For example, as shown in FIG. 5, the filter coefficients $w_L$, and $w_R$ are coefficients that provide features to the audio spectrum signals $X_L$ and $X_R$ such that the audio components that arrive at the microphones 51 and 52 from the camera front face direction (audio input angle=0°) are attenuated, and allow the audio signal components that arrive at the microphones 51 and 52 from the direction of the driving device 14 (audio input angle=60°) to remain. Specifically, the filter coefficient $w_L$ is a coefficient that is multiplied by the audio spectrum signal $X_L$, and filter coefficient $w_R$ is a coefficient that is multiplied by the audio spectrum signal $X_R$.

The mechanical sound estimating unit 62, for example as shown in Expression (1) below, multiples the filter coefficients $w_L$ and $w_R$ by the audio spectrum signals $X_L$ and $X_R$ and finds the sum of both, thereby generating the estimated mechanical sound spectrum Z.

$$Z=w_L \cdot X_L+w_R \cdot X_R \quad (1)$$

The value of the filter coefficients $w_L$ and $w_R$ are determined beforehand by the type of digital camera 1, according to the relative positions of the microphones 51 and 52 and the driving device 14. When the microphones 51 and 52 and the driving device 14 are in a relative position such as shown in FIG. 4, for example $w_L$=1 and $W_R$=−1 is sufficient. Thus, the desired sound transmitting from the camera front face direction can be reduced, the mechanical sound transmitted from the driving device 14 direction extracted, and the estimated mechanical sound spectrum Z adequately estimated. In the case that desired sound transmitted from the camera front face direction is picked up, a time delay (phase difference) does not occur between the audio picked up with the microphones 51 and 52. Accordingly, by subtracting $X_R$ from $X_L$ as shown in Expression (1), the desired sound from the camera front face direction can be offset, and the estimated mechanical sound spectrum Z from the side direction can be extracted. Note that the filter coefficients $w_L$ and $w_R$ can be arbitrary values, as long as the above-described features (attenuating desired sound, emphasizing the mechanical sound) can be satisfied.

The above description has been regarding the principle of estimating the mechanical sound in the case that the driving device 14 is not disposed in the frontal direction as to the two microphones 51 and 52 (input angle of mechanical sound≠0°), as shown in FIGS. 4 and 5. However, even in the case that the driving device 14 is disposed in the frontal direction as to the two microphones 51 and 52 (input angle of mechanical sound=0°), shifting the position of the waveform peak that attenuates the audio signal shown in FIG. 5 to the left or right is sufficient (e.g., a position of)±30°. Thus, audio arriving from a direction other than the audio input direction corresponding to the peak position (includes the mechanical sound from the driving device 14 in the front face direction) can be emphasized, whereby the mechanical sound spectrum can be estimated.

1.3.2. Operation of Mechanical Sound Spectrum Estimation

Figure 6:
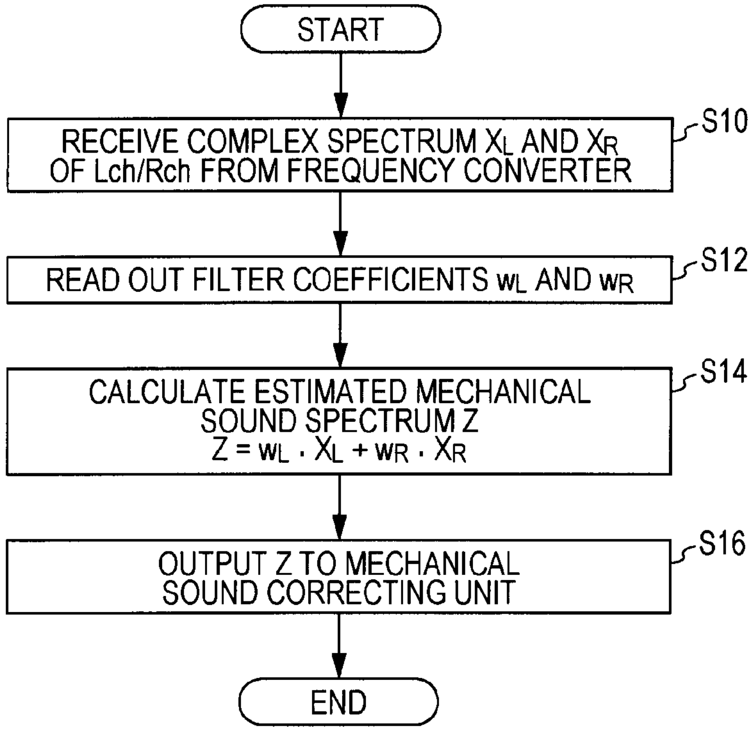
FIG. 6 is a flowchart showing operations of a mechanical sound estimating unit according to the embodiment.

Next, operations of the mechanical sound estimating unit 62 according to the present embodiment will be described with reference to FIG. 6. FIG. 6 is a flowchart showing operations of a mechanical sound estimating unit 62 according to the present embodiment.

As shown in FIG. 6, first the mechanical sound estimating unit 62 receives the output spectrum signals $X_L$ and $X_R$ output from the frequency converters 61L and 61R (step S10). Next, the mechanical sound estimating unit 62 reads out the filter coefficients $w_L$ and $w_R$ from the storage unit 621 (step S12). As described above, the filter coefficients are $w_L=1$ and $W_R=-1$, for example.

Further, the mechanical sound estimating unit 62 uses the filter coefficients $w_L$ and $w_R$ read out in S12 to compute the output spectrum signals $X_L$ and $X_R$ obtained in S10, and calculates the estimated mechanical sound spectrum Z (step S14).

$$Z=w_L \cdot X_L+w_R \cdot X_R=X_L-X_R \quad (2)$$

Subsequently, the mechanical sound estimating unit 62 outputs the estimated mechanical sound spectrum Z calculated in S14 to the mechanical sound correcting units 63L and 63R (step S16).

Estimation processing of the estimated mechanical sound spectrum Z with the mechanical sound estimating unit 62 is described above. Actually, the audio signals $x_L$, and $x_R$ are subjected to frequency conversion to obtain the audio spectrum signals $X_L$ and $X_R$, so the estimated mechanical sound spectrum Z(k) has to be calculated for each frequency component $X_L(k)$ and $X_R(k)$ of the audio spectrum signals $X_L$ and $X_R$. However, in the description above, for ease of description, a flowchart for calculating only one frequency component Z(k) of the estimated mechanical sound spectrum Z is used for the description.

1.4. Details of Mechanical Sound Correcting Unit

Next, a configuration and operations of the mechanical sound correcting unit 63 according to the present embodiment will be described.

1.4.1. Configuration of Mechanical Sound Correcting Unit

Figure 7:
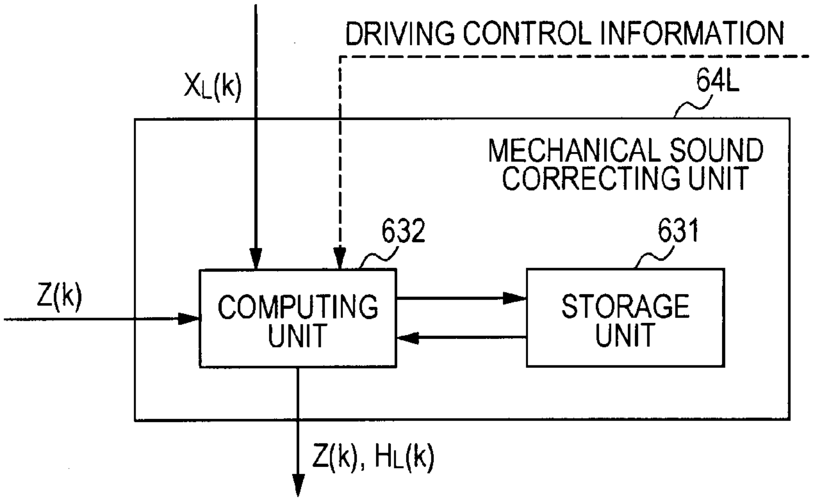
FIG. 7 is a block diagram illustrating a configuration of a mechanical sound correcting unit according to the embodiment.

First, a configuration of the mechanical sound correcting unit 63 according to the present embodiment will be described with reference to FIG. 7. FIG. 7 is a block diagram showing a configuration of the mechanical sound correcting unit 63 according to the present embodiment. Note that a configuration of the mechanical sound correcting unit 63L for the Left channel will be described below, but the configuration of the mechanical sound correcting unit 63R for the Right channel is substantially the same, to the detailed description thereof will be omitted.

As shown in FIG. 7, the mechanical sound correcting unit 63L has a storage unit 631 and computing unit 632. Into the computing unit 632, the audio spectrum signal $X_L$ is input from the Left channel frequency converter 61L, the estimated mechanical sound spectrum signal Z is input from the mechanical sound estimating unit 62, and driving control information is input from the control unit 70.

The driving control information is information for controlling the driving device 14, and indicates the operational state of the driving device 14. For example, driving control information for controlling the zoom motor 15 (hereafter, motor control information) indicates the operational state of the zoom motor 15 (e.g., whether or not there is any zoom operation, the starting and ending timings of the zoom operation, and so forth). The computing unit 632 of the mechanical sound correcting unit 63L determines the operational state of the driving device 14, based on the driving control information herein.

The storage unit 631 stores a later-described correcting coefficient $H_L$, for each frequency component $X_L(k)$ of the audio spectrum signal $X_L$. The correcting coefficient $H_L$ is a coefficient that corrects the estimated mechanical sound spectrum Z generated by the mechanical sound estimating unit 62 in order to adequately remove the mechanical sound from the audio spectrum signal $X_L$. Also, the storage unit 631 also functions as a buffer for calculation, in order to calculate the correcting coefficient $H_L$ with the computing unit 632.

When the driving device 14 operates (i.e. at the time that mechanical sound is emitted), the computing unit 632 computes the correcting coefficient $H_L$ for each frequency component $X_L(k)$ of the audio spectrum signal $X_L$, based on the $X_L$ frequency feature difference $dX_L$ before and after the driving device 14 starts operating (difference in $X_L$ spectrum form), and updates the past correcting coefficient $H_L$ stored in the storage unit 631. Thus, the storage unit 632 repeats the correcting coefficient $H_L$ computing and the updating processing, each time the driving device 14 operates. Also, the newest correcting coefficient $H_L$ calculated with the computing unit 632 and the estimated mechanical sound spectrum signal Z are output to the mechanical sound reducing unit 64L. Note that there may be cases wherein the correcting coefficient $H_L$ and correcting coefficient $H_R$ are collectively referred to as "correcting coefficient H".

1.4.2. Concept of Mechanical Sound Correction

Next, the concept of mechanical sound spectrum correcting with the mechanical sound correcting unit 63 will be described with reference to FIGS. 8 through 10.

As described above, an estimation of the mechanical sound according to the input audio signals $X_L$ and $S_R$ can be realized with the mechanical sound estimating unit 62. However, the mechanical sound estimated with the mechanical sound estimating unit 62 (estimated mechanical sound spectrum Z) has a slight error from the actual mechanical sound input into the Left channel microphone 51.

Figure 8:
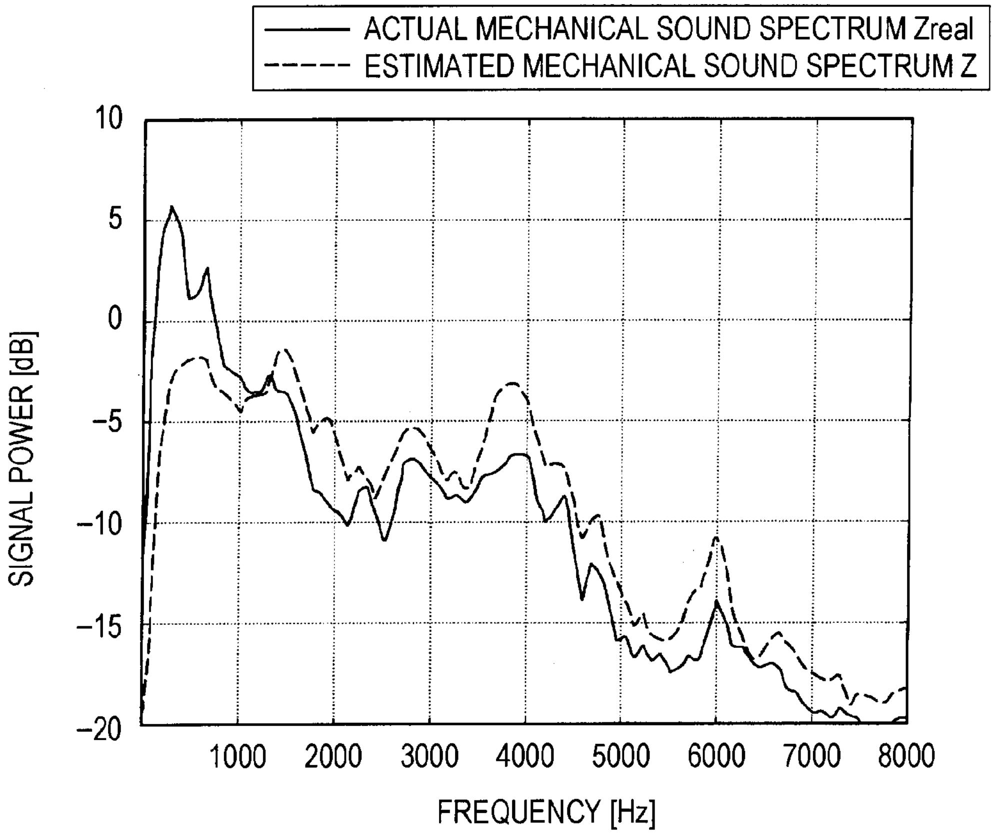
FIG. 8 is a waveform diagram illustrating an actual mechanical sound spectrum and an estimated mechanical sound spectrum according to the embodiment.

FIG. 8 shows the average of the actual mechanical sound spectrums Zreal input into the Left channel microphone 51 and the average of the mechanical sound spectrums Z estimated by the mechanical sound estimating unit 62. As shown in FIG. 8, the estimated mechanical sound spectrum Z obtained by the mechanical sound estimating unit 62 captures the overall trend of the actual mechanical sound spectrum Zreal, but there is some error in the individual frequency components X(k). The reason for the estimating error herein may be in the individual differences in the microphones 51 and 52, and estimating error can also occur by mechanical noise reflecting within the casing 2 of the digital camera 1 and being input into the microphones 51 and 52 from multiple directions. Accordingly, with just the mechanical sound estimating unit 62, completely matching the estimated mechanical sound spectrum Z to the actual mechanical sound spectrum Zreal is difficult.

Accordingly, in order to adequately reduce the mechanical sound, it is desirable for the difference between the mechanical sound emitting time periods and non-emitting time periods to be used, and correcting the frequency feature of the estimating mechanical sound spectrum Z so that the estimated mechanical sound spectrum Z matches the actual mechanical sound spectrum Zreal.

Figure 9:
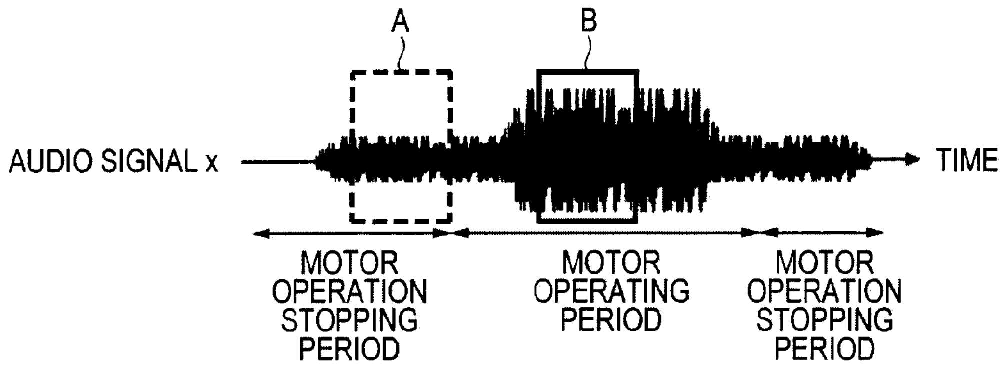
FIG. 9 is a waveform diagram illustrating an audio signal according to the embodiment.

However, as shown in FIG. 9, the audio input in the microphones 51 and 52 during the operating time period of the driving device 14 is not only the mechanical sound from the driving device 14, but the environmental sound from the camera periphery (desired sound) is also included. Therefore, in order to adequately reduce the mechanical sound without deteriorating the audio components of other than the mechanical sound significantly, a prominent spectrum has to be identified for only the mechanical sound emitting time periods (i.e. the driving device 14 operating time periods).

In order to accomplish this, as shown in FIG. 9, the desired sound components during the driving device 14 operating time periods are estimated from the audio A from before operating (operation stopped time period), and the estimated desired audio portions are removed from the audio B in the driving device 14 operating time periods. Thus, the mechanical sound components in the operating time period of the driving device 14 can be extracted, whereby the mechanical sound spectrum in during the operating time period can be identified.

Now, the mechanical sound correcting unit 63 according to the present embodiment finds the correcting coefficient H for correcting the estimated mechanical sound spectrum Z, by using the difference dX between an audio spectrum Xa from when the mechanical sound is being emitted (driving device 14 operating time) and an audio spectrum Xb from when the mechanical sound is not being emitted (driving device 14 stopped time). Note that the audio spectrum Xa is the audio spectrum signals $X_L$ and $X_R$ which are output from the frequency converter 61 during operation of the driving device 14, and the audio spectrum Xb is the audio spectrum signals $X_L$ and $X_R$ which are output from the frequency converter 61 immediately before operation of the driving device 14 starts.

Figure 10:
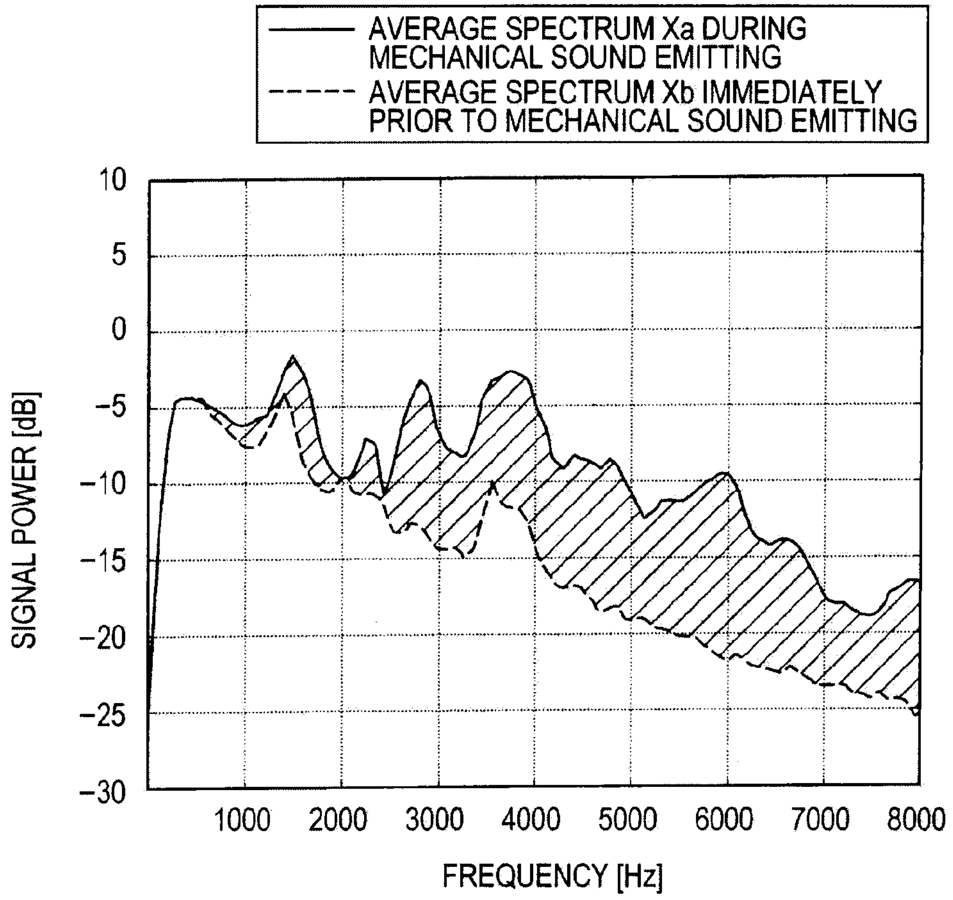
FIG. 10 is a waveform diagram illustrating the difference between an actual mechanical sound spectrum and an estimated mechanical sound spectrum according to the embodiment.

FIG. 10 shows the audio spectrum Xa when the mechanical sound is emitted and audio spectrum Xb when the mechanical sound is not emitted. AS shown in FIG. 10, the region of the difference dX (=Xa−Xb) between the audio spectrum Xa and audio spectrum Xb shows the frequency feature of the mechanical sound. That is to say, only desired sound is included in the audio spectrum Xb that is input immediately before operation of the driving device 14 starts, but the mechanical sound is not included, and both desired sound and mechanical sound is included in the audio spectrum Xa input during operation of the driving device 14. Accordingly, if there is no change to the environmental sound in the periphery of the digital camera 1 (desired sound) before and after operation of the deriving device 14 starts (e.g., before and after the zoom operation starts), the difference dX of Xa and Xb will indicate the actual mechanical sound spectrum Zreal.

Thus, the mechanical sound correcting unit 63 finds the correcting coefficient H for correcting the estimated mechanical sound spectrum Z, using the difference dX herein. The correcting coefficient H corrects each of the estimated mechanical sound spectrums Z for the Left channel and Right channel, and thereby can estimate the estimated mechanical sound spectrum Z to be closer to the actual mechanical sound spectrum Zreal.

1.4.2. Basic Operations of Mechanical Sound Correcting

Figure 11:
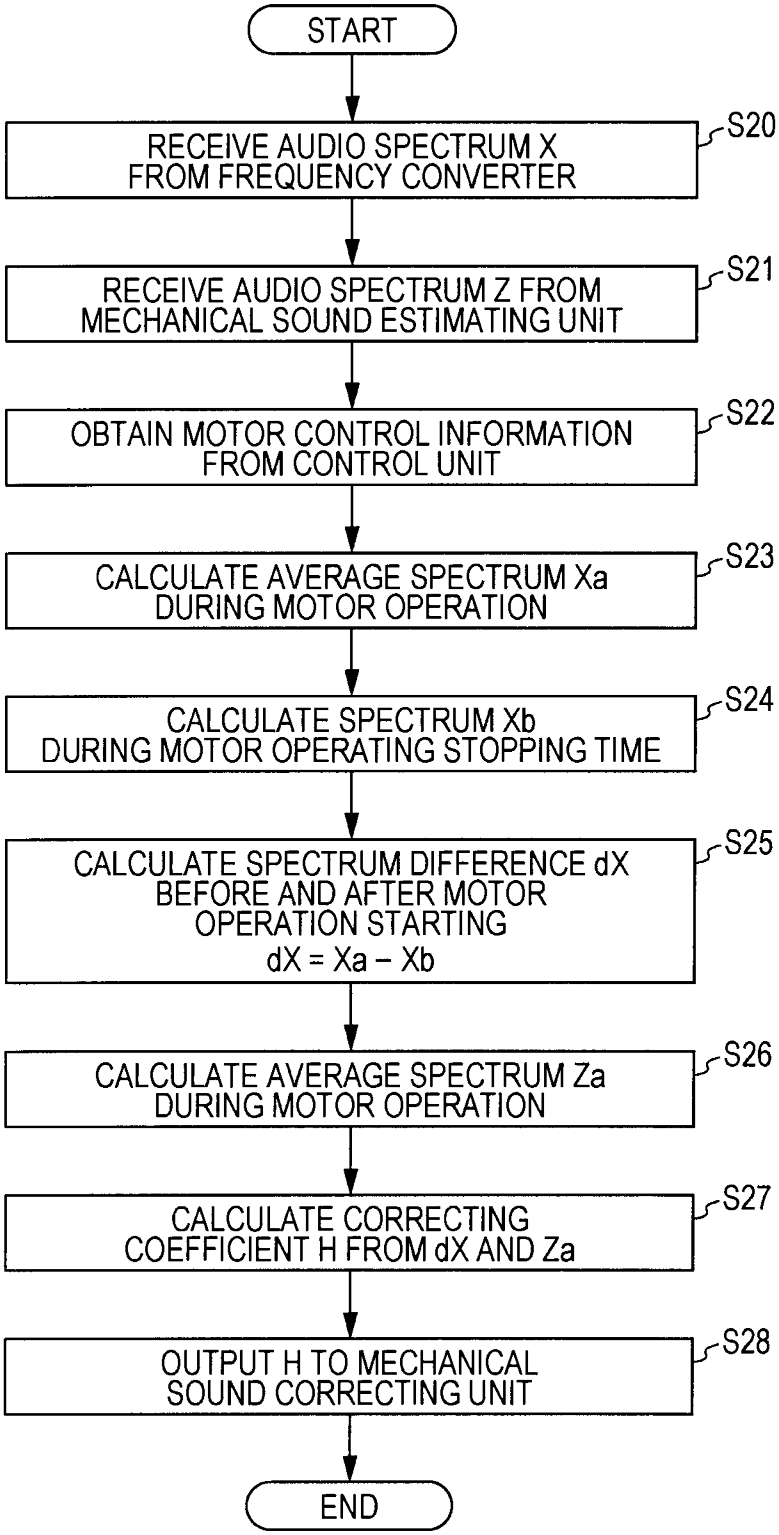
FIG. 11 is a flowchart describing basic operations of a mechanical sound correcting unit according to the embodiment.

Next, the basic operations of the mechanical sound correcting unit 63 according to the present embodiment will be described with reference to FIG. 11. FIG. 11 is a flowchart showing the basic operations of the mechanical sound correcting unit 63 according to the present embodiment. In the operating flow in FIG. 11, the correcting coefficient H for matching the estimated mechanical sound spectrum Z to the actual mechanical spectrum Zreal is calculated, based on changes to the spectrum form of the audio spectrum X before and after operation of the driving device 14 starts.

Note that according to the present embodiment, the stereo audio input using the two microphones 51 and 52 is the subject, whereby a dual system of audio signals, for Left channel and Right channel, is handled (see FIG. 2). Accordingly, the mechanical sound correcting units 63L and 63R are each provided corresponding to the two channels herein, and each independently processes the audio spectrum signals $X_L$ and $X_R$. Hereafter, for ease of description, unless stereo processing is of particular concern, the mechanical sound correcting unit 63 will be described with the two audio spectrum signals $X_L$ and $X_R$ collectively referred to as "audio spectrum X".

As shown in FIG. 11, first, the mechanical sound correcting unit 63 receives the audio spectrum X output from the frequency converter 61 (step S20), and receives the estimated mechanical sound spectrum Z output from the mechanical sound estimated unit 62 (step S21).

The mechanical sound correcting unit 63 determines whether or not the driving device 14 has started operating (step S22), based on the driving control information obtained from the control unit 70. For example, when the motor control information for the zoom motor 15 to start operating is input from the control unit 70, the mechanical sound correcting unit 63 detects the operation start of the zoom motor 15, and executes the calculating processing S23 through S27 of the correcting coefficient H below. An example wherein the driving device 14 is a zoom motor 15 will be described below, but the same is true with cases of other driving devices such as the focus motor 16 or the like.

Upon the zoom motor 15 having started to operate, first, the mechanical sound correcting unit 63 calculates the audio spectrum Xa which indicates the average frequency feature of the audio spectrum X during operation of the zoom motor 15 (step S23). The audio spectrum Xa is an average value of the audio spectrums during the time period that the zoom motor 15 is operating, whereby the mechanical sound components emitted from the zoom motor 15 and the desired sound components are included.

Next, the mechanical sound correcting unit 63 calculates an audio spectrum Xb which indicates the average frequency feature of the audio spectrum X during the time that the zoom motor 15 has stopped operating (step S24). The audio spectrum Xb is an audio spectrum of the time period wherein the zoom motor 15 is not operating, whereby the mechanical sound components are not included. Using the audio spectrum X immediately before operation of the zoom motor 15 as an audio spectrum Xb during the operation stopping time is sufficient. Thus, influence of change to the desired sound before and after the operation starting can be maximally removed.

Further, the mechanical sound correcting unit 63 calculates the difference dX between the audio spectrum Xa during motor operation which is calculated in S23 above and the audio spectrum Xb during motor operation stopped time which is calculated in S24 above (step S25). Specifically, the mechanical sound correcting unit 63 subtracts the audio spectrum Xb from the audio spectrum Xa to find the audio spectrum difference dX, as shown in Expression (3) below. The difference dX herein indicates change to the audio spectrum X before and after the zoom operation of the zoom motor 15 starting, and is equivalent to the frequency feature of the mechanical sound components indicated by the hashed region in FIG. 10.

$$dX = Xa - Xb \quad (3)$$

Next, the mechanical sound correcting unit 63 calculates the average estimated mechanical sound spectrum Za that indicates the average frequency feature of the estimated mechanical sound spectrum Z during operation of the zoom motor 15 (step S26).

Subsequently, the mechanical sound correcting unit 63 calculates the correcting coefficient H for correcting the estimated mechanical sound spectrum Z during operation of the zoom motor 15 (step S27), based on the average estimated mechanical spectrum Za calculated in S26. Next, the mechanical sound correcting unit 63 outputs the correcting coefficient H calculated in S36 to the mechanical sound reducing unit 64 (step S28).

The calculating processing of the correcting coefficient H by the mechanical sound correcting unit 63 is described above. Note that actually, the audio signals $x_L$, and $x_R$ are subjected to frequency conversation to obtain the audio spectrum signals $X_L$ and $X_R$, whereby the correcting coefficients $H_L(k)$ and $H_R(k)$ have to be calculated for each of the frequency components $X_L(k)$ and $X_R(k)$ of the audio spectrum signals $X_L$ and $X_R$. However, for ease of description, a flowchart for calculating the correcting coefficient H(k) for only one frequency component Z(k) of the estimated mechanical sound spectrum Z is used for the description. The same holds for the flowcharts in FIG. 12 and so forth.

1.4.3. Detail Operations of Mechanical Sound Correcting

Next, the operation details of the mechanical sound correcting unit 63 according to the present embodiment will be described with reference to FIGS. 12 through 16. An example of correcting the estimated mechanical sound in an audio signal power spectrum region will be described below.

Figure 12:
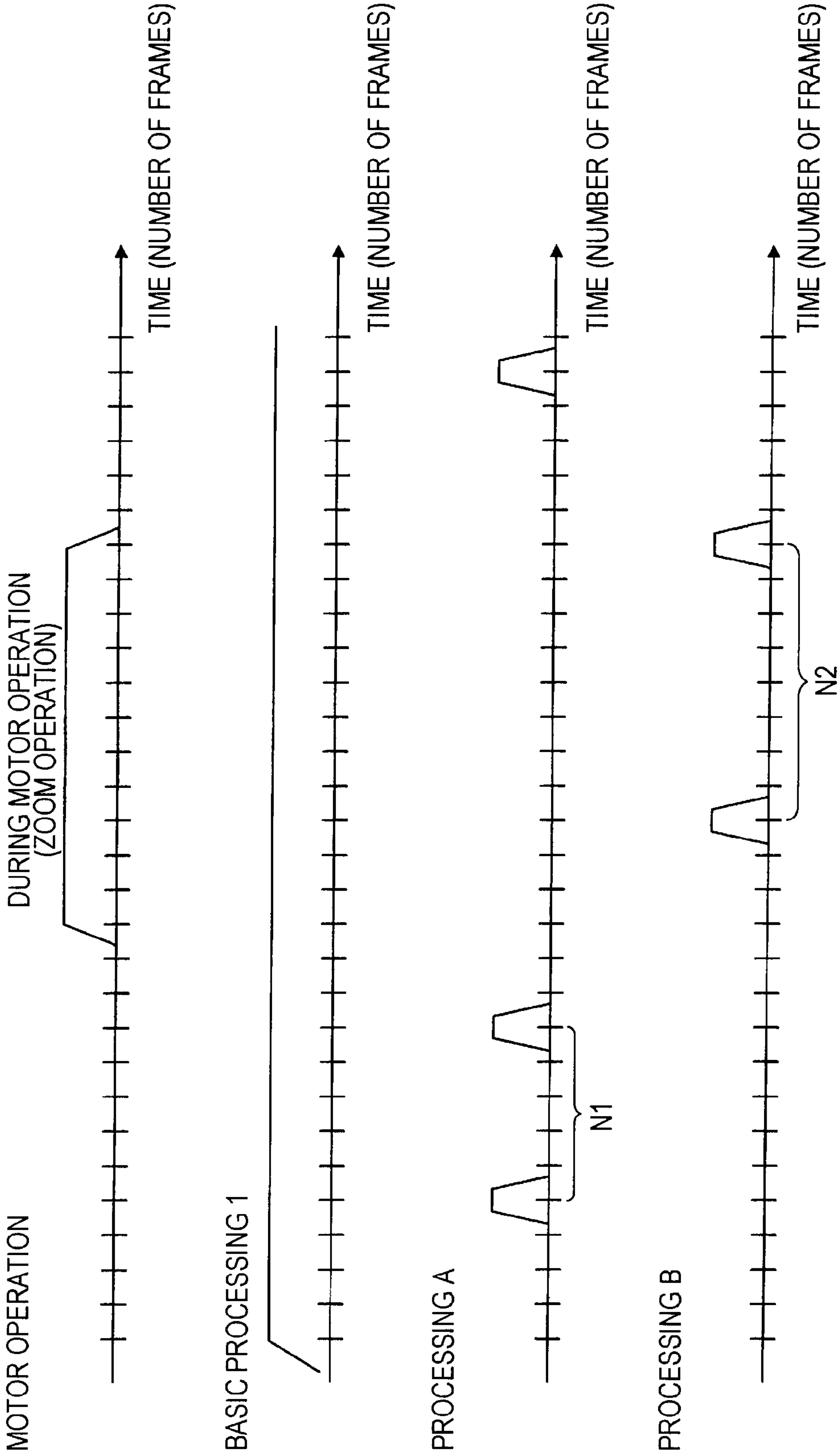
FIG. 12 is a timing chart illustrating operation timing of a mechanical sound correcting unit according to the embodiment.

FIG. 12 is a timing chart showing the operating timing of the mechanical sound correcting unit 63 according to the present embodiment. Note that audio signal processing device according to the present embodiment divides the audio signals $X_L$ and $X_R$ input from the microphones 51 and 52 into frame increments, and subjects the divided audio signals to frequency conversion processing (FFT) and mechanical sound reducing processing. The timing chart in FIG. 12 shows the above-mentioned frame on the temporal axis as a standard.

As shown in FIG. 12, the mechanical sound correcting unit 63 performs multiple processing (basic processing, processing A, processing B) concurrently. The basic processing is constantly performed during recording by the digital camera 1, regardless of the zoom motor 15 operation. The processing A is performed while the zoom motor 15 has stopped operating, for every N1 frames. The processing B is performed while the zoom motor 15 is operating, for every N2 frames.

Figure 13:
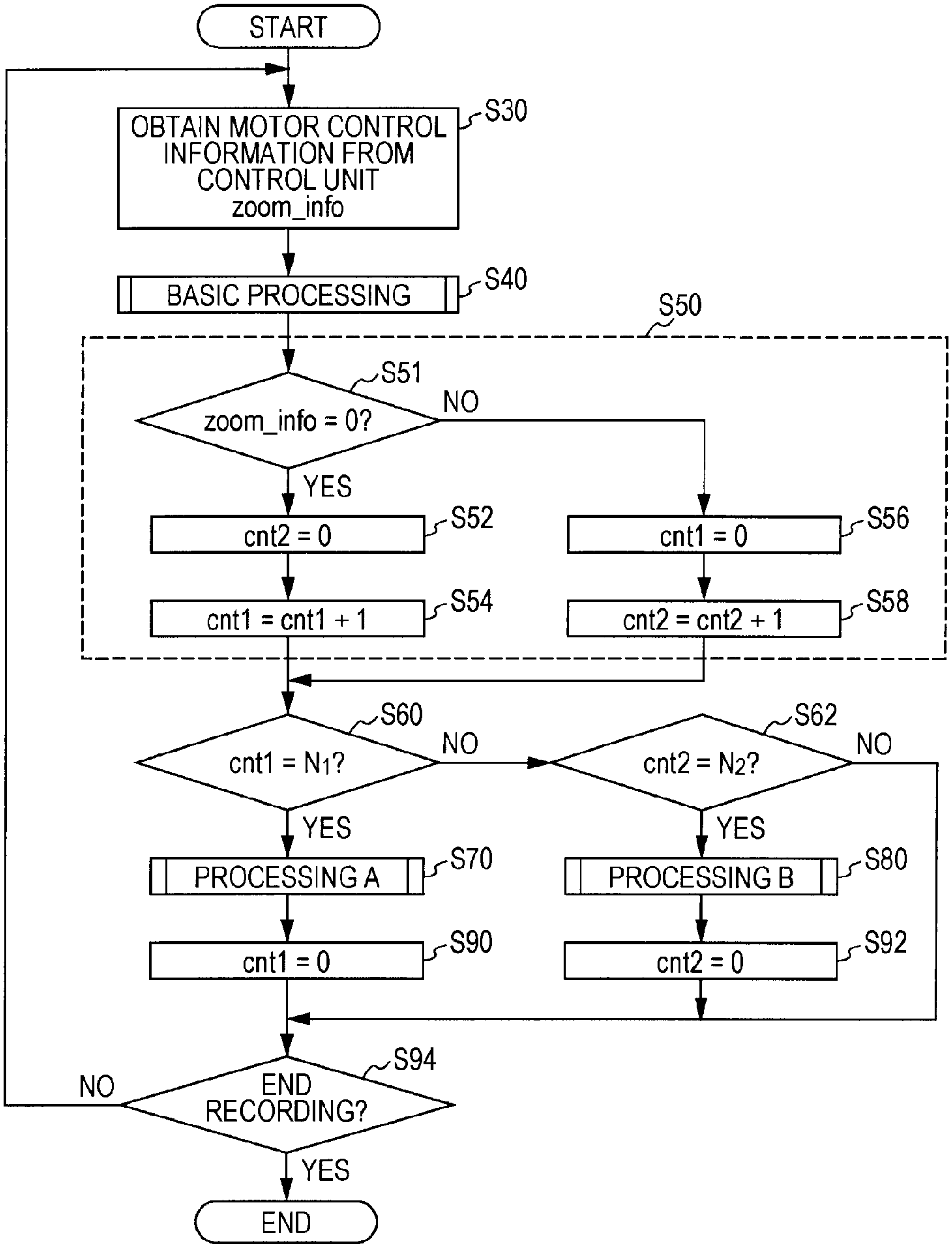
FIG. 13 is a flowchart describing overall operations of a mechanical sound correcting unit according to the embodiment.

Next, the operating flow of the mechanical sound correcting unit 63 will be described. FIG. 13 is a flowchart showing the overall operation of the mechanical sound correcting unit 63 according to the present embodiment.

As shown in FIG. 13, first, the mechanical sound correcting unit 63 obtains motor control information zoom_info that indicates the operational state of the zoom motor 15 (step S30). If the value of zoom_info is 1, the zoom motor 15 is in an operational state, and if the value of zoom_info is 0, the zoom motor 15 is in an operation stopped state. The mechanical sound correcting unit 63 can determine whether or not there is an operation of the zoom motor 15 (i.e. whether or not the zooming sound is emitted), from the motor control information zoom_info.

Next, the mechanical sound correcting unit 63 performs basic processing for every frame of the audio signal x (step S40). In the basic processing herein, the mechanical sound correcting unit 63 calculates the audio spectrum X corresponding to each frame of the audio signal x and the power spectrum of the estimated mechanical sound spectrum Z.

Figure 14:
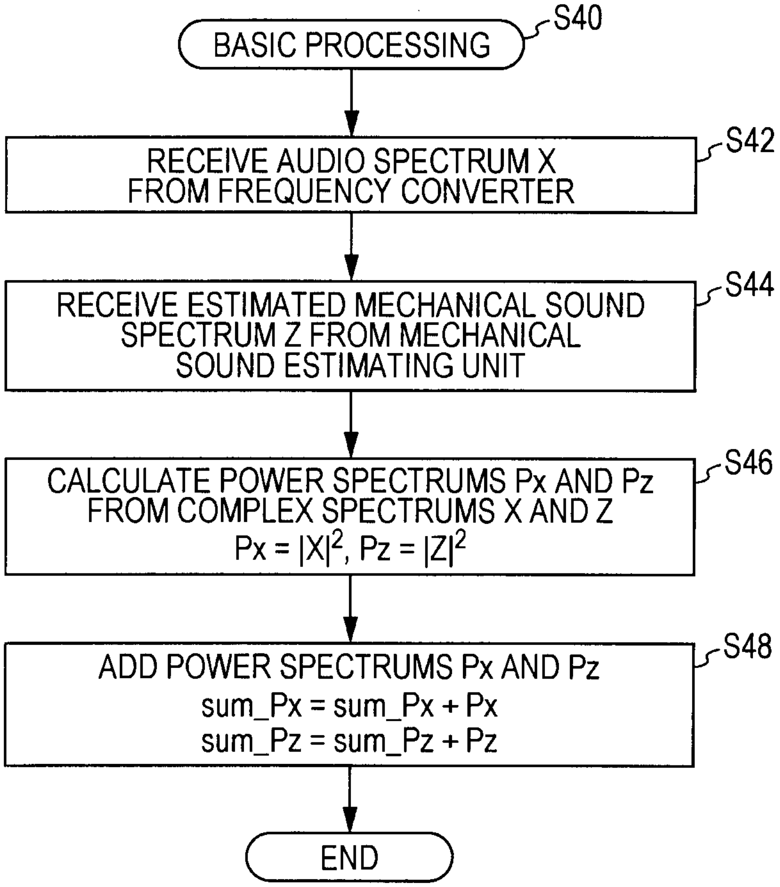
FIG. 14 is a flowchart describing a sub-routine of basic processing in FIG. 13.

FIG. 14 is a flowchart describing a sub-routine of the basic processing in FIG. 13. As shown in FIG. 14, first, the mechanical sound correcting unit 63 receives the audio spectrum X from the frequency converter 61 (step S42), and receives the estimated mechanical sound spectrum Z from the mechanical sound estimated unit 62 (step S44). The estimated mechanical sound spectrum Z is a spectrum signal of the estimated driving sound (motor sound) of the zoom motor 15.

Next, the mechanical sound correcting unit 63 squares the audio spectrum X, calculates the power spectrum Px of the audio spectrum X, squares the estimated mechanical sound spectrum Z, and calculates the power spectrum Pz of the estimated mechanical sound spectrum Z (step S46).

Further, the mechanical sound correcting unit 63 adds the power spectrum Px and Pz found in S46 to the integration value sum_Px of the power spectrum Px and the integration value sum_Pz of the power spectrum Pz, stored in the storage unit 631, respectively (step S48).

As shown above, with the basic processing, the integration value sum_Px of the power spectrum Px of the audio spectrum X and the integration value sum_Pz of the power spectrum Pz of the estimated mechanical sound spectrum Z are calculated for each frame of the audio signal x.

Returning to FIG. 13, in S50 the mechanical sound correcting unit 63 counts the number of frames that have performed the basic processing 40 (step S50). Specifically, in the counting processing herein, a number of processing frames cnt2 for during operation of the zoom motor 15 and a number of processing frames cnt1 while the operation of the zoom motor 15 is stopped are used. In the case that the zoom motor 15 has stopped operation (zoom_info=0) (step S51), the mechanical sound correcting unit 63 resets the cnt2 stored in the storage unit 631 to cnt2 (step S52), and adds 1 to the cnt1 stored in the storage unit 631 (step S54). On the other hand, in the case that the zoom motor 15 operating (zoom_info=1) (step S51), the mechanical sound correcting unit 63 resets the cnt1 stored in the storage unit 631 to zero (step S56), and adds the cnt2 stored in the storage unit 631 to 1 (step S58).

Next, in the case that the zoom motor 15 has stopped operation, and the number of processing frames cnt1 counted in S50 has reached a predetermined number of frames N1 (step S60), the mechanical sound correcting unit 63 performs processing A (step S70), and resets the cnt1 to zero (step S90). On the other hand, in the case that the cnt1 is less than N1, the processing in S30 through S50 is repeatedly performed, and the integration value sum_Px of the power spectrum Px of the audio spectrum X is updated.

Also, in the case that the zoom motor 15 is operating, and the number of processing frames cnt2 counted in S50 has reached a predetermined number of frames N2 (steps S60 and S62), the mechanical sound correcting unit 63 performs the processing B (step S80) and resets the cnt2 to zero (step S92). On the other hand, in the case that the cnt2 is less than N2, the processing in steps S30 through S50 are repeatedly performed, and the integration value sum_Px of the power spectrum Px of the audio spectrum x and the integration value sum_Pz of the power spectrum Pz of the estimated mechanical sound spectrum X are updated. The mechanical sound correcting unit 63 repeats the processing in step S30 through S92 until the recording has ended (step S94).

Figure 15:
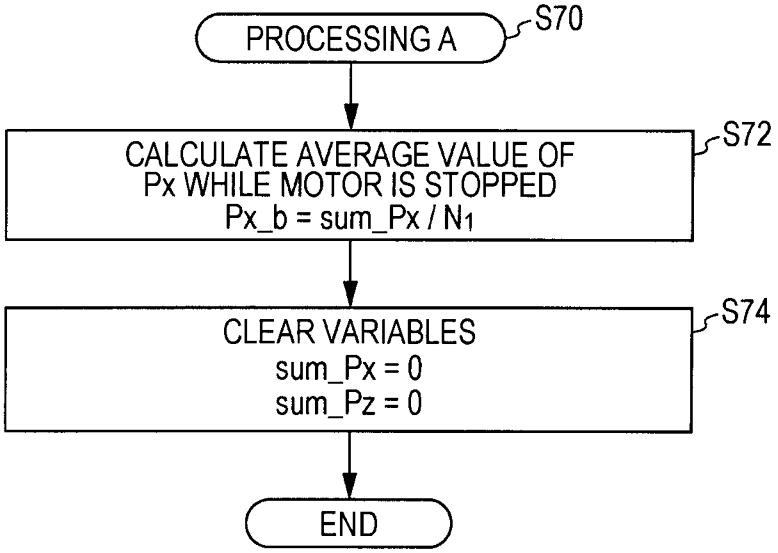
FIG. 15 is a flowchart describing a sub-routine of processing A in FIG. 13.

Now, the processing A performed while the zoom motor 15 has stopped operation (while the zooming sound is not emitted) will be described in detail. FIG. 15 is a flowchart showing a sub-routine of the processing A in FIG. 13.

As shown in FIG. 15, first, the mechanical sound correcting unit 63 divides the integration value sum_Px of the power spectrum Px of the audio spectrum X by the number of frames N1, thereby calculating the average value Px_b of the Px while the zoom motor 15 has stopped operation (step S72). The mechanical sound correcting unit 63 updates the average value Px_b stored in the storage unit 631 with the average value Px_b newly found in S72. Subsequently, the mechanical sound correcting unit 63 resets the integration value sum_Px and the integration value sum_Pz stored in the storage unit 631 to zero (step S74).

With the processing A herein, the average value Px_b of the power spectrum Px of the audio spectrum X is calculated for each of N1 frames of the audio signal x, constantly while the operation of the zoom motor 15 is stopped, and the Px_b stored in the storage unit 631 is updated to an average value Px_b of the newest N1 frames.

Figure 16:
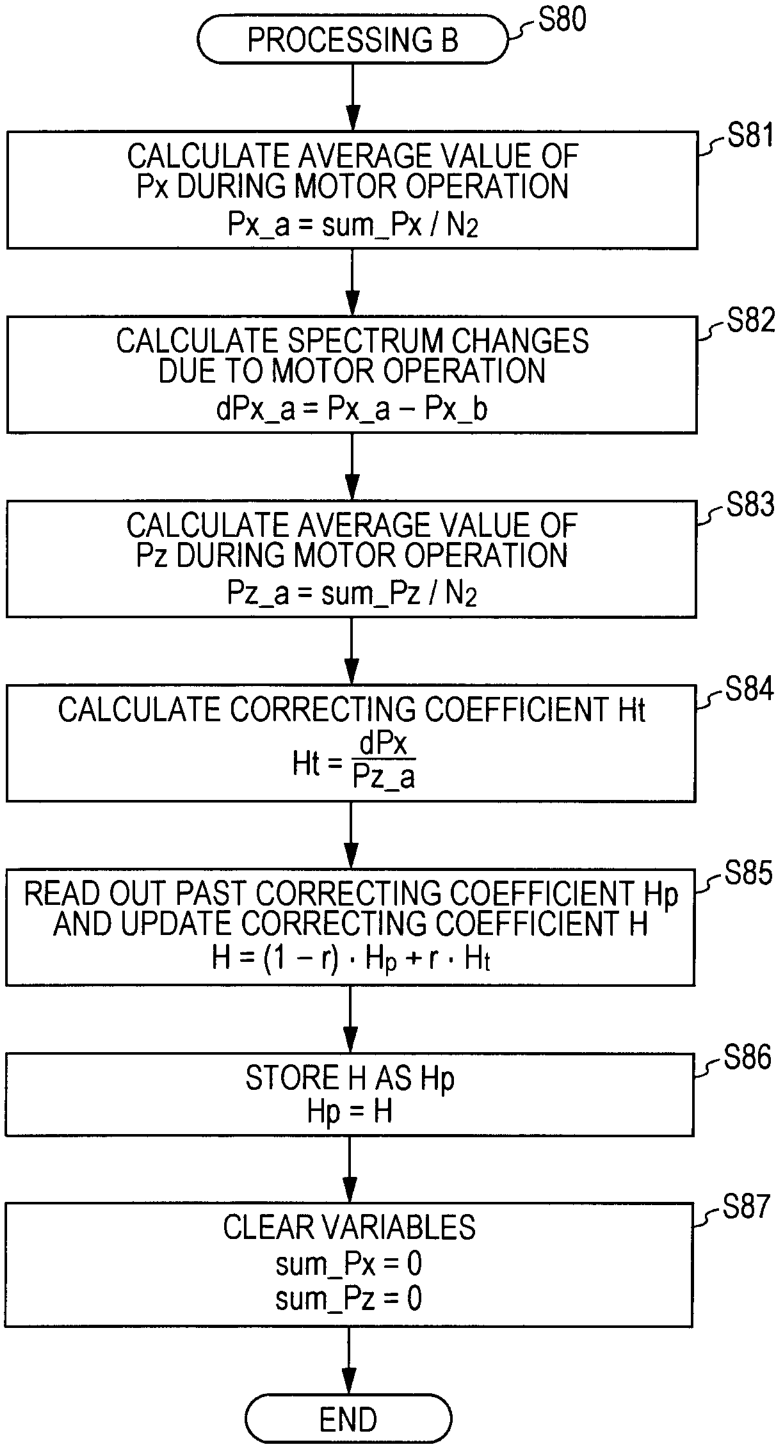
FIG. 16 is a flowchart describing a sub-routine of processing B in FIG. 13.

Next, processing B performed during operation of the zoom motor 15 (while the zooming sound is emitted) will be described in detail. FIG. 16 is a flowchart showing a sub-routine of the processing B in FIG. 13.

As shown in FIG. 16, first, the mechanical sound correcting unit 63 divides the integration value sum_Px of the power spectrum Px of the audio spectrum X by the number of frames N2, as shown in Expression (4) below, thereby calculating the average value Px_a of the Px during operation of the zoom motor 15 (step S81).

$$Px\_a = sum\_Px/N2 \qquad (4)$$

The mechanical sound correcting unit 63 updates the average value Px_a stored in the storage unit 631 to an average value Px_a found in S81. Thus, the average value Px_a of the power spectrum Px of the audio spectrum X of the nearest N2 frames are constantly stored in the storage unit 631 during operation of the zoom motor 15.

Next, the mechanical sound correcting unit 63 calculates the changes to the audio spectrum X before and after start of the operation of the zoom motor 15 (step S82). Specifically, as shown in Expression (5) below, the mechanical sound correcting unit 63 subtracts the average value Px_b of the power spectrum Px stored in the storage unit 631 in S72 from the average value Px_a of the power spectrum Px found in S81, and find an average difference dPx of the power spectrum before and after start of the operation of the zoom motor 15. The difference dPx is an example of the difference dX of the frequency features of the audio spectrum signals $X_L$ and $X_R$ before and after start of the operation of the driving device (see Expression (3) above), and indicates the frequency feature of the mechanical sound emitted by the operation of the driving device.

$$DPx = Px\_a - Px\_b \qquad (5)$$

Further, as shown in Expression (6), the mechanical sound correcting unit 63 divides the integration value sum_Pz of the power spectrum Pz of the estimated mechanical sound spectrum Z input from the mechanical sound estimating unit 62 during operation of the zoom motor 15 by the number of frames N2, thereby calculating the average value Pz_a of the Pz during operation of the zoom motor 15 (step S83). Note that the integration value sum_Pz is a value whereby the power spectrums Pz of the estimated mechanical sound spectrum Z for the N2 frames during operation of the zoom motor 15 are integrated.

$$Px\_z = sum\_Pz/N2 \qquad (6)$$

Next, as shown in Expression (7) below, the mechanical sound correcting unit 63 divides the Px_a found in S82 by the Pz_a found in S83, thereby calculating the current correcting coefficient Ht (step S84). Now, Ht is calculated here using the average value Pz_a of the power spectrum Pz of the estimated mechanical sound spectrum Z obtained during current operation, but Ht may be calculated using the average value of the power spectrum Pz of the estimated mechanical sound spectrum Z obtained during operation of the zoom motor 15 in the past.

$$Px\_z = sum\_Pz/N \qquad (7)$$

Further, the mechanical sound correcting unit 63 uses the current correcting coefficient Ht found in S84 and the correcting coefficient Hp found in the past to calculate the correcting coefficient H (step S85). Specifically, the mechanical sound correcting unit 63 reads out the past correcting coefficient Hp stored in the storage unit 631. The mechanical sound correcting unit 63 uses the smoothing coefficient r ($0<r<1$) to smooth the Hp and Ht, thereby calculating the correcting coefficient H, as shown in Expression (8) below. Thus, by smoothing the current correcting coefficient Ht and the past correcting coefficient Hp, influence from abnormal values of the audio spectrum X during individual zooming operations can be suppressed, whereby a correcting coefficient H having high reliability can be calculated.

$$H = (1-r)\cdot Hp + r\cdot Ht \qquad (8)$$

Subsequently, the mechanical sound correcting unit 63 stores the correcting coefficient H found in S85 as Hp in the storage unit 631 (step S86). Further, the integration value sum_Px and integration value sum_Pz stored in the storage unit 631 are reset to zero (step S87).

With the processing B described above, the difference dPx of the audio spectrums X before and after the motor operation and the average value Pz_a of the estimated mechanical sound spectrum Z during motor operation are calculated for each of N2 frames of the audio signal x, constantly during operation of the zoom motor 15. The correcting coefficient H corresponding to the newest N2 frames is calculated from the dPx and Pz_a, and the Hp stored in the storage unit 631 is updated to the newest correcting coefficient H.

The operation of the mechanical sound correcting unit 63 according to the present embodiment is described above. The mechanical sound correcting unit 63 herein repeats the calculation of the average value Px_b of the audio spectrum X for every predetermined number of frames N1, constantly, while the operation of the driving device 14 is stopped. Upon the driving device 14 starting operation, the calculation of the correcting coefficient H is repeated, based on the difference dPx between the average value Px_b of the audio spectrum X of N1 frames immediately before the operation and the average value Px_a of the audio spectrum X of predetermined number of N2 frames during operation.

Thus, the mechanical sound correcting unit 63 according to the present embodiment can adequately find the correcting coefficient H, based on changes in spectrum feature before and after the operation of the driving device 14, for each frequency component X(k) of the audio spectrum X. Accordingly, using this correcting coefficient H, the estimated mechanical sound spectrum Z estimated by the mechanical sound estimating unit 62 can be adequately corrected so as to match the actual mechanical sound spectrum Zreal, for each frequency component X(k) of the audio spectrum X.

1.5. Details of Mechanical Sound Reducing Unit

Next, a configuration and operation of a mechanical sound reducing unit 64 according to the present embodiment will be described.

1.5.1. Configuration of Mechanical Sound Reducing Unit

Figure 17:
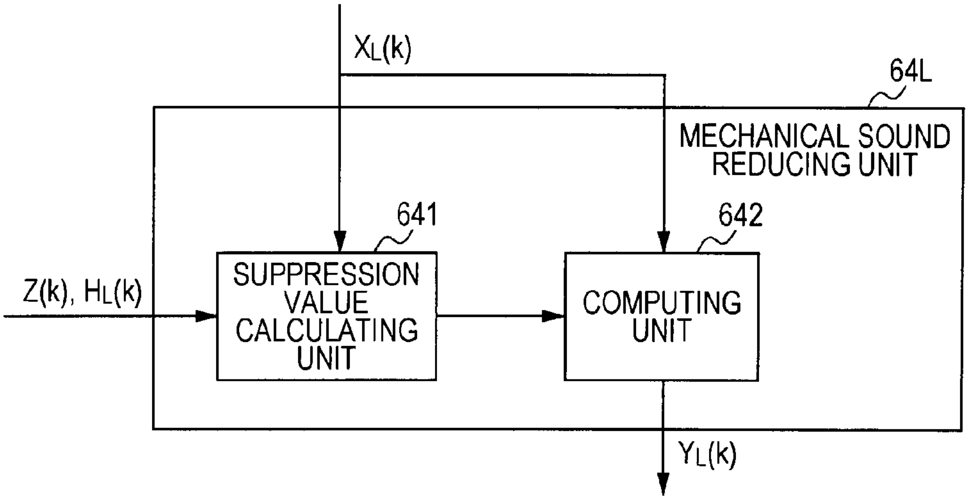
FIG. 17 is a block diagram illustrating a configuration of a mechanical sound reducing unit according to the embodiment.

First, a configuration of the mechanical sound reducing unit 64 according to the present embodiment will be described with reference to FIG. 17. FIG. 17 is a block diagram showing the configuration of the mechanical sound reducing unit 64 according to the present embodiment. Note that a configuration for a left channel mechanical sound reducing unit 64L will be described below, but a configuration for a Right channel mechanical sound reducing unit 64R will be substantially the same, so the detailed description thereof will be omitted.

As shown in FIG. 17, the mechanical sound reducing unit 64L has a suppression value calculating unit 641 and a computing unit 642. The audio spectrum signal $X_L$ is input into the suppression value calculating unit 641 from the Left channel frequency converter 61L, and the estimated mechanical sound spectrum signal Z and correcting coefficient $H_L$ are input from the mechanical sound correcting unit 63. The audio spectrum signal $X_L$ is input into the computing unit 642 from the Left channel frequency converter 61L.

The suppression value calculating unit 641 calculates a suppression value to remove the mechanical sound components from the audio spectrum signal $X_L$, based on the audio spectrum signal $X_L$, the estimated mechanical sound spectrum signal Z, and correcting coefficient $H_L$ (e.g. a suppression coefficient g to be described later). The computing unit 632 reduces the mechanical sound components from the audio spectrum signal $X_L$, based on the suppression value computed by the suppression value computing unit 641.

1.5.2. Operations of Mechanical Sound Reducing Unit

Figure 18:
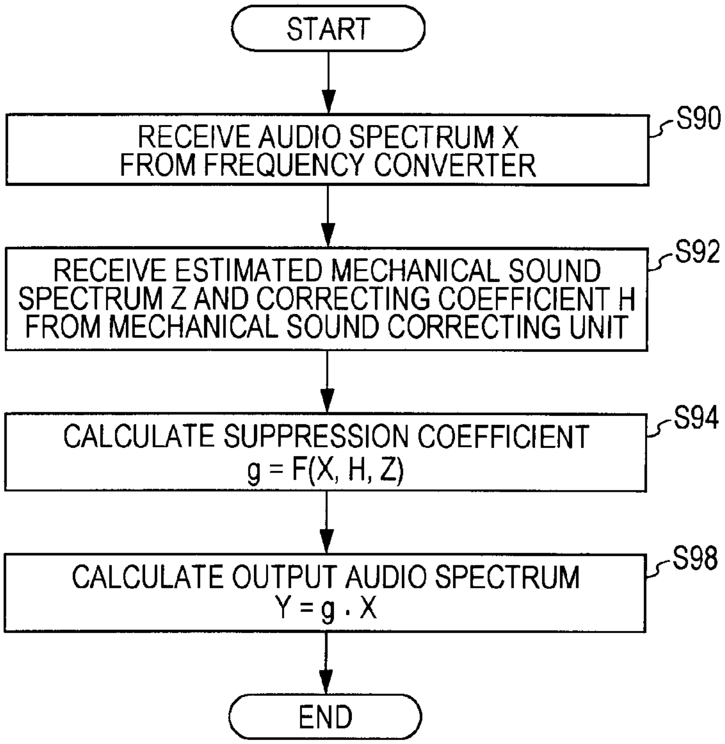
FIG. 18 is a flowchart describing operations of a mechanical sound reducing unit according to the embodiment.

Next, operations of the mechanical sound reducing unit 64 according to the present embodiment will be described with reference to FIG. 18. FIG. 18 is a flowchart describing the operations of the mechanical sound reducing unit 64 according to the present embodiment. Note that actually, the audio signals $x_L$, and $x_R$ are subjected to frequency conversion and the audio spectrum signals $X_L$ and $X_R$ are obtained, whereby the mechanical sound has to be reduced using the estimated mechanical sound spectrum Z(k) and correcting coefficient $H_L(k)$ and $H_R(k)$, for each of the frequency components $X_L(k)$ and $X_R(k)$ of the audio spectrum signals $X_L$ and $X_R$. However, for ease of description, a flowchart for removing the mechanical sound of one frequency component $X_L(k)$ and $X_R(k)$ is used for description.

For an audio signal processing device and method according to the present embodiment, the noise reduction method used for the mechanical sound reducing unit 64 is not particularly limited, and an optional noise reducing method in related art (e.g., Wiener filter, spectral subtraction method, etc) can be used. An example of a noise reduction method using a Wiener filter will be described below.

As shown in FIG. 18, first, the mechanical sound reducing unit 64 receives the audio spectrum X from the frequency converter 61 (step S90), and receives the estimated mechanical sound spectrum Z and correcting coefficient H from the mechanical sound correcting unit 63 (step S92).

Next, the mechanical sound reducing unit 64 calculates the suppression coefficient g, based on the audio spectrum x, the estimated mechanical sound spectrum Z, and correcting coefficient H (step S94). Details of the calculating processing for the suppression coefficient g will be described later.

Subsequently, the mechanical sound reducing unit 64 reduces the mechanical sound components from the audio spectrum X, based on the suppression coefficient g, and outputs an output audio spectrum Y (step S98). Specifically, the mechanical sound reducing unit 64 generates an output audio spectrum Y wherein the mechanical sound has been reduced, by multiplying the audio spectrum X by the suppression coefficient g.

$$Y=g\cdot X \tag{9}$$

Figure 19:
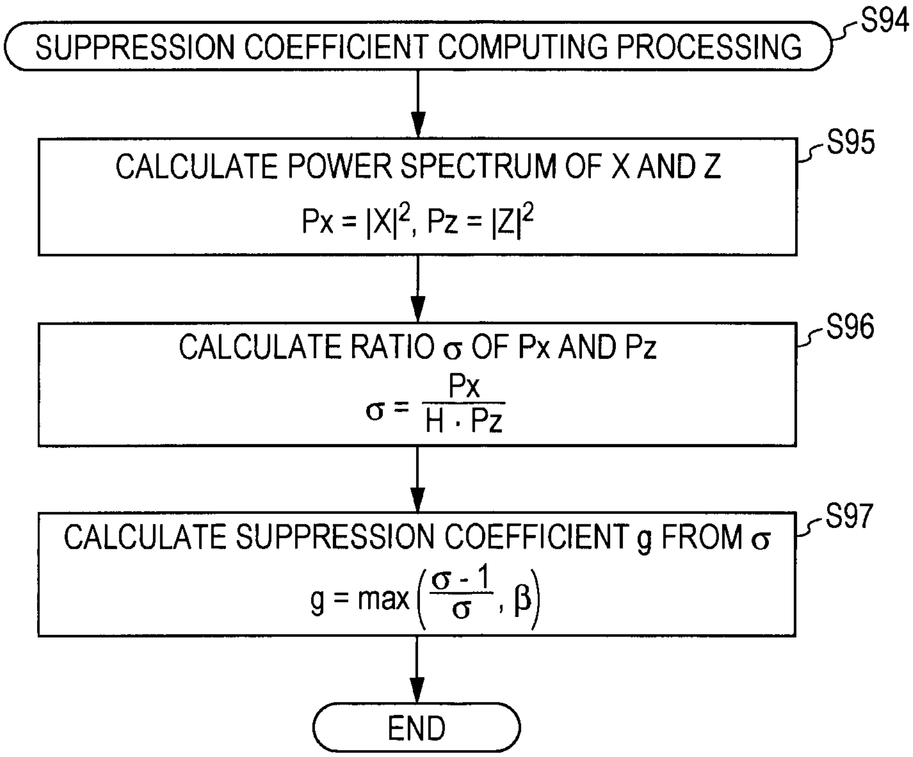
FIG. 19 is a flowchart describing a sub-routine of computing processing of a suppression coefficient g in FIG. 18.

FIG. 19 is a flowchart showing a sub-routine of the calculating processing S94 of the suppression coefficient g in FIG. 19. As shown in FIG. 19, first the mechanical sound reducing unit 64 squares the audio spectrum X, calculates the power spectrum Px of the audio spectrum X, squares the estimated mechanical sound spectrum Z, and calculates the power spectrum Pz of the estimated mechanical sound spectrum Z (step S95).

Next, the mechanical sound reducing unit 64 divides the power spectrum Px of the audio spectrum X by the power spectrum Pz of the estimated mechanical sound spectrum Z and the correcting coefficient H, thereby calculating the ratio σ of Px and Pz (step S96).

$$\Sigma=Px/(H\cdot Pz) \tag{10}$$

Subsequently, the mechanical sound reducing unit 64 uses the ratio σ found in S96 to calculate the suppression coefficient g (step S97). Specifically, the mechanical sound reducing unit 64 sets the larger value of {(σ−1)/σ} or β as the suppression coefficient g, as shown in Expression (11) below. Now, β is a flooring item, and is set so that the suppression coefficient g does not become a negative value. For example, β=0.1.

$$g=\max(\{(\sigma-1)/\sigma\},\beta) \tag{11}$$

Thus, when the audio spectrum X and estimated mechanical sound spectrum Z is input, the mechanical sound reducing unit 64 determines the suppression coefficient g according to the ratio σ of the power spectrum Px of X and the power spectrum Pz of Z. In the case that the mechanical sound is non-existent or extremely small, a becomes sufficiently larger, and g nears 1. Accordingly, the power spectrum of the output audio spectrum Y is approximately similar to the audio spectrum X. On the other hand, in the case that there is a mechanical sound, σ becomes smaller, and g nears an adjustment value β (e.g., β=0.1). Accordingly, the power spectrum of the output audio spectrum Y becomes smaller than the audio spectrum X. Note that the description above uses a function form of suppression coefficient g such as Expressions (10) and (110, but the value of g may be referenced from a preset suppression coefficient g look-up table, according to X and Z.

A signal processing device and method according to the present embodiment is described above. According to the present embodiment, the mechanical sound estimating unit 62 computes the audio spectrum X and estimates the estimated mechanical sound spectrum Z, based on the relative positions of the two microphones 51 and 52 and the driving device. Thus, mechanical sound that is emitted in accordance with imaging operations can be dynamically estimated during imaging and recording with a digital camera 1, without using a mechanical sound spectrum template as had been used in the past.

Further, the mechanical sound correcting unit 63 uses the change in frequency features of the audio spectrum X before and after starting the operation of the driving device 14, to adequately calculate the correcting coefficient H(k) for each of the individual frequency components X(k). Accordingly, with the correcting coefficient H(k), the various frequency components (k) of the estimated mechanical sound spectrum Z can be corrected so as to match the frequency components of the mechanical sound actually input in the microphones 51 and 52. Accordingly, the estimated mechanical sound spectrum Z after correction can be used to adequately remove the mechanical sound components from the audio spectrum X.

Thus, according to the present embodiment, the mechanical sound can be dynamically estimated and corrected during the imaging and recording operations by the digital camera 1, whereby different mechanical sounds can be accurately found for individual cameras, and sufficiently reduced. Also, even for the same camera, mechanical sounds that differ by operation of driving devices can be accurately found and sufficiently reduced.

2. Second Embodiment

Next, an audio signal processing device and audio signal processing method according to a second embodiment of the present disclosure will be described. The second embodiment differs from the first embodiment in the point that whether or not the correcting coefficient H should be calculated is determined by the change in the external audio (desired sound) before and after start of operation of the driving device 14. Other functional configurations of the second embodiments are substantially similar to the first embodiment, so the detailed descriptions thereof will be omitted.

2.1. Concept of Mechanical Sound Correcting

With the audio signal processing method according to the first embodiment described above, in the case that the driving device 14 such as the zoom motor 15 has operated for a certain amount of time, the correcting coefficient H is computed constantly. In the case that the sound environment in the periphery of the digital camera 1 has not changed between the operation stopping time and the operational time of the driving device 14, the method according to the first embodiment can favorably correct the estimated mechanical sound spectrum Z.

Figure 20A:
FIGS. 20A and 20B are waveform diagrams illustrating change to an audio signal according a second embodiment of the present disclosure.
Figure 20B:
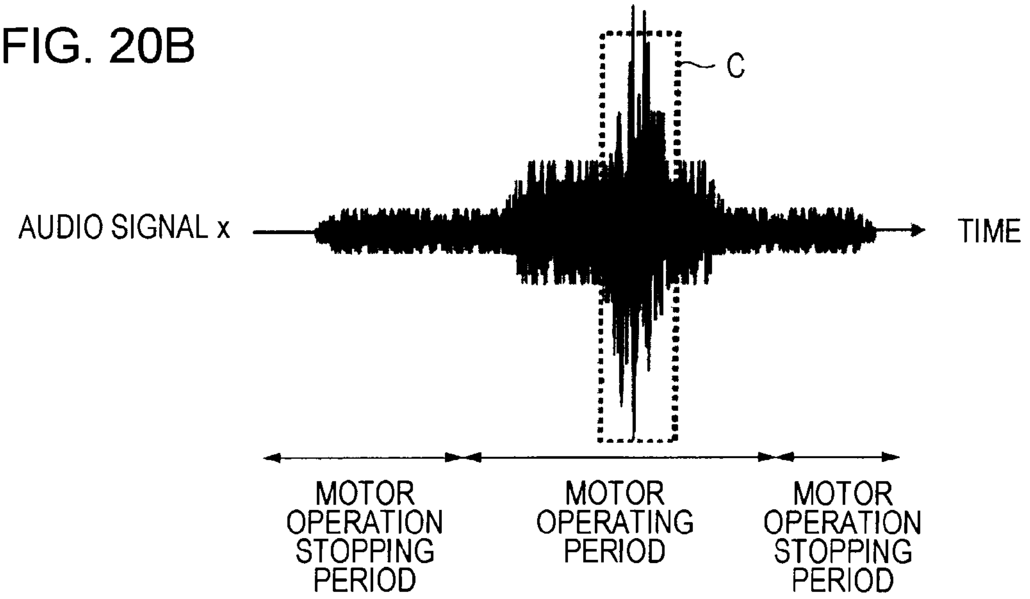

However, in an actual recording environment, as shown in FIGS. 20A and 20B, there are cases wherein external audio (desired sound) that had not existed before operation of the driving device 14 is emitted during the operation of the driving device 14. FIG. 20A shows a waveform of the audio signal x in the case that the external audio does not change before and after operation of the zoom motor 15, and FIG. 20B shows a waveform of the audio signal x in the case that the external audio changes before and after operation of the zoom motor 15. As shown in FIG. 20B, in the case that the external audio has changed before and after operation of the zoom motor 15, the change amount of external audio C is included in the audio signal x during the operational time.

Thus, in the case that external audio (desired sound) changes before and after operation of the driving device 14, not only the mechanical sound emitted from the driving device 14 but also the change amount of the external audio is included in the difference dX of the audio spectrum X before and after start of the operation. Accordingly, with a method to find the correcting coefficient H simply using the difference dX, influence from the change in external audio is not taken into consideration, whereby components other than the mechanical sound is included in the correcting coefficient H. As a result, the estimated mechanical sound spectrum Z is not adequately corrected, and not only the mechanical sound but also the change amount of the desired sound is also removed, thereby cause deterioration in sound quality. Accordingly, regarding handling cases in which the external audio changes, there is room for improvement of the first embodiment.

Thus, with the second embodiment, the above-mentioned problem is solved by adding a function to determine whether or not the correcting coefficient H should be updated, according to the change in the spectrum form of the external audio before and after start of operation of the driving device 14. Specifically, the mechanical sound correcting unit 63 has a function to determine whether or not the external audio spectrum has changed before and after operation of the driving device 14, and to determine whether or not the correcting coefficient H should be updated.

That is to say, when driving device 14 operates, the mechanical sound correcting unit 63 compares the frequency feature of the audio spectrum signals $X_L$ and $X_R$ before and after start of operation of the driving device 14 based on the two comparison results, and also compares the frequency features of the audio spectrum signals $X_L$ and $X_R$ during operation of the driving device 14. Further, the mechanical sound correcting unit 63 determines the degree of change to the external audio before and after start of operation of the driving device 14. In the case that the degree of change of the external audio is greater than a predetermined threshold, the mechanical sound correcting unit 63 determines that the correcting coefficient H will not be updated, and uses the correcting coefficient H found in up to the previous operation of the driving device 14, without updating. On the other hand, in the case that the degree of change of the external audio is smaller than a predetermined threshold, the mechanical sound correcting unit 63 determines that the correcting coefficient H will be updated, and uses the correcting coefficient H found in up to the previous operation of the driving device 14, and the correcting coefficient $H_t$ found during the current time, and updates the correcting coefficient H.

Figure 21A:
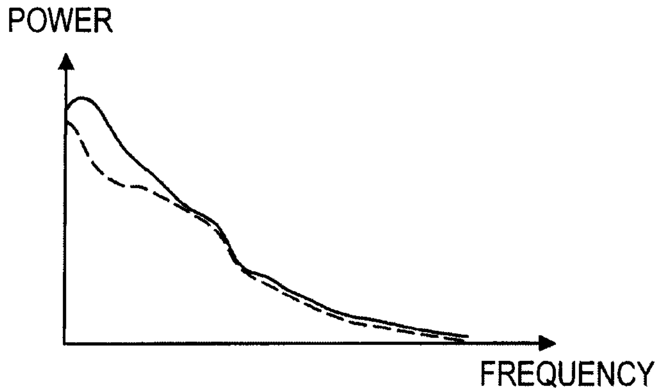
FIGS. 21A through 21C are an explanatory diagrams describing features of a mechanical sound according to the second embodiment.
Figure 21B:
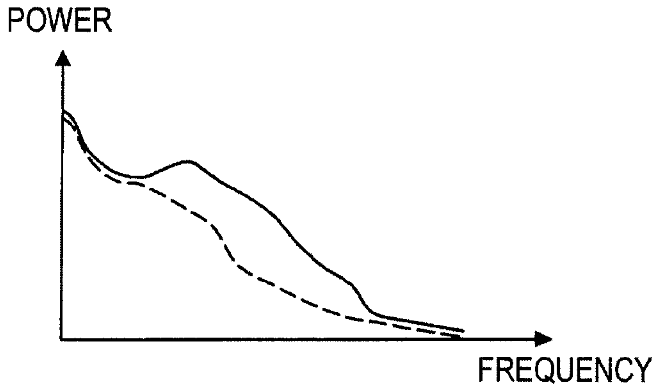
Figure 21C:
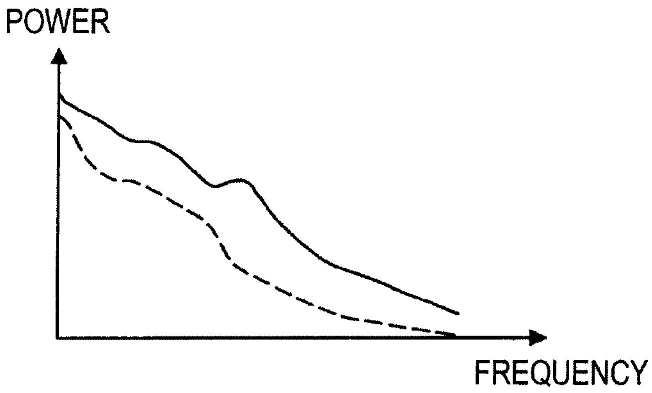

Thus, in order to find the correcting coefficient H according to the degree of change of external audio, with the second embodiment, as shown in FIGS. 21A through 21C, the mechanical sound feature is divided into three patterns and change to the external audio is detected.

FIG. 21A shows an audio spectrum distribution in the case that the frequency feature of the mechanical sound emitted from the zoom motor 15 is primarily a low band (e.g. 0 to 1 kHz), FIG. 21B shows a case that the frequency feature of the mechanical sound is primarily a mid-range or above (e.g. 1 kHz or greater), and FIG. 21C shows a case that the frequency feature of the mechanical sound is spread over all frequency bands. The solid lines in FIGS. 21A through 21C show an average value of the audio spectrum X measured during the operational time of the zoom motor 15, and the dotted lines in FIGS. 21A through 21C show an average value of the audio spectrum X measured during operation stopping time of the zoom motor 15.

In the second embodiment, mechanical sound reduction is realized without using a mechanical sound template obtained from measurement results of multiple digital cameras 1 as had been done in the past, but as shown in FIGS. 21A through 21C, knowledge obtained beforehand relating to the feature of the mechanical sound emitted with the digital camera 1 (e.g. mechanical sound frequency feature found from measurement of several cameras) is used. In this case, the audio spectrum X of the mechanical sound emitted by several digital cameras 1 has to be measured, but the number of cameras to measure does not have to be a number great enough to create a mechanical sound template, and several cameras will be sufficient. If whether the frequency feature of the mechanical sound is primarily of a low band, mid/high band, or all bands can be found beforehand, determining processing by mechanical sound frequency feature such as described below can be performed.

An overview of a detection method of change in external audio in the three cases of FIGS. 21A through 21C will be described with reference to FIGS. 22 through 24.

(A) Case wherein the mechanical sound frequency band is a low band (FIG. 21A)

Figure 22:
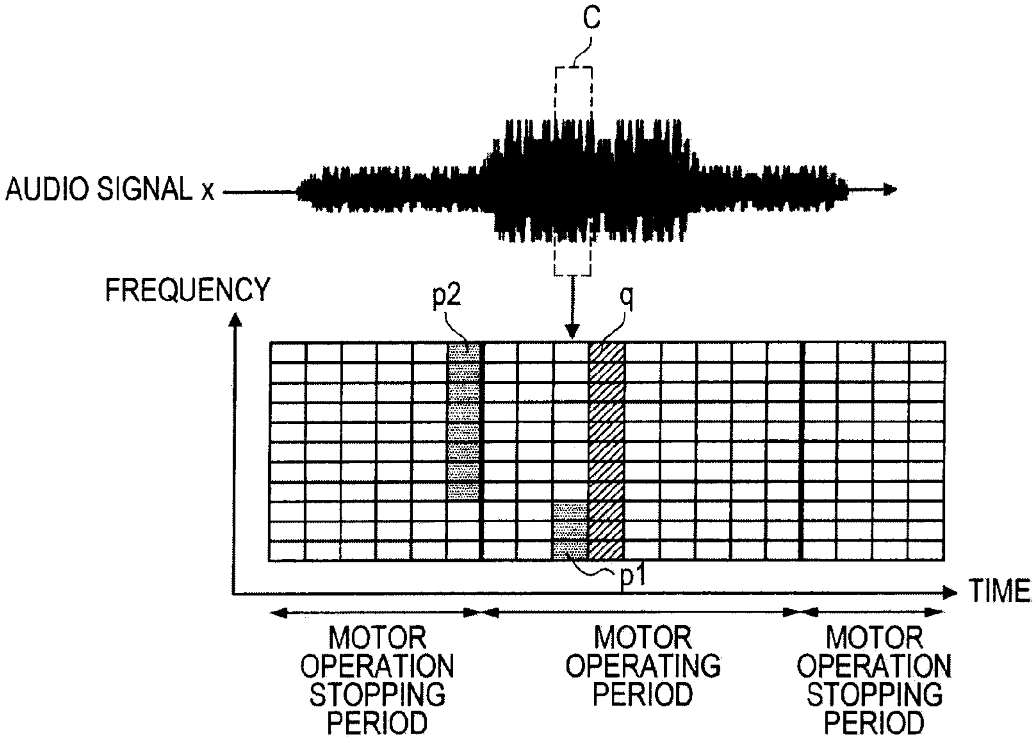
FIG. 22 is an explanatory diagram describing comparative processing in the case that the frequency band of the mechanical sound is a low band, according to the second embodiment.
Figure 23:
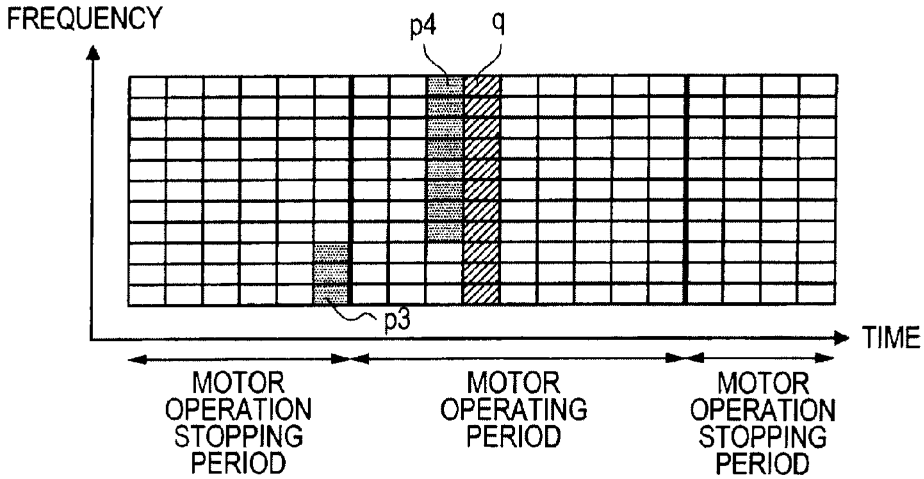
FIG. 23 is an explanatory diagram describing comparative processing in the case that the frequency band of the mechanical sound is a medium or high frequency band, according to the second embodiment.

As shown in the upper diagram of FIG. 22, in the case that the mechanical sound frequency band is primarily a low band, as long as the external audio (periphery sound environment) does not change during operation of the zoom motor 15, the low band spectrum form (mechanical sound components) of the audio signal x is approximately the same form during motor operation. Also, the spectrum form of mid-range or greater of the audio signal x (desired sound component) does not change before and after start of the motor operation.

The mechanical sound correcting unit 63 relating to the present embodiment converts the input audio signal x into temporal frequency components, and with a certain amount of increments as a block, performs comparison processing for each block. For example, as shown in the lower diagram in FIG. 22, the mechanical sound correcting unit 63 compares a low band spectrum form p1 of during motor operation, a medium band spectrum form p2 of immediately prior to starting motor operation, and a current spectrum form q in a focus block C, and calculates the degree of change of q as to p1 and p2. In the case that the low band components of the low band spectrum form p1 during motor operation and the current spectrum form q are similar, and the medium band components of the medium band spectrum form p2 of before motor operation and the current spectrum form q are similar, the mechanical sound correcting unit 63 determines that change in the periphery sound environment before and after start of operation of the zoom motor 15 (degree of change of external audio) is small. If, during the time of motor operation, the external audio has changed, one or the other of the degree of change of q as to p1, and change degree of q as to p2, should become greater.

The mechanical sound correcting unit 63 thus finds the degree of change of external audio from the comparison results of the low band components of two blocks during motor operation, and from the comparison results of the medium band components of two blocks before and after the start of motor operation. In the case that the degree of change is small, the mechanical sound correcting unit 63 updates the correcting coefficient H, similar to the first embodiment, and on the other hand, in the case that the degree of change is great, the mechanical sound correcting unit 63 uses the data obtained with the current block C and does not update the correcting coefficient H.

(B) Case wherein the mechanical sound frequency band is a medium band or higher (FIG. 21B)

Similarly, in the case that the mechanical sound frequency band is primarily a medium band or higher, as long as the external audio (periphery sound environment) does not change during operation of the zoom motor 15, the spectrum form (mechanical sound components) of a medium band or higher of the audio signal x is approximately the same form during motor operation. Also, a low band spectrum form of the audio signal x (desired sound component) does not change before and after start of the motor operation.

Now, the mechanical sound correcting unit 63 according to the present embodiment compares a low band spectrum form p3 of immediately prior to motor operation start, medium band spectrum form p4 of during motor operation, and a current spectrum form q in a focus block C, and calculates the degree of change of q as to p3 and p4. In the case that the low band components of p3 and q are similar, and the medium band components of p4 and q are similar, the mechanical sound correcting unit 63 determines that the change in periphery sound environment before and after start of operation of the zoom motor 15 (degree of change of external audio) is small. If, during the time of motor operation, the external audio has changed, one or the other of the degree of change of q as to p3, and degree of change of q as to p4, should become greater.

Thus, the mechanical sound correcting unit 63 finds the degree of change of external audio from the comparison results of the low band components of two blocks before and after the start of motor operation, and from the comparison results of the medium band components of two blocks during motor operation. In the case that the degree of change is small, the mechanical sound correcting unit 63 determines that there is no change to the external audio, and updates the correcting coefficient H, similar to the first embodiment. On the other hand, in the case that the degree of change is great, the mechanical sound correcting unit 63 determines that there is change to the external audio, and uses the data obtained with the current block C and does not update the correcting coefficient H.

(C) Case wherein the mechanical sound frequency band is a spread over all bands (FIG. 21C)

In the case that the mechanical sound frequency band is spread over all bands from low band to high band, as long as the external audio (periphery sound environment) does not change during operation of the zoom motor 15, the spectrum form of the audio signal x is approximately the same form during motor operation.

Figure 24:
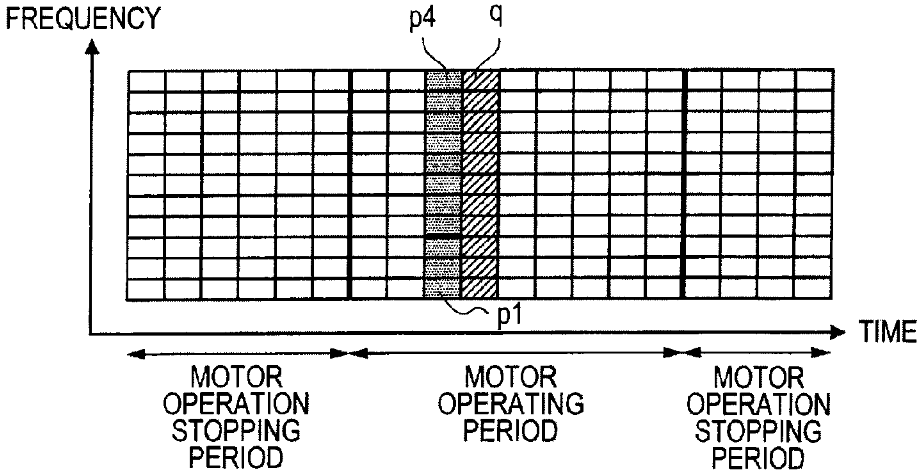
FIG. 24 is an explanatory diagram describing comparative processing in the case that the frequency band of the mechanical sound is all bands, according to the second embodiment.

Now, with the mechanical sound correcting unit 63 according to the present embodiment, as shown in FIG. 24 for example, the mechanical sound correcting unit 63 compares a low band spectrum form p1 of during motor operation, medium band spectrum form p4 of during motor operation, and a current spectrum form q in a focus block C, and calculates the similarity of p1 and q, and the similarity of p4 and q. In the case that the low band components of p1 and q are similar, and the medium band components of p4 and q are similar, the mechanical sound correcting unit 63 determines that the change in periphery sound environment during operation of the zoom motor 15 (degree of change of external audio) is small. If, during the time of motor operation, the external audio has changed, one or the other of the similarity of p3 and q and the similarity of p4 and q, should become greater.

Thus, the mechanical sound correcting unit 63 finds the degree of change of external audio from the comparison results of the low band components of two blocks while the motor operation is started, and from the comparison results of the medium/hand band components of two blocks during motor operation. In the case that the degree of change is small, the mechanical sound correcting unit 63 updates the correcting coefficient H, similar to the first embodiment. On the other hand, in the case that the degree of change is great, the mechanical sound correcting unit 63 uses the data obtained with the current block C and does not update the correcting coefficient H.

2.2. Operation of Mechanical Sound Correcting

Next, an operation example in the case of determining whether or not the correcting coefficient H should be updated, with the mechanical sound correcting unit 63 according to the second embodiment, according to the change to the periphery sound environment (degree of change of external audio) will be described with reference to FIGS. 25 through 27. A processing example in the case that the mechanical sound has the feature (A) shown in FIG. 21A will be described, but cases of other features can be similarly performed.

Figure 25:
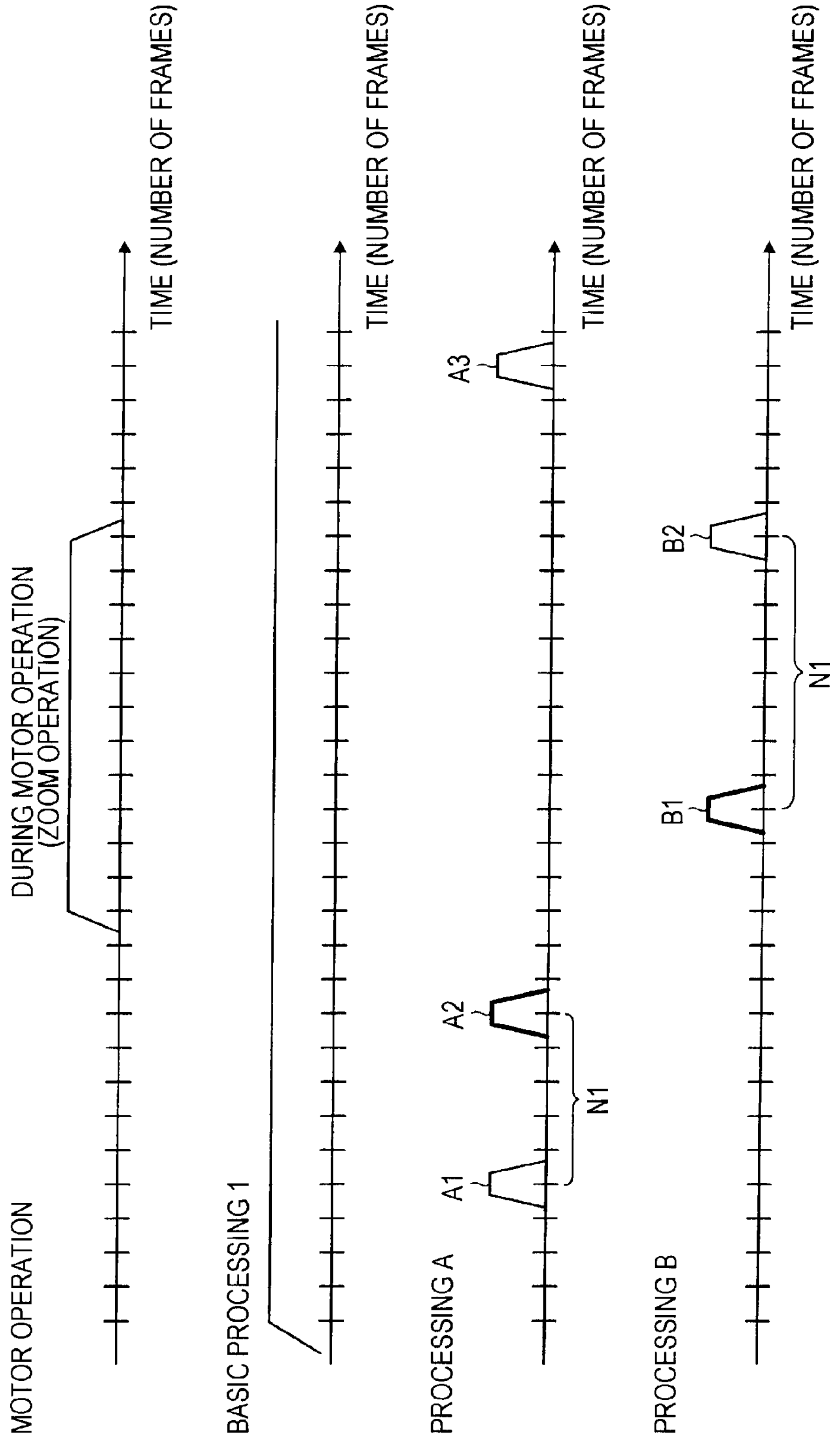
FIG. 25 is a timing chart illustrating operational timing of a mechanical sound correcting unit according to the second embodiment.

FIG. 25 is a timing chart showing the operation timing of the mechanical sound correcting unit 63 according to the second embodiment. Note that the timing chart in FIG. 25 also shows the above-mentioned frame as a standard on the temporal axis, similar to FIG. 12.

As shown in FIG. 25, the operating timing of the mechanical sound correcting unit 63 according to the second embodiment is similar to the case of the above-described first embodiment (see FIG. 12), and the basic processing, processing A, and processing B are performed concurrently. The mechanical sound correcting unit 63 executes processing A while the motor operation is stopped and executes processing B while the motor is operating, while constantly performing the basic processing. However, in the event of performing determining processing according to the degree of change of the above-described external audio with the timing of the processing B2 in FIG. 25, the mechanical sound correcting unit 63 uses an average power spectrum obtained with processing A2 and processing B1.

Also, the basic operating flow of the mechanical sound correcting unit 63 according to the second embodiment is similar to the first embodiment (see FIG. 13), and the operating flow of the basic processing and processing A is similar to the first embodiment (see FIGS. 14 and 15). However, in the second embodiment, specific processing content of processing B differs from the first embodiment.

Next, the processing B which is performed during operation of the zoom motor 15 (while zooming sound is emitted) will be described in detail with reference to FIGS. 26 and 27. FIG. 26 is a flowchart describing a sub-routine of the processing B in FIG. 13.

Figure 26:
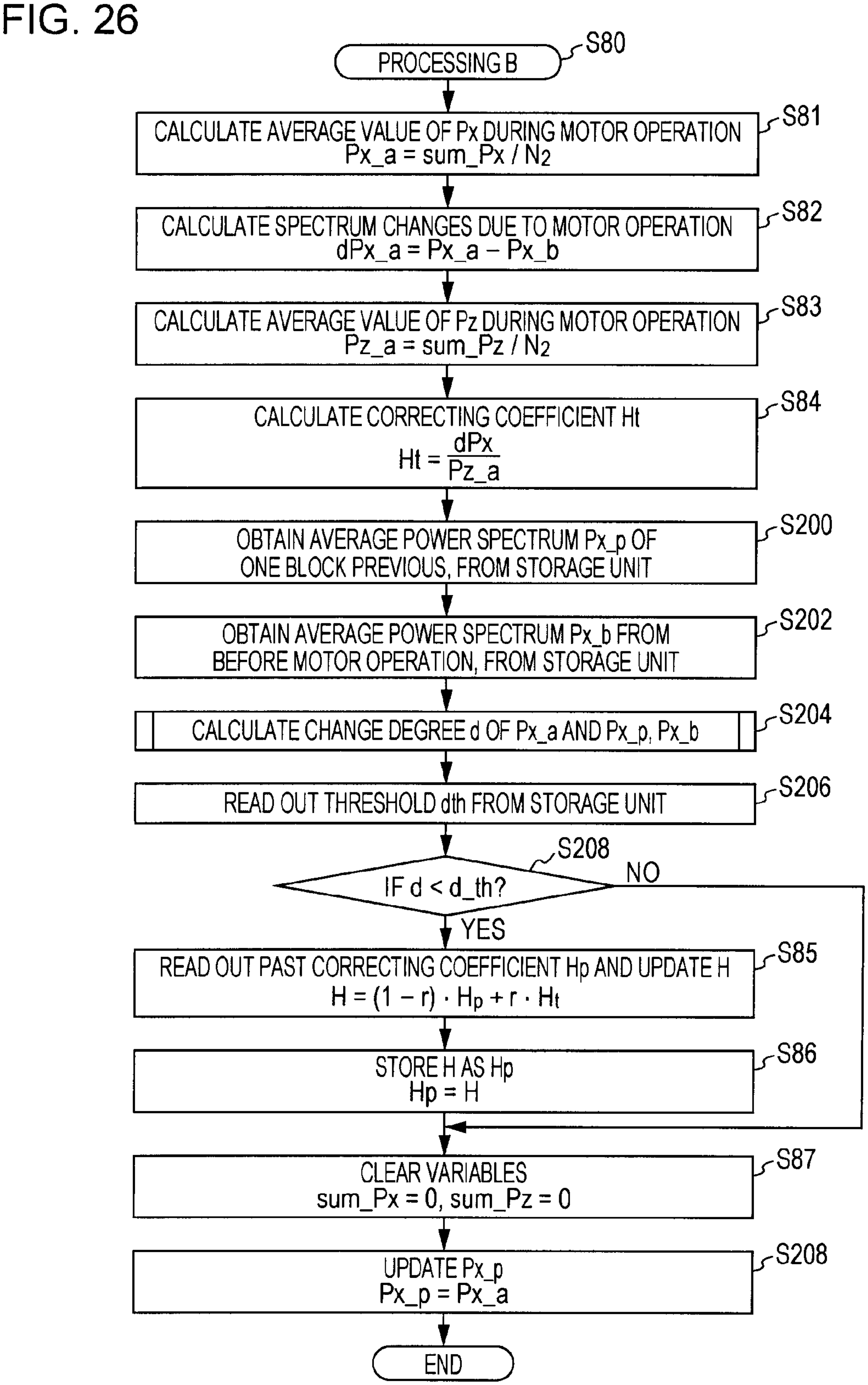
FIG. 26 is a flowchart describing the sub-routine of processing B in FIG. 13.

As shown in FIG. 26, the mechanical sound correcting unit 63 calculates an average value Px_a of the power spectrum Px of the audio spectrum X during operation of the zoom motor 15 (step S81), and calculates a difference dPx of the X before and after operation of the zoom motor 15 (step S82). Further, the mechanical sound correcting unit 63 calculates an average value Pz_a of the power spectrum Pz of the estimated mechanical sound spectrum Z during operation of the zoom motor 15 (step S83), and calculates a correcting coefficient H1 using the dPx and Pz_a (step S84).

The steps S81 through S84 above are similar to the first embodiment. Steps S200 through S208 are processing features of the second embodiment.

Next, the mechanical sound correcting unit 63 reads out and obtains the average value Px_of the power spectrum Px in the previous block (hereafter called previous average power spectrum Px_p) (step S200). Further, the mechanical sound correcting unit 63 reads out and obtains the average value Px_b of the power spectrum Px immediately prior to start of operation of the zoom motor 15 (hereafter called average power spectrum Px_b immediately prior to operation) (step S202). As shown in FIG. 25, in processing B2, the Px_p which is the Px_a found in processing B1 and the Px_b found in processing A2 immediately prior to the start of motor operation are used.

Next, for each frequency component, the Px_a found in S81 and the Px_p and Px_b obtained in S200 and S202 are compared, and based on the comparison results thereof, the degree of change d of Px_a as to Px_p and Px_b (degree of change of external audio) is calculated (step S204).

Now, the calculation processing of the degree of change d in S204 will be described in detail with reference to FIG. 27. FIG. 27 is a flowchart showing a sub-routine of the calculating processing S204 of the degree of change d in FIG. 26.

Figure 27:
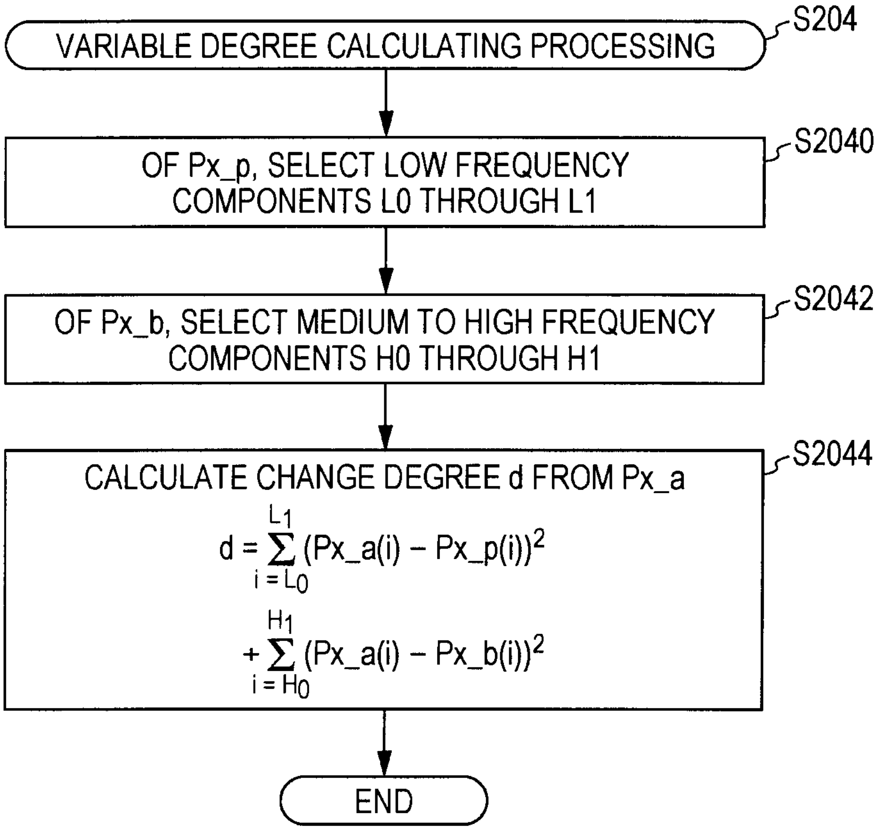
FIG. 27 is a flowchart describing a sub-routing of computing processing of the degree of change d in FIG. 26.

As shown in FIG. 27, first, the mechanical sound correcting unit 63 selects the low band frequency components $L_0$ through $L_1$ from the previous average power spectrum Px_p obtained in S200 (step s2040). As described above, with the present embodiment, the audio spectrum X and estimated mechanical sound spectrum Z are divided by frequency component into L number of blocks, and processed. In the present step S2040, the mechanical sound correcting unit 63 extracts blocks from the $L_0$th to the $L_1$th included in the low frequency band (e.g. less than 1 kHz) from the L number of blocks dividing the previous average power spectrum Px_p.

Similarly, the mechanical sound correcting unit 63 selects medium/high band frequency components $H_0$ through $H_1$ from the average power spectrum Px_b immediately prior to operation, obtained in S202 (step s2042). In the present step S2042, the mechanical sound correcting unit 63 extracts blocks from the $H_0$th to the $H_1$th included in the medium/high frequency band (e.g. 1 kHz or greater) from the L number of blocks dividing the average power spectrum Px_b immediately prior to operation.

Subsequently, the mechanical sound correcting unit 63 computes the low band frequency components $L_0$ through $L_1$ of Px_p and the medium/high band frequency components $H_0$ through $H_1$ of Px_b, thereby finding the degree of change d of Px_a as to Px_p and Px_b (degree of change of external audio) (step S2044). The degree of change d shows the degree of change of external audio during motor operation.

$$d = \sum_{i=L_0}^{L_1} (\mathrm{Px\_a}(i) - \mathrm{Px\_p}(i))^2 + \sum_{i=H_0}^{H_1} (\mathrm{Px\_a}(i) - \mathrm{Px\_b}(i))^2 \tag{12}$$

Returning to FIG. 26, after S204, the mechanical sound correcting unit 63 reads out the threshold dth of the preset degree of change d from the storage unit 631 (step S208), and determines whether or not the degree of change found in S204 is less than the threshold dth (step S210).

As a result, in the case of d<dth, there may not be much change to the external audio during motor operation. Thus, in this case, similar to the first embodiment, the mechanical sound correcting unit 63 uses the current correcting coefficient Ht found from the block to be processed in S84, updates the correcting coefficient H (step S85), stores in the storage unit 631 as Hp (step S86), and resets the integration value sum_Px and integration value sum_Pz stored in the storage unit 631 to zero (step S87).

On the other hand, in the case of d≥dth, there is likely change to the external audio during motor operation. Thus, in this case, the mechanical sound correcting unit 63 uses the current correcting coefficient Ht found from the block to be processed in S84, and performs the processing in S87 without updating the correcting coefficient Ht. Thus, in the case that the spectrum of the external audio has changed during motor operation, the Px_a of the block thereof can be removed from the calculation of the correction coefficient H, as an abnormal value.

Subsequently, the mechanical sound correcting unit 63 updates the past average spectrum x_p stored in the storage unit 631 to the average power spectrum Px_a found in S81. Thus, the newest average power spectrum Px_a is constantly stored in the storage unit 631 during operation of the zoom motor 15.

The operating flow of the mechanical sound correcting unit 63 according to the second embodiment is described above. The present embodiment has the following advantages, in addition to the advantages of the first embodiment.

That is to say, according to the present embodiment, the mechanical sound correcting unit 63 finds the degree of change of external audio during motor operation, from the comparison results of the low frequency components of the audio spectrum X during motor operation, and from the comparison results of the medium/high frequency components before and after the start of motor operation. The mechanical sound correcting unit 63 uses the average power spectrum Px_a of the current processing block to determine whether or not to update the correcting coefficient H, and updates the correcting coefficient H only in the case that the degree of change is small.

Thus, influence from the change in external audio can be removed and the correcting coefficient H adequately set, whereby components from other than the mechanical sound can be prevented from being included in the correcting coefficient H. Accordingly, even in the case wherein external audio changes before and after the start of motor operation, the estimated mechanical sound spectrum Z can be adequately corrected, and only the mechanical sound can be removed without removing the change amount of the desired sound, and sound quality of the recorded audio can be prevented from deteriorating.

3. Third Embodiment

Next, an audio signal processing device and audio signal processing method according to the third embodiment of the present disclosure will be described. Compared to the second embodiment, the third embodiment differs in the point of dynamically controlling a smoothing coefficient r of the correcting coefficient, according to the periphery sound environment. The other functional configurations of the third embodiment are substantially similar to the second embodiment, so detailed description thereof will be omitted.

3.1. Concept of Mechanical Sound Correcting

As described in the second embodiment, the features of the mechanical sound to be corrected change depending on the spectrum form of the periphery environment sound (desired sound). Therefore, the reduction amount of the mechanical sound as to the external audio picked up also changes according to the spectrum form of the desired sound.

Figures 28A, 28B:
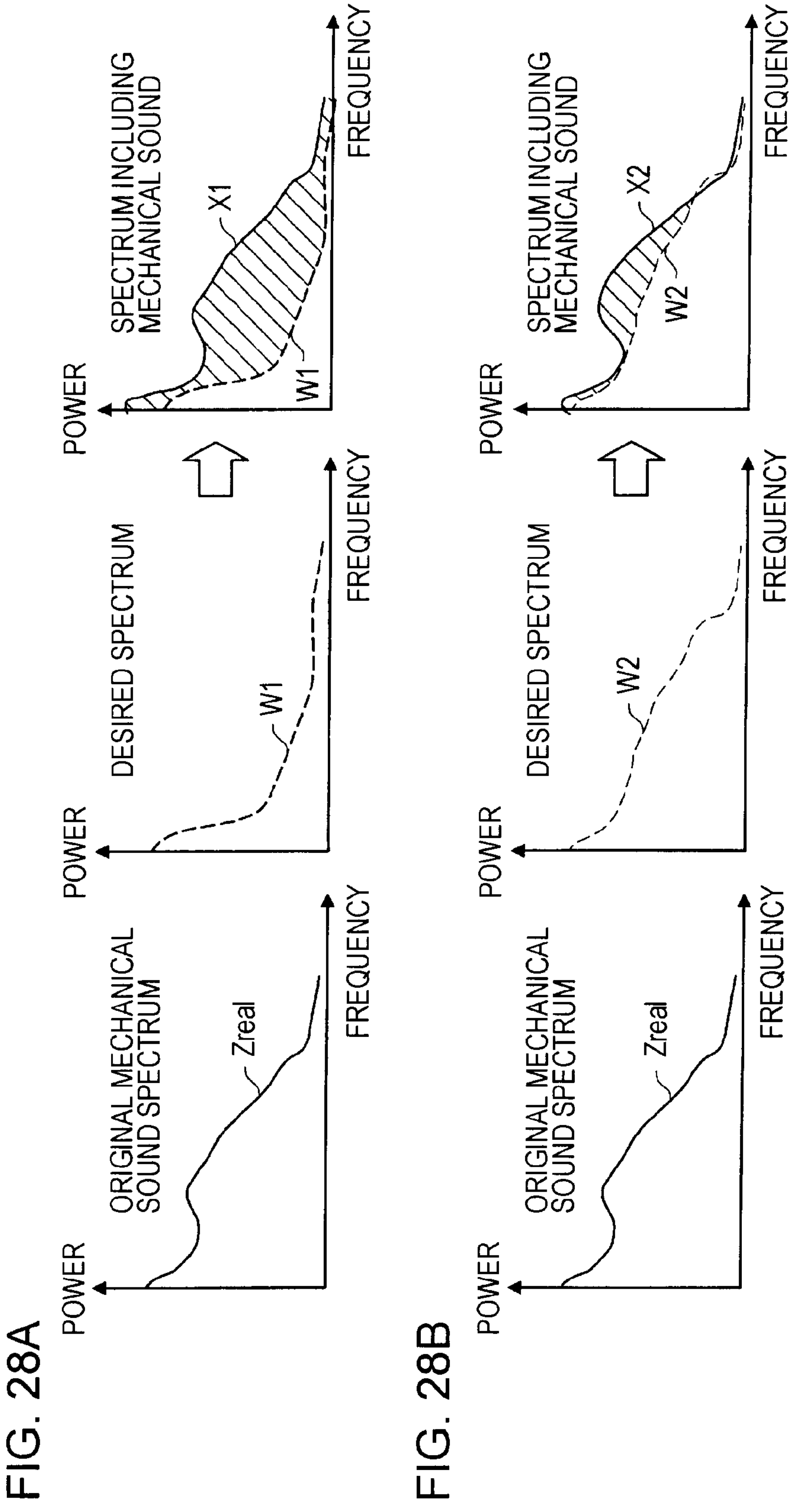
FIGS. 28A and 28B are explanatory diagrams schematically describing the reduced amount of the mechanical sound according to a third embodiment of the present disclosure.

FIGS. 28A and 28B are explanatory diagrams schematically showing the reduction amount of the mechanical sound. As shown in FIGS. 28A and 28B, the sum of the actual mechanical sound spectrum Zreal and the desired sound spectrum W becomes the audio spectrum X that is picked up by the microphones 51 and 52. Accordingly, even if the actual mechanical spectrum Zreal is the same, if the desired sound spectrum W is different, the reduction amount of the mechanical sound differs. For example, as shown in FIG. 28A, in the case that the desired sound spectrum W1 is relatively small, the reduction amount of the mechanical sound to be reduced from the audio spectrum X1 increases. On the other hand, as shown in FIG. 28B, in the case that the desired spectrum sound W2 is relatively large, the reduction amount of the mechanical sound to be reduced from the audio spectrum X2 increases.

Accordingly, in the case that the volume of the desired sound currently picked up is small, the update amount for the correcting coefficient H by the current audio spectrum X should be increased, and the degree of influence that the current audio spectrum X applies to the correcting coefficient H should be greater than the past audio spectrum X. On the other hand, in the case that the volume of the desired sound currently picked up is large, the update amount of the correcting coefficient H by the current audio spectrum X should be decreased, and the degree of influence by the current audio spectrum X should be lowered.

Now, with the third embodiment, a certain amount of mechanical sound reduction can be realized constantly, by controlling the update amount of the correcting coefficient H by the current audio spectrum X, according to the periphery sound environment (volume of desired sound). Specifically, the mechanical sound correcting unit 63 controls a smoothing coefficient r_sm in the event of calculating the correcting coefficient H, based on the level of audio signal x input from the microphones 51 and 52. The smoothing coefficient r_sm is a coefficient used for smoothing the correcting coefficient Ht defined by the current audio spectrum X and the correcting coefficient Hp defined by the past audio spectrum X (see S386 in FIG. 31). By controlling the smoothing coefficient r_sm, the update amount of the correcting coefficient H by the current audio spectrum X can be controlled.

Note that an example of controlling the update amount of the correcting coefficient H, based on the level of audio signal x while the operation is stopped, before the operation of the driving device 14 is started (e.g. value of input audio while the motor operation is stopped), will be described below. Thus, a desired volume can be favorably detected, but this is not limited to the present example, and the update amount of the correcting coefficient H can also be controlled, based on the audio signal x during operation of the driving device 14. Also, while not shown in FIG. 2, let us say that the audio signals XL and XR are not input from the microphones 51 and 52 to the mechanical sound correcting unit 63L and 63R.

3.2. Operation of Mechanical Sound Correction

Next, an operation example will be described of a case of controlling the update amount of the correcting coefficient H with the mechanical sound correcting unit 63 according to the third embodiment, based on the volume while the operation of the zoom lens 15 is stopped (when a mechanical sound is not emitted).

The operating timing of the mechanical sound correcting unit 63 according to the third embodiment is substantially the same as the operating timing of the mechanical sound correcting unit 63 according to the first embodiment (see FIG. 12). The mechanical sound correcting unit 63 executes processing A while the motor operation is stopped, and executes processing B while the motor is operating, while constantly performing basic operations.

Also, the basic operating flow of the mechanical sound correcting unit 63 according to the third embodiment is similar to the first embodiment (see FIG. 13). However, the third embodiment differs from the first embodiment in specific processing content of the basic processing, processing A, and processing B. Thus, the operating flow of the basic processing, processing A, and processing B according to the third embodiment will be described below.

Figure 29:
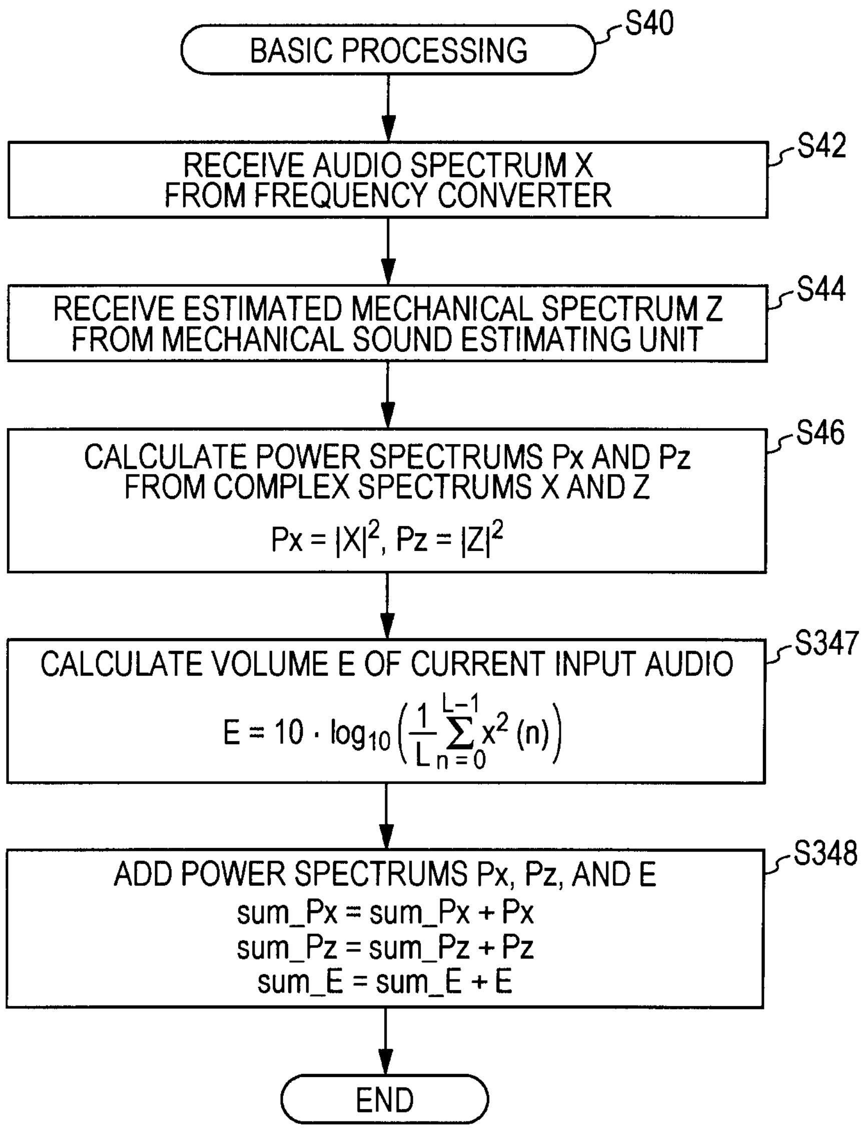
FIG. 29 is a flowchart describing a sub-routine of basic processing in FIG. 13.

First, basic processing relating to the third embodiment will be described in detail with reference to FIG. 29. FIG. 29 is a flowchart showing a sub-routine of the basic processing in FIG. 13. The mechanical sound correcting unit 63 performs the basic processing described below for each block wherein one frame of the audio signal x has been subjected to frequency conversion.

As shown in FIG. 29, the mechanical sound correcting unit 63 receives the audio spectrum X from the frequency converter 61 (step S42), and receives the estimated mechanical sound spectrum Z form the mechanical sound estimating unit 62. Next, the mechanical sound correcting unit 63 calculates the power spectrum Px of the audio spectrum X, and calculates the power spectrum Pz of the estimated mechanical sound spectrum Z (step S46).

The steps S41 through S46 above are similar to the first embodiment. The steps S347 through S348 are processing features of the third embodiment.

Next, the mechanical sound correcting unit 63 calculates a squared average of the signal level of the current audio signal x(n) input from the microphones 51 and 52, and converts the increment thereof into decibels, thereby finding the volume E dB of the input audio while the motor operation is stopped (step S347). The mathematical expression of the volume E of the input audio is expressed with the following Expression (13), for example. The volume E of the input audio indicates the volume of the external audio input from the microphones 51 and 52. Note that N is the frame size when the audio signal x is divided into frames (sample size of the audio signal included in one frame).

$$E = 10 \cdot \log_{10}\left(\frac{1}{N}\sum_{n=0}^{N-1} x^2(n)\right) \quad (13)$$

Further, the mechanical sound correcting unit 63 adds the power spectrums Px and Pz found in S46 to the integration value sum_Px of the power spectrum Px and the integration value sum_Pz stored in the storage unit 631, respectively (step S348). Also, the mechanical sound correcting unit 63 adds the volume E of the input audio found in S347 to the integration value sum_E of the average volume E of the input audio stored in the storage unit 631 (step S348).

With the basic processing, the integration value sum_Px of the power spectrum Px of the audio spectrum X, the integration value sum_Pz of the power spectrum Pz of the estimated mechanical sound spectrum Z, and the integration value sum_E of the volume E of the input audio are thus calculated for each of N1 frames of the audio signal x.

Figure 30:
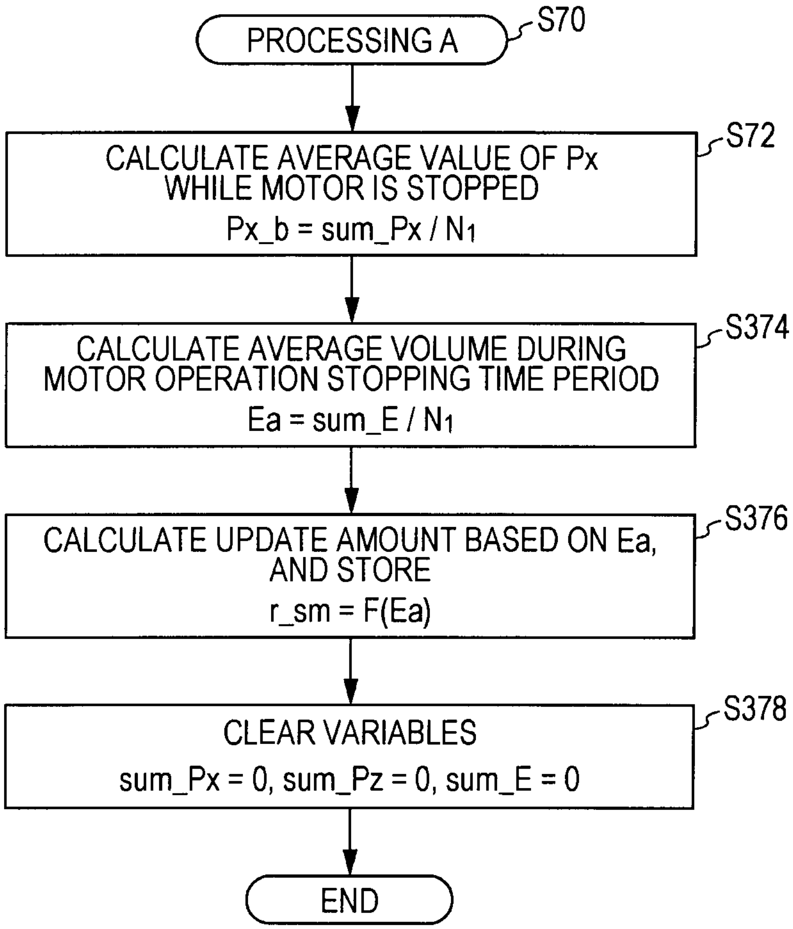
FIG. 30 is a flowchart describing a sub-routine of processing A in FIG. 13.

Next, processing A which is performed while the operation of the zoom motor 15 is stopped (time that the zooming sound is not emitted) according to the third embodiment will be described in detail with reference to FIG. 30. FIG. 30 is a flowchart showing a sub-routine of the processing A in FIG. 13.

As shown in FIG. 30, first, the mechanical sound correcting unit 63 calculates the average value Px_b of Px while the operation of the zoom motor 15 is stopped (step S72). S72 herein is similar to the first embodiment. The steps S374 through S378 below are processing features of the third embodiment.

Next, the mechanical sound correcting unit 63 divides the integration value sum_E of the volume E of the input audio by the number of frames N1, thereby calculating the average value Ea of the integration values sum_E of the input audio volume E (hereafter called input audio average volume Ea) while the operation of the zoom motor 15 is stopped (step S374).

Further, the mechanical sound correcting unit 63 calculates the smoothing coefficient r_sm with a predetermined function F(Ea), based on the input audio average volume Ea computed in S374, and stores this in the storage unit 631. In S385 in FIG. 31 to be described later, the smoothing coefficient r_sm is a weighted coefficient used for updating the correcting coefficient H, and the greater the value of r_sm is, the greater the update amount of the correcting coefficient H is with the correcting coefficient Ht found from the current audio spectrum X.

Figure 32:
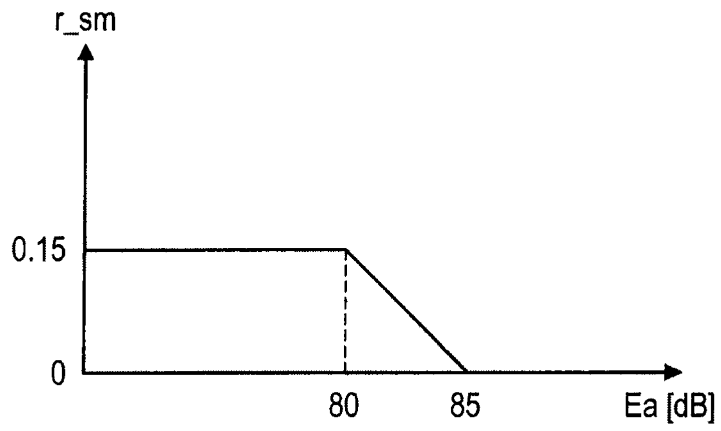
FIG. 32 is an explanatory diagram exemplifying the relation between the average sound amount Ea and smoothing coefficient r_sm of an input audio according to the third embodiment.

FIG. 32 is an explanatory diagram exemplifying the relation between the input audio average volume Ea and the smoothing coefficient r_sm according to the present embodiment. In the above S376, for example as shown in FIG. 32, the smoothing coefficient r_sm is determined by a function F(Ea) such that, as the input audio average volume Ea while the motor operation is stopped increases, the smoothing coefficient r_sm decreases ($0<r\_sm<1$). Consequently, as the input audio average volume Ea increases, the smoothing coefficient r_sm is set to a value near zero, and conversely, as the input audio average volume Ea decreases, the smoothing coefficient r_sm is set to a value near an upper limit value (e.g. 0.15).

Subsequently, the mechanical sound correcting unit 63 resets the integration value sum_Px, the integration value sum_Pz, and the integration value sum_E of the input audio volume E, stored in the storage unit 631, to zero (step S378).

With the processing A above, constantly while the operation of the zoom motor 15 is stopped, for each of N1 number of frames of the audio signal x, the average value Px_b of the power spectrum Px of the audio spectrum X is calculated, and Px_b which is stored in the storage unit 631 is updated to the average value Px_b of the newest N1 number of frames. Also, for each of N1 number of frames of the audio signal x, the input audio average volume Ea while the motor operation is stopped and the smoothing coefficient r_sm are calculated, and the Ea stored in the storage unit 631 and the smoothing coefficient r_sm are updated to the average value Ea and smoothing coefficient r_sm corresponding to the newest N1 number of frames.

Figure 31:
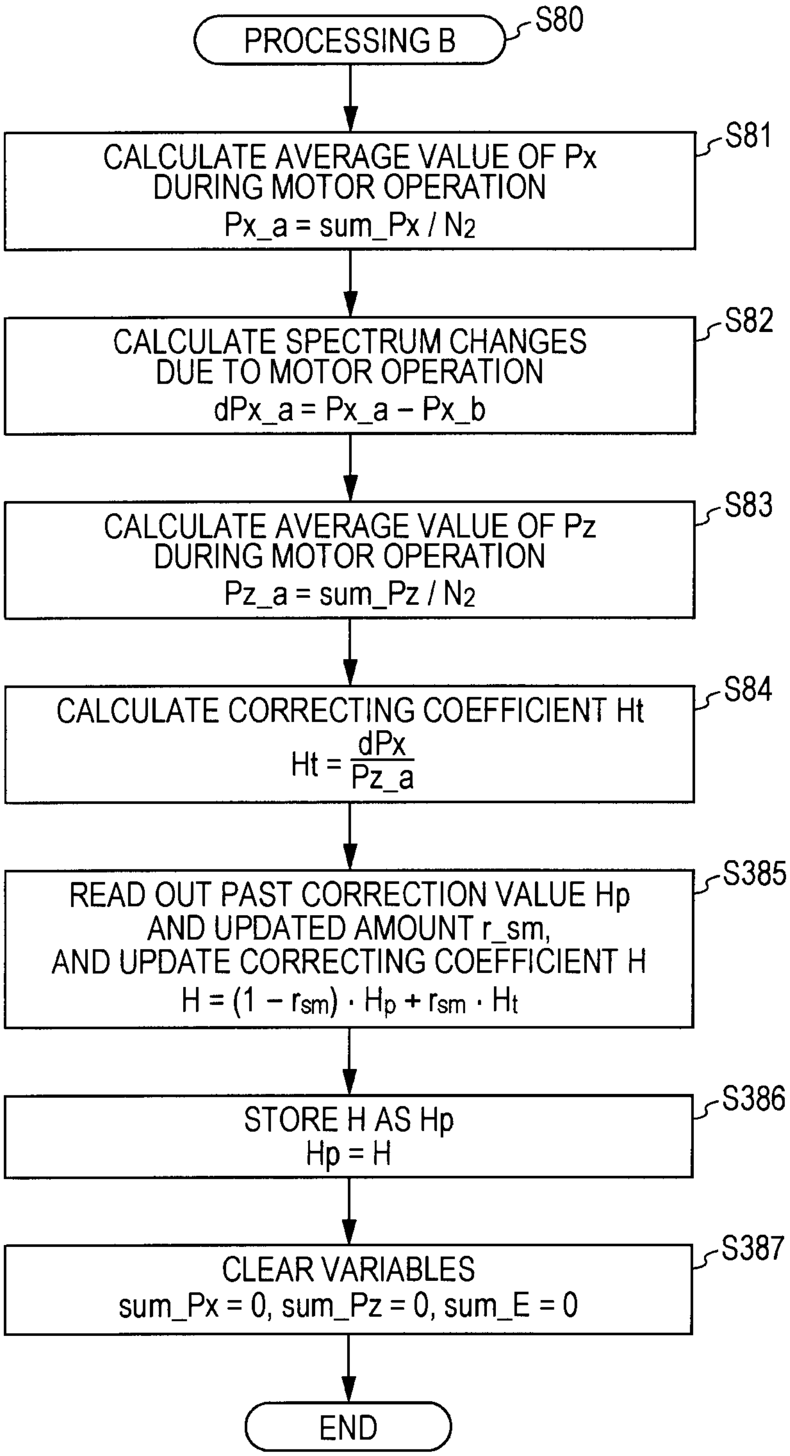
FIG. 31 is a flowchart describing a sub-routine of processing B in FIG. 13.

Next, processing B which is performed during the operation of the zoom motor 15 (while the zooming sound is emitted) according to the third embodiment will be described in detail with reference to FIG. 31. FIG. 31 is a flowchart showing the sub-routine of processing B in FIG. 13.

As shown in FIG. 31, the mechanical sound correcting unit 63 calculates the average value Px_a of the power spectrum Px of the audio spectrum X during operation of the zoom motor 15 (step S81), and calculates the difference dpX of X before and after start of operation of the zoom motor 15 (step S82). Further, the mechanical sound correcting unit 63 calculates the average value Pz_a of the power spectrum Pz of the estimated mechanical sound spectrum Z during operation of the zoom motor 15 (step S83), and calculates the correcting coefficient Ht (step S84).

The steps S81 through S84 above are similar to the first embodiment. The steps S385 through S387 below are processing features of the third embodiment.

Next, the mechanical sound correcting unit 63 uses the current correcting coefficient Ht found in S84 and the correcting coefficient Hp found in the past to calculate the correcting coefficient H (step S385). Specifically, the mechanical sound correcting unit 63 reads out the past correcting coefficient Hp and the smoothing coefficient r_sm stored in the storage unit 631. The smoothing coefficient r_sm is the newest value found from the input audio average volume Ea immediately prior to start of the motor operation. The mechanical sound correcting unit 63 calculates the correcting coefficient H by using the smoothing coefficient r_sm ($0<r<1$) to smooth the Hp and Ht, as shown in Expression (14) below. Thus, by using r_sm to smooth the current correcting coefficient Ht and past correcting coefficient Hp, influence from abnormal values of the audio spectrum X in the individual zoom operations can be suppressed, thereby enabling calculation of a correcting coefficient H having high reliability.

$$H=(1-r\_sm)\cdot Hp+r\_sm\cdot Ht \quad (14)$$

Subsequently, the mechanical sound correcting unit 63 stores the correcting coefficient H found in S385 as Hp in the storage unit 631 (step S386). Further, the integration value sum_Px, integration value sum_Pz, and integration value sum_E stored in the storage unit 631 to zero (step S387).

With the processing B above, constantly while the zoom motor 15 is operating, for each of N2 number of frames of the audio signal x, the difference value dPx of the audio spectrum X before and after motor operation and the average value Pz_a of the estimated mechanical sound spectrum Z during motor operation are calculated. The correcting coefficient H corresponding to the newest N2 number of frames is calculated, and Hp which is stored in the storage unit 631 is updated to the newest correcting coefficient H.

The update amount of the correction coefficient H at this time is adequately controlled according to the input audio average volume Ea immediately prior to the start of motor operation. That is to say, when the input audio average volume Ea (volume of desired sound) is large, mechanical sound is buried in the peripheral desired sound, so it is favorable for the update amount of the correcting coefficient H with the current correcting coefficient Ht during motor operation to be small. The reason for this is to realize a certain amount of mechanical sound reduction regardless of the periphery average volume. Also, when the mechanical sound is buried in the desired sound as described above, the mechanical sound is not adequately extracted, resulting in an adverse effect that the desired sound has deteriorated.

Now, according to the present embodiment, when the input audio average volume Ea is large, the smoothing coefficient r_sm is set to a small value according to Ea, and the update amount of the correcting coefficient H from the current correcting coefficient Ht is suppressed. Thus, sound quality deterioration due to mechanical noise overestimation or underestimation can be avoided. On the other hand, when the input audio average volume Ea is small, the mechanical sound is noticeable, so the smoothing coefficient r_sm is set to a large value according to Ea, and the update amount of the correcting coefficient H from the current corresponding coefficient Ht is increased. Thus, the correcting coefficient Ht during current motor operation is largely reflected in the correcting coefficient H, the mechanical sound is adequately estimated and removed, and the desired sound can be extracted.

4. Fourth Embodiment

Next, an audio signal processing device and audio signal processing method according to a fourth embodiment will be described. The fourth embodiment differs from the first embodiment in that the mechanical sound spectrum used for mechanical sound reducing processing is selected according to the feature amount P of the sound source environment. The other functional configurations of the fourth embodiment are substantially the same as the second embodiment, so the detailed description thereof will be omitted.

4.1. Overview of Mechanical Sound Reducing Method

Next, an overview of an audio signal processing device and mechanical sound reducing method according to the fourth embodiment will be described.

In the first through third embodiments, the estimated mechanical sound spectrum Z is estimated from the actual audio spectrum X with the mechanical sound estimating unit 62 to realize reduction of mechanical sound, even without using a mechanical sound spectrum template. However, the mechanical sound reducing method according to the first through third embodiments has room for improvements in the following points.

For example, at a location where multiple sound sources are in the periphery of the digital camera 1 recording the external audio (e.g. a busy crowd), desired sound emitting from multiple sound sources arrive at the microphones 51 and 52 from multiple directions. Therefore, the desired sound mixes in with the mechanical sound arriving at the microphones 51 and 52 from the direction of the driving device 14, whereby not only the mechanical sound which is subject to removal, but a fair amount of the periphery sound (desired sound) is included in the estimated mechanical sound spectrum Z obtained by the mechanical estimating unit 62. Consequently, overestimation of the mechanical sound by the mechanical sound estimating unit 62 occurs, whereby desired sound can also be excessively suppressed at the same time as reduction of the mechanical sound by the mechanical sound reducing processing, and sound quality of the desired sound can be greatly deteriorated.

Thus, with the method of dynamically estimating the mechanical sound from the input audio in the first through third embodiments, when overestimation of the mechanical sound occurs, the recorded desired sound can significantly deteriorate.

Now, with the fourth embodiment below, in order to prevent overestimation, the estimated mechanical sound spectrum Z that is dynamically estimated at the time the mechanical sound is emitted and the average mechanical sound spectrum Tz obtained beforehand before the mechanical sound is emitted are differentiated according to the sound environment of the camera periphery (sound source environment). That is to say, at a location where there are multiple sound sources, such as in a busy crowd, overestimation of mechanical sound is prevented by using the average mechanical sound spectrum Tz, while on the other hand, the mechanical sound is accurately reduced by using the estimated mechanical sound spectrum Z in other locations.

Now, the average mechanical sound spectrum Tz is an average type of mechanical sound spectrum signal obtained from the past mechanical sound results. As a calculating method of the average mechanical sound spectrum Tz, the following method may be used. For example, the audio signal processing device itself that is provided to the digital camera 1 can learn the features of the mechanical sound spectrum, based on estimation results of the past mechanical sound spectrum, and generate an average mechanical sound spectrum Tz. Alternatively, the actual mechanical sound spectrum Zreal emitted by the driving devices 14 of the multiple digital cameras 1 may be measured, and based on the measurement results thereof, obtain an average mechanical sound spectrum Tz template for each device type beforehand, and use the template for each of the devices.

The former Tz calculating method will be described in greater detail. The audio signal processing device itself learns the average mechanical sound spectrum Tz, based on the audio spectrum X obtained from the microphones 51 and 52, from the mechanical sound correcting unit 63 during recording of external audio. The mechanical sound correcting unit 63 performs correcting processing of the estimated mechanical sound spectrum Z as described above, while at the same time calculating the average mechanical sound spectrum Tz. A later-described mechanical sound selecting unit is further provided, and with the mechanical sound selecting unit, selects one of the estimated mechanical sound spectrum Z or the learned average mechanical sound spectrum Tz, according to the sound source environment.

Note that the sound source environment indicates the number of sound sources. For example, the number of sound sources can be estimated using input volume as to the microphones 51 and 52, audio correlation between the microphones 51 and 52, or estimated mechanical sound spectrum Z.

Now, if the template of the average mechanical sound spectrum Tz is to be learned during recording, as mentioned above, one thought is to use the template without change, and reduce the mechanical sound. However, the actual mechanical sound changes the sound quality with each operation of the driving device 14, and changes even during one operation. Therefore, these changes are not followed with a fixed mechanical sound template. Accordingly, in order to follow the mechanical sound changes and improve the mechanical sound reducing ability, it is favorable for the mechanical sound to be dynamically estimated from the input audio signals $X_L$ and $X_R$ of the two microphones 51 and 52, as in the first through third embodiments.

On the other hand, in the case that the sound source environment is a periphery that is extremely busy, the mechanical sound will be buried in the desired sound and become difficult to hear, and the mechanical sound is no longer uncomfortable for the user to hear. Accordingly, rather than greatly suppressing the mechanical sound, it is desirable to reduce the mechanical sound so that the desired sound is deteriorated as little as possible. That is to say, rather than dynamically estimating the mechanical sound and overestimating, correctly preventing the deterioration of the desired sound is favorable, even if there is some error as to the actual mechanical sound. Thus, it is desirable to use the spectrum including only the mechanical sound components and not including desired sound components to perform mechanical sound reducing processing. Accordingly, in this sound source environment, using a template for the average mechanical sound spectrum Tz including only the mechanical sound components is adequate.

Also, for the Tz template, an average mechanical sound template that is obtained by measuring the mechanical sound of multiple digital cameras 1 can be used, but for the above-mentioned reason, this is not necessarily optimal for every individual digital camera 1. In order to obtain an average type of mechanical sound template for multiple cameras, the adjustment cost for the individual cameras will increase. Thus, by simultaneously adjusting the estimated mechanical sound spectrum Z while learning the average mechanical sound spectrum Tz template within individual digital cameras 1, the adjustment cost thereof can be reduced.

Thus, according to the fourth through sixth embodiments, depending on the sound source environment, one of the estimated mechanical sound spectrum Z or average mechanical sound spectrum Tz is selected and used for mechanical sound reduction, whereby overestimation of the mechanical sound can be suppressed.

Thus, an adequate mechanical sound spectrum according to the sound source environment can be realized, whereby the reduction effect of the mechanical sound by the estimating mechanical sound spectrum Z can be secured, while suppressing sound quality deterioration of the desired sound. The average mechanical sound spectrum Tz template for reducing deterioration of the desired sound is created during recording, not beforehand, whereby the adjustment cost thereof can be reduced.

4.2. Functional Configuration of Audio Signal Processing Device

Figure 33:
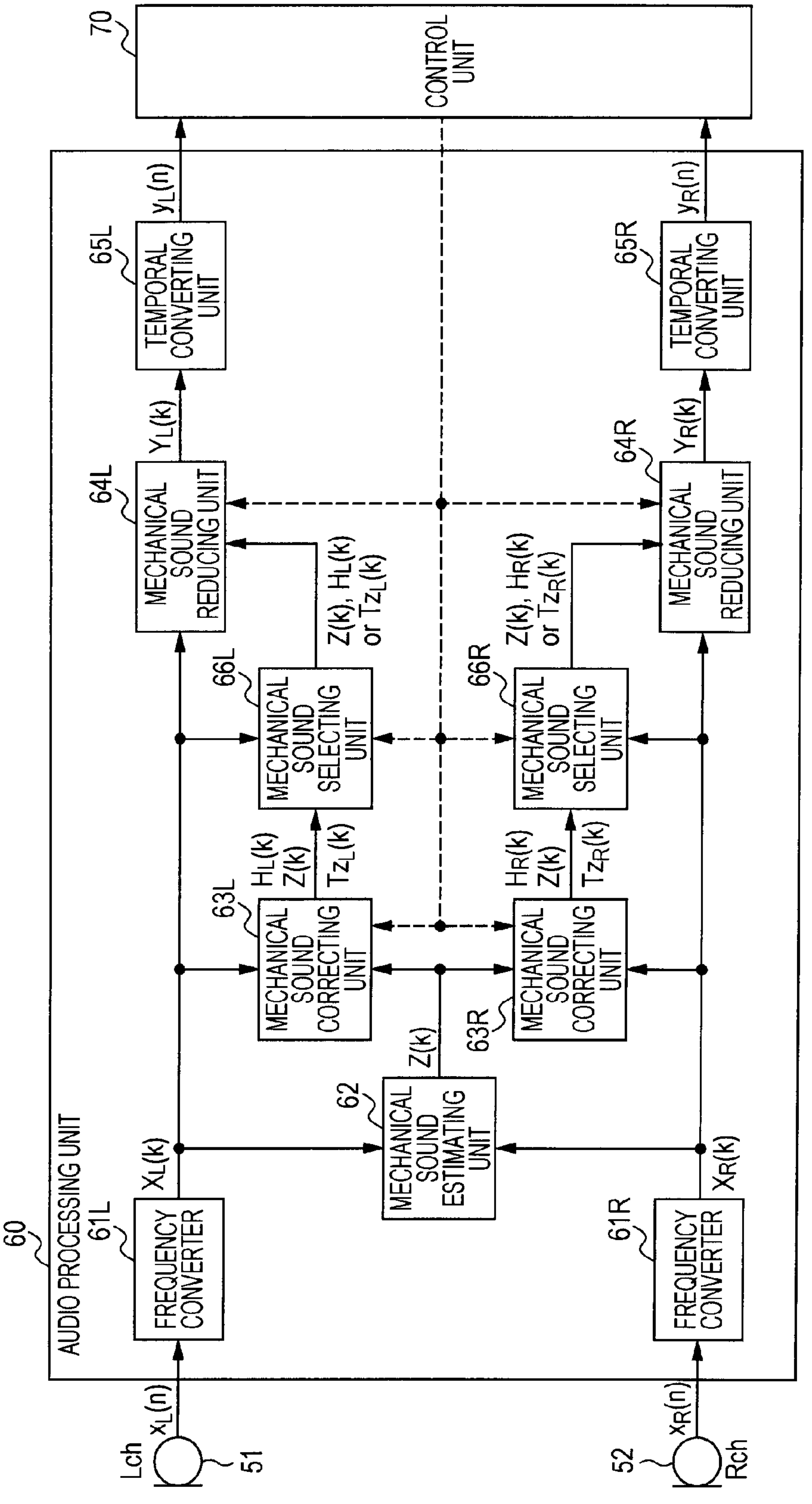
FIG. 33 is a block diagram illustrating a functional configuration of an audio signal processing device according to a fourth embodiment of the present disclosure.

Next, a functional configuration example of an audio signal processing device that is applied to the digital camera 1 according to the fourth embodiment will be described with reference to FIG. 33. FIG. 33 is a block diagram showing a functional configuration of an audio signal processing device according to the present embodiment.

As shown in FIG. 33, the audio signal processing device according to the fourth embodiment has two microphones 51 and 52 and an audio processing unit 60. The audio processing unit 60 has two frequency converters 61L and 61R, a mechanical sound estimating unit 62, two mechanical sound correcting units 63L and 63R, two mechanical sound reducing units 64L and 64R, two temporal converting units 65L and 65R, and two mechanical sound selecting units 66L and 66R. The audio signal processing device relating to the fourth embodiment has additional mechanical sound selecting units 66L and 66R, as compared to the first embodiment.

The mechanical sound correcting units 63L and 63R (hereafter, collectively referred to as "mechanical sound correcting unit 63") has a function to calculate a correcting coefficient $H_L$ to correct the estimated mechanical sound spectrum Z, similar to the first embodiment. Further, the mechanical sound correcting unit 63 has a function to learn an average type of spectrum of the mechanical sound during recording operation (during operating imaging), and to generate an average mechanical sound spectrum signal Tz. Thus, the mechanical sound correcting unit 63 calculates the correcting coefficient H as to the estimated mechanical sound spectrum Z, while calculating the average mechanical sound spectrum signal Tz.

The mechanical sound correcting unit 63L generates and stores the Left channel average mechanical sound spectrum signal $Tz_L$, based on the audio spectrum signal $X_L$, for each of the frequency components $X_L(k)$ of the Left channel audio spectrum signal $X_L$. The mechanical sound correcting unit 63R generates and stores the Right channel average mechanical sound spectrum signal $Tz_R$, based on the audio spectrum signal $X_R$, for each of the frequency components $X_R(k)$ of the Right channel audio spectrum signal $X_R$. Details of generation processing of the average mechanical sound spectrum signal Tz by the mechanical sound correcting unit 63 (hereafter referred to as "average mechanical sound spectrum signal Tz") will be described later.

The mechanical sound selecting units 66L and 66R (hereafter, collectively referred to as "mechanical sound selecting unit 66") selects one or the other of the estimated mechanical sound spectrum Z and average mechanical sound spectrum Tz, according to the sound source environment in the periphery of the digital camera 1. Specifically, the mechanical sound selecting unit 66 calculates a feature amount P to estimated the sound source environment, based on the input audio spectrums $X_L$ and $X_R$ (monaural signal). The mechanical sound selecting unit 66 selects the mechanical sound spectrum to be used for mechanical sound reduction from the estimated mechanical sound spectrum Z or average mechanical sound spectrum Tz. For example, the Left channel mechanical sound selecting unit 66L selects the mechanical sound spectrum to be used for the Left channel mechanical sound reduction, based on the feature amount $P_L$ found with the audio spectrum $X_L$. Similarly, the Right channel mechanical sound selecting unit 66R selects the mechanical sound spectrum to be used for the Right channel mechanical sound reduction, based on the feature amount $P_R$ found with the audio spectrum $X_R$.

The mechanical sound reducing unit 64 reduces the mechanical sound spectrum selected by the mechanical sound selecting unit 66 from the audio spectrums $X_L$ and $X_R$. In the case that the estimated mechanical sound spectrum Z is selected by the mechanical sound selecting unit 66L, the Left channel mechanical sound reducing unit 64L uses the estimated mechanical sound spectrum Z and correcting coefficient $H_L$ to reduce the mechanical sound components from the audio spectrum $X_L$. In the case that the average mechanical sound spectrum $Tz_L$ is selected, the mechanical sound reducing unit 64L uses the average mechanical sound spectrum $Tz_L$ to reduce the mechanical sound components from the audio spectrum $X_L$. The same holds for the Right channel mechanical sound reducing unit 64R.

4.3. Details of Mechanical Sound Correcting Unit

Next, a configuration and operations of the mechanical sound correcting unit 63 according to the present embodiment will be described.

4.3.1. Configuration of Mechanical Sound Correcting Unit

The mechanical sound correcting unit 63 according to the present embodiment has a mechanical sound correcting unit 63 according to the first embodiment, and similarly a storage unit 631 and computing unit 632 (see FIG. 7).

The storage unit 631 stores the correcting coefficient H and the average mechanical sound spectrum Tz for each frequency component X(k) of the audio spectrum X. Also, the storage unit 631 functions also as a calculation buffer to calculate the correcting coefficient H and average mechanical sound spectrum Tz with the computing unit 632.

The computing unit 632 calculates the correcting coefficient H, while calculating the average mechanical sound spectrum Tz, and outputs this to the mechanical sound reducing unit 64. When the driving device 14 operates, the computing unit 632 calculates the correcting coefficient H, based on the difference dX of the frequency feature of X before and after the start of operation of the driving device 14, for each frequency component X(k) of the audio spectrum X. Further, the computing unit 632 finds the difference dX as an average mechanical sound spectrum Tz for each frequency component X(k) of the audio spectrum X.

4.3.2. Basic Operations of Mechanical Sound Correcting

Figure 34:
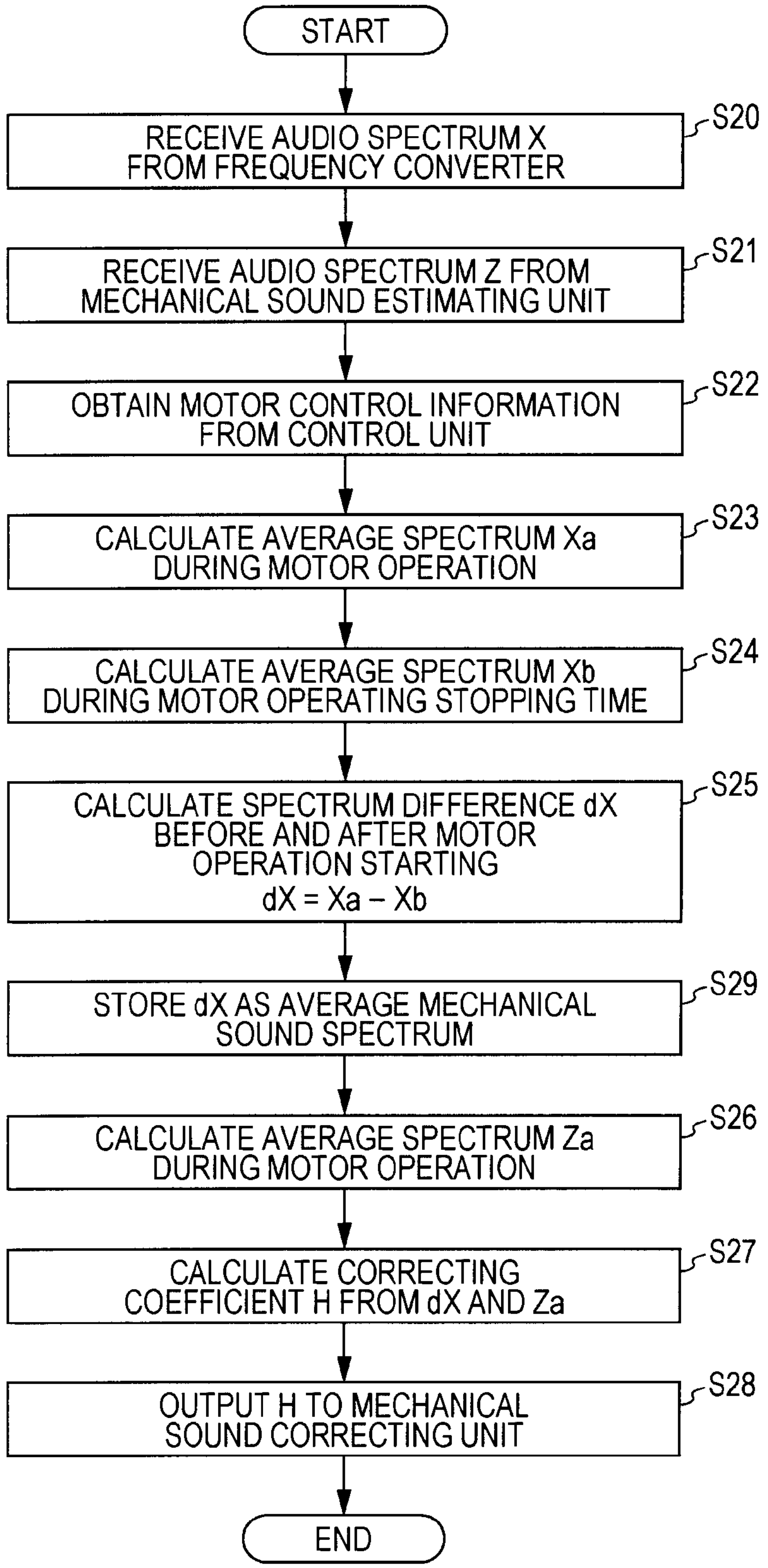
FIG. 34 is a flowchart describing basic operations of a mechanical correcting unit according to the fourth embodiment.

Next, the basic operations of the mechanical sound correcting unit 63 according to the present embodiment will be described with reference to FIG. 34. FIG. 34 is a flowchart showing the basic operations of the mechanical sound correcting unit 63 according to the present embodiment.

The operating flow of the fourth embodiment shown in FIG. 34 differs from the first embodiment in that a step S29 is added after step S25, and the other steps S20 through S28 are substantially the same. Primarily S29, which is a feature of the mechanical sound correcting unit 63 according to the fourth embodiment, will be described below.

As shown in FIG. 34, upon having performed the above-described S20 through S24, the mechanical sound correcting unit 63 calculates the difference dX between the audio spectrum Xa during motor operation which is calculated in S23 and the audio spectrum Xb of when the motor operation has stopped which is calculated in S23 (step S25).

Next, the mechanical sound correcting unit 63 stores the difference dX calculated in S25 as the average mechanical sound spectrum Tz in the storage unit 631 (step S29). As described using FIG. 10, the difference dX of the audio spectrum Xa and Xb of before and after the start of the motor operation corresponds to the frequency feature of the mechanical sound (actual mechanical sound spectrum Zreal). Accordingly, the difference dX can be estimated as the mechanical sound spectrum Tz.

Subsequently, as described above, the mechanical sound correcting unit 63 calculates the average estimated mechanical sound spectrum Za (step S26), calculates the correcting coefficient H from dX and Za (step S27), and outputs the correcting coefficient H and average mechanical sound spectrum Tz to the mechanical sound reducing unit 64 (step S28).

The calculating processing of the correcting coefficient H and average mechanical spectrum Tz by the mechanical sound correcting unit 63 according to the present embodiment is described above. Note that actually, the audio signals $x_L$, and $x_R$ are subjected to frequency conversion to obtain the audio spectrum signals $X_L$ and $X_R$, whereby the correcting coefficients $H_L(k)$ and $H_R(k)$ and differences $dX_L(k)$ and $dX(k)_R$ (equivalent to the average mechanical sound spectrum Tz(k)) have to be calculated for each of the frequency components $X_L(k)$ and $X_R(k)$ of the audio spectrum signals $X_L$ and $X_R$. However, for ease of description, a flowchart for calculating the correcting coefficient H(k) and dX(k) for only one frequency component Z(k) of the estimated mechanical sound spectrum Z is used for the description. This also hold true for the flowcharts in FIG. 35 and so forth.

4.3.3. Detailed Operations of Mechanical Sound Correcting

Next, detailed operations of the mechanical sound correcting unit 63 according to the fourth embodiment will be described. An example will be described below wherein correction of the estimated mechanical sound and calculation of the average mechanical sound spectrum Tz is performed in a power spectrum region of the audio signal.

The operating timing of the mechanical sound correcting unit 63 according to the fourth embodiment is similar to the operating timing of the mechanical sound correcting unit 63 according to the first embodiment shown in FIG. 12, and basic processing, processing A, and processing B are performed concurrently. As shown in FIG. 12, the mechanical sound correcting unit 63 executes processing A while the motor operation is stopped and executes processing B during motor operation, while constantly performing basic processing.

Also, the basic operating flow of the mechanical sound correcting unit 63 according to the fourth embodiment is similar to the first embodiment (see FIG. 13), and the operation flow of the basic processing and processing A are also similar to the first embodiment (see FIGS. 14 and 15). However, the fourth embodiment differs from the first embodiment in the specific processing content of processing B.

Figure 35:
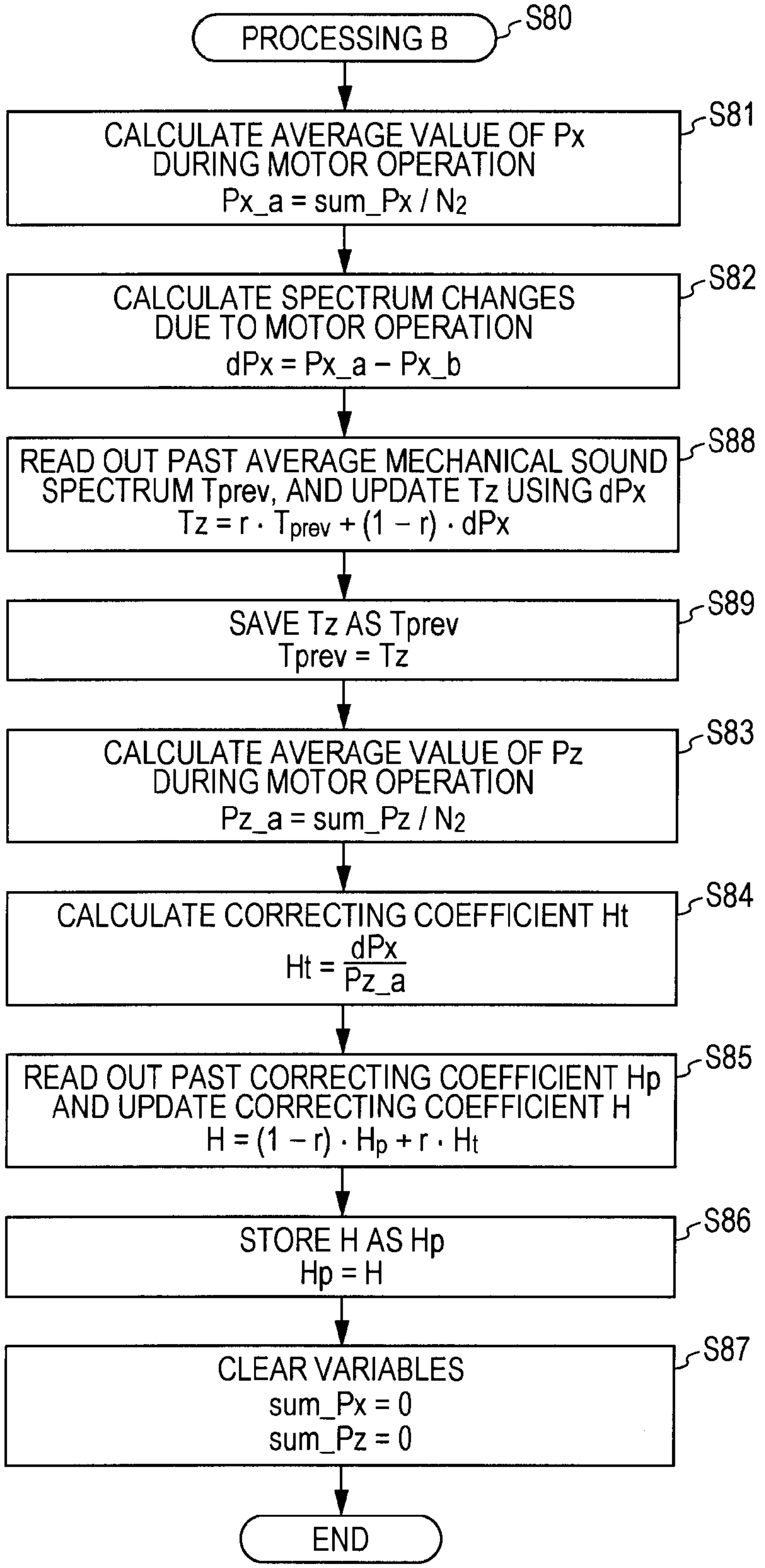
FIG. 35 is a flowchart describing a sub-routine of processing B in FIG. 13.

Next, processing B which is performed during operation of the zoom motor 15 according to the second embodiment (while the zooming sound is emitted) will be described in detail. FIG. 35 is a flowchart showing a sub-routine of the processing B in FIG. 13 according to the fourth embodiment.

As shown in FIG. 35, the mechanical sound correcting unit 63 calculates the average value Px_a of the power spectrum Px of the audio spectrum X during operation of the zoom motor 15 (step S81), and calculates the difference dPx of the X before and after the start of operation of the zoom motor 15 (step S82). The steps S81 through S82 above are similar to the first embodiment. Steps S88 through S89 are processing features of the fourth embodiment.

Next, the mechanical sound correcting unit 63 uses the difference dPx (equivalent to the current average mechanical sound spectrum Tz) found in S82 and the average mechanical sound spectrum Tprev found in the past to update the average mechanical sound spectrum Tz (step S88). Specifically, the mechanical sound correcting unit 63 reads out a past average mechanical sound spectrum Tprev stored in the storage unit 631. As shown in Expression (15) below, the mechanical sound correcting unit 63 then uses a smoothing coefficient r ($0<r<1$) to smooth the Tprev and dPx, thereby calculating the average mechanical sound spectrum Tz. Thus, by smoothing the current average mechanical sound spectrum (difference dPx) and the past average mechanical sound spectrum Tprev, influence of abnormal values of the audio spectrum X from individual zoom operations can be suppressed, whereby an average mechanical sound spectrum Tz template having high reliability can be calculated.

$$Tz=r\cdot Tprev+(1-r)\cdot dPx \quad (15)$$

Subsequently, the mechanical sound correcting unit 63 stores the average mechanical sound spectrum Tz found in S88 as the Tprev in the storage unit 631 (step S89).

Next, the mechanical sound correcting unit 63 calculates the average value Pz_a of the power spectrum Pz of the estimated mechanical sound spectrum Z during operation of the zoom motor 15 (step S83), and uses the dPx and Pz_a to calculate the correcting coefficient Ht (step S84). Further, the mechanical sound correcting unit 63 uses the current correcting coefficient Ht found in S84 and the past correcting coefficient Hp to update the correcting coefficient H (step S85), and stores H as Hp in the storage unit 631 (step S86). The mechanical sound correcting unit 63 then resets the integration value sum_Px and integration value sum_Pz stored in the storage unit 631 to zero (step S87). The steps S83 through S87 are similar to the first embodiment.

The operating flow of the mechanical sound correcting unit 63 according to the fourth embodiment is described above. The mechanical sound correcting unit 63 uses the difference dPx of the audio spectrum X before and after the start of motor operation to update the correcting coefficient H, and uses the difference dPx to update and save the average mechanical sound spectrum Tz. Thus, the later-described mechanical sound selecting unit 66 can select one of the newest average mechanical sound spectrum Tz corresponding to the mechanical sound emitted during this motor operation or the estimated mechanical sound spectrum Z.

4.4. Details of Mechanical Sound Selecting Unit

Next, a configuration and operations of the mechanical sound selecting unit 66 according to the present embodiment will be described.

4.4.1. Concept of Mechanical Sound Selection

Figure 36:
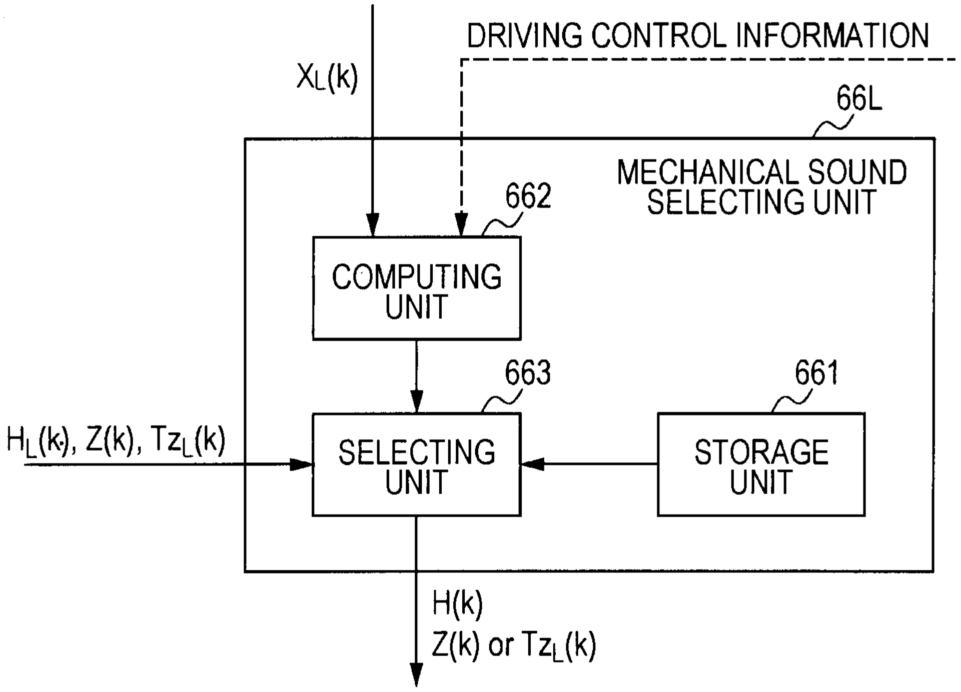
FIG. 36 is a block diagram illustrating a configuration of a mechanical sound selecting unit according to the fourth embodiment.

First, a configuration of the mechanical sound selecting unit 66 according to the present embodiment will be described with reference to FIG. 36. FIG. 36 is a block diagram showing a configuration of the mechanical sound selecting unit 66 according to the present embodiment. Note that a configuration of the Left channel mechanical sound selecting unit 66L will be described below, but the configuration of the Right channel mechanical sound selecting unit 66R is substantially the same, so the detailed description thereof will be omitted.

As shown in FIG. 36, the mechanical sound selecting unit 66L has a storage unit 661, computing unit 662, and selecting unit 663. An audio spectrum signal $X_L$ is input from the Left channel frequency converter 61L, and driving control information (e.g., motor control information) is input from the control unit 70, into the computing unit 662. Also, the estimated mechanical sound spectrum signal Z and correcting coefficient $H_L$ and average mechanical spectrum $Tz_L$ are input in the selecting unit 663 from the mechanical sound correcting unit 63L.

The storage unit 661 stores the threshold (later-described Eth) of the feature amount $P_L$ of the sound source environment. Also, the storage unit 661 also functions as a calculation buffer for the computing unit 662 and selecting unit 663 to calculate the feature amount P.

The computing unit 662 calculates the feature amount $P_L$ of the sound source environment, based on the audio spectrum signal $X_L$. For example, the input audio average power spectrum Ea dB from the audio spectrum signal $X_L$ level is calculated as the feature amount P of the sound source environment.

The selecting unit 663 reads out the threshold Eth of the feature amount $P_L$ of the sound source environment, compares the feature amount $P_L$ calculated by the computing unit 662 (e.g. input audio average power spectrum Ea) and the threshold Eth, and selects a mechanical sound spectrum based on the comparison results therein. For example, in the case that Ea is less than Eth, the selecting unit 663 selects the estimated mechanical sound spectrum Z, and in the case that Ea is the same as or greater than Eth, the selecting unit 663 selects the average mechanical sound spectrum Tz. The mechanical sound spectrum Z or Tz calculated by the selecting unit 663 is output to the mechanical sound reducing unit 64L.

4.4.2. Basic Operations of Mechanical Sound Selecting

Figure 37:
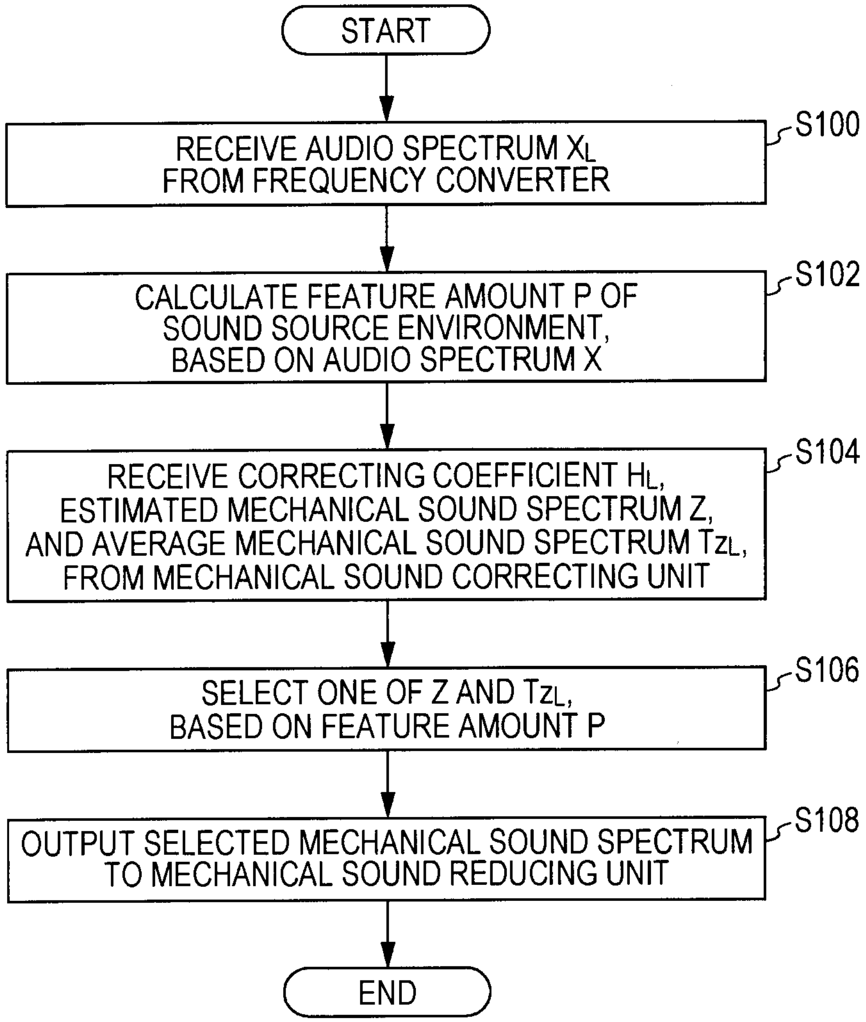
FIG. 37 is a flowchart describing operations of a mechanical sound selecting unit according to the fourth embodiment.

Next, operations of the mechanical sound selecting unit 66L according to the present embodiment will be described with reference to FIG. 37. FIG. 37 is a flowchart showing the operations of the mechanical sound selecting unit 66L according to the present embodiment.

Note that actually, the audio signals $x_L$, and $x_R$ are subjected to frequency conversion to obtain the audio spectrum signals $X_L$ and $X_R$. According to the present embodiment, a mechanical sound spectrum is selected for every frame that obtains an audio spectrum signal. That is to say, with a certain frame, the average mechanical sound spectrums $Tz_L$ and $Tz_R$ are used, and with another frame, the estimated mechanical sound spectrum Z obtained from the mechanical sound estimating unit is used. The audio spectrum signal has the various frequency components $X_L(k)$ and $X_R(k)$ of the audio spectrum signals $X_L$ and $X_R$, but for ease of description below, all of the frequency components $X_L(k)$ and $X_R(k)$ will be summarily written as $X_L$ and $X_R$, and a flowchart to select the mechanical sound spectrum will be used for description. Also, while the operating flow of the Left channel mechanical sound selecting unit 66L will be described below, the operating flow of the Right channel mechanical sound selecting unit 66R is carried out in the same way.

As shown in FIG. 37, first, the mechanical sound selecting unit 66L receives an audio spectrum XL (monaural signal) from the frequency converter 61L (step S100). Next, the mechanical sound selecting unit 66L computes the average power spectrum Ea of the audio spectrum $X_L$, for example, as the feature amount $P_L$ of the sound source environment (step S102). The details of the calculating processing of the feature amount PL (e.g., Ea) will be described later.

Further, the mechanical sound selecting unit 66L receives the estimated mechanical sound spectrum Z, correcting coefficient $H_L$, and average mechanical sound spectrum $Tz_L$ from the mechanical sound correcting unit 63L (step S104). Next, the mechanical sound selecting unit 66L selects one of the estimated mechanical sound spectrum Z or the average mechanical sound spectrum $Tz_L$ (step S106), based on the feature amount $P_L$ of the sound source environment calculated in S102. Subsequently, the mechanical sound selecting unit 66 outputs the mechanical sound spectrum Z or $Tz_L$ selected in S106 and the correcting coefficient $H_L$ to the mechanical sound reducing unit 64L (step S308).

4.4.3. Detailed Operations of Mechanical Sound Selecting

Next, detailed operations of the mechanical sound selecting unit 66 according to the present embodiment will be described with reference to FIGS. 38 through 41. In the description below, Left channel and Right channel are not differentiated, but the mechanical sound selecting units 66L and 66R each perform processing using the signals and values for Left channel ($X_L$, $H_L$, $Tz_L$, $P_L$) or the signals and values for Right channel ($X_R$, $H_R$, $TZ_R$, $P_R$), respectively.

Figure 38:
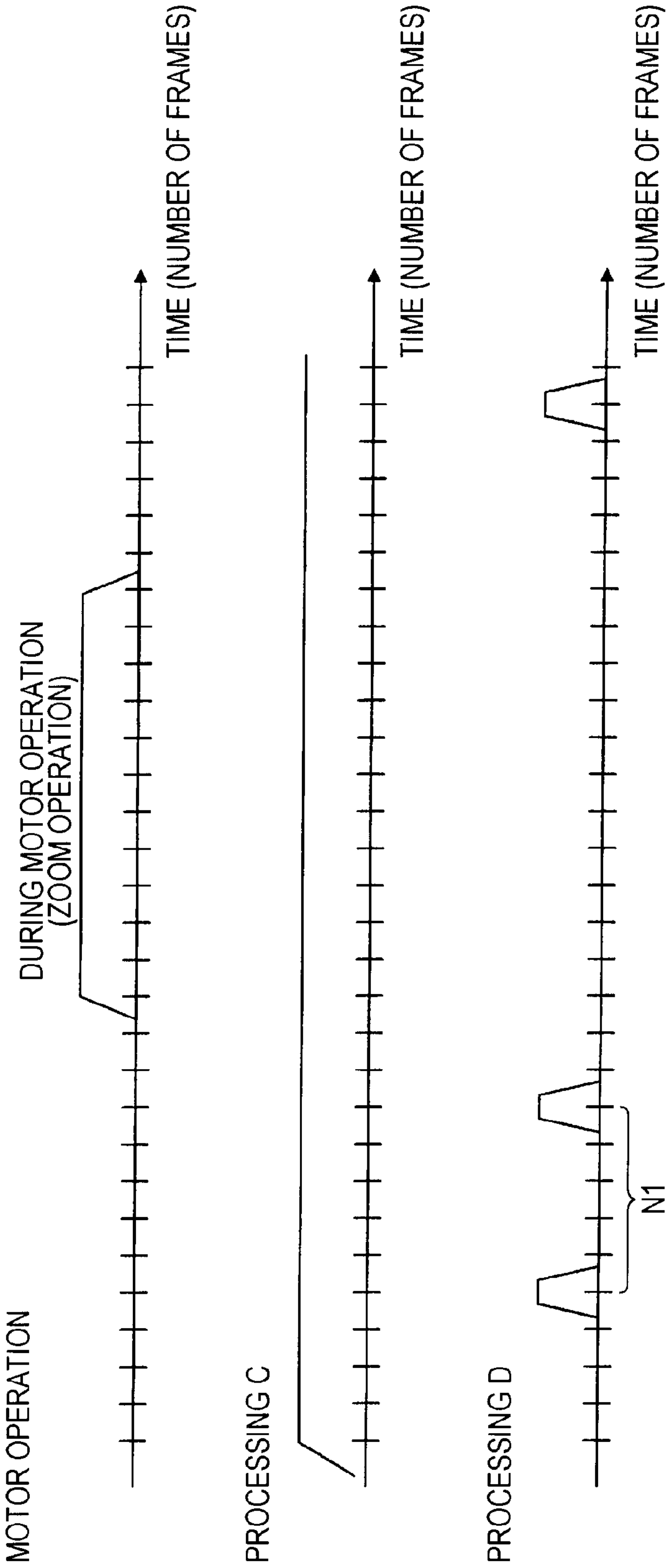
FIG. 38 is a timing chart illustrating operational timing of a mechanical sound selecting unit according to the fourth embodiment.

FIG. 38 is a timing chart showing the operating timing of the mechanical sound selecting unit 66 according to the present embodiment. Note that similar to FIG. 12, the timing chart in FIG. 38 also shows the above-mentioned frame as a standard on the temporal axis.

As shown in FIG. 38, the mechanical sound selecting unit 66 performs multiple processing (processing C and D) concurrently. Processing C is constantly performed during recording (during operating imaging) with the digital camera 1, regardless of the operation of the zoom motor 15. Processing D is performed for every N1 frames, while the operation of the zoom motor 15 is stopped.

Figure 39:
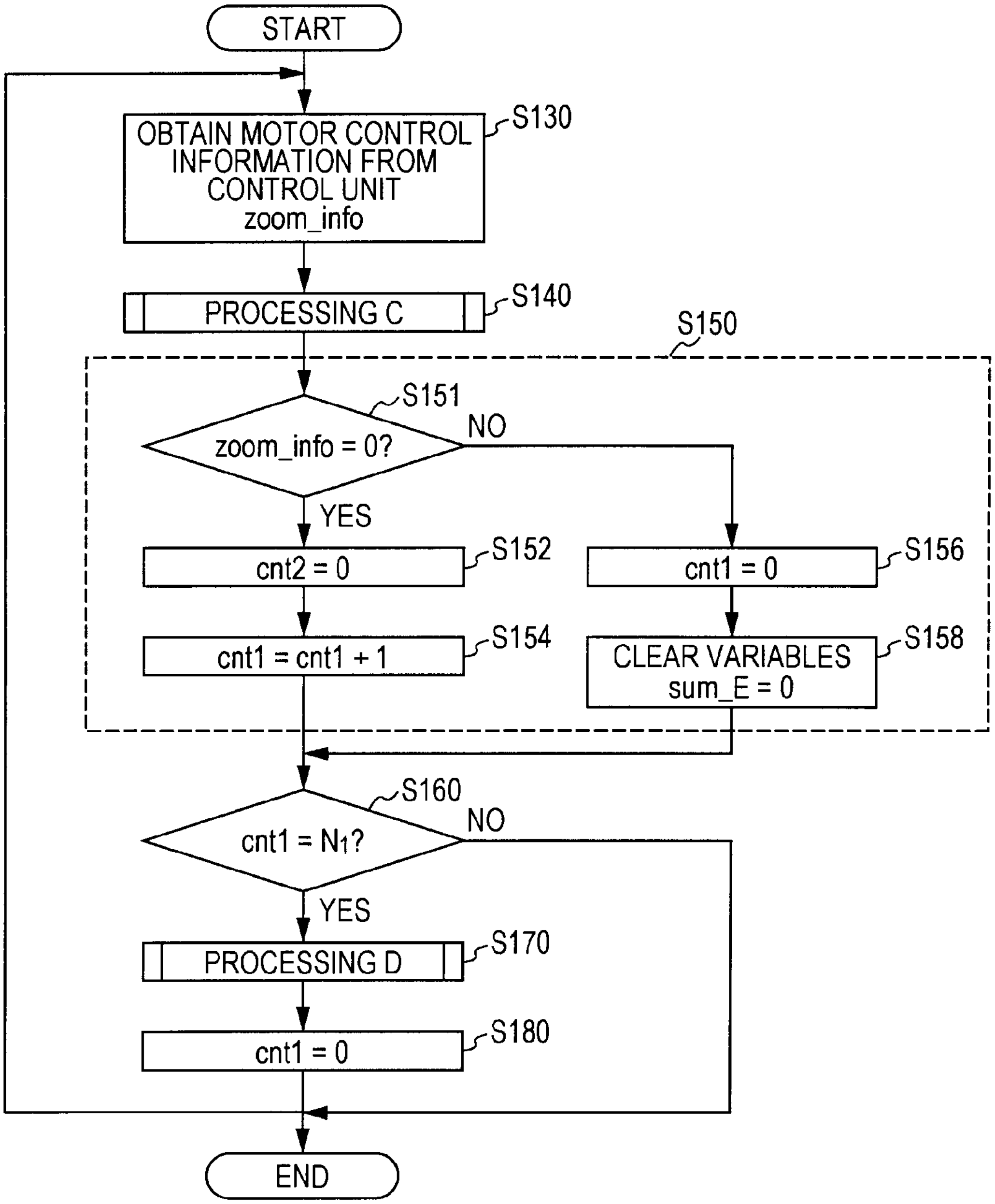
FIG. 39 is a flowchart describing overall operations of a mechanical sound selecting unit according to the fourth embodiment.

Next, the operating flow of the mechanical sound selecting unit 66 will be described. FIG. 39 is a flowchart showing the entire operation of the mechanical sound selecting unit 66 according to the present embodiment.

As shown in FIG. 39, first, the mechanical sound selecting unit 66 obtains the motor control information zoom_info indicating the operational state of the zoom motor 15 from the control unit 70 (step S130). If the value of the zoom_info is 1, the zoom motor 15 is in an operational state, and if the value of the zoom_info is 0, the zoom motor 15 is in an operation stopped state. The mechanical sound selecting unit 66 can determine whether or not there is any operation of the zoom motor 15 from the motor control information zoom_info (i.e., whether or not a zooming sound is emitted).

Next, the mechanical sound selecting unit 66 performs processing C for each frame of the audio signal x (step S140). In processing C, the mechanical sound selecting unit 66 selects the mechanical sound spectrum according to the feature amount P of the sound source environment.

Figure 40:
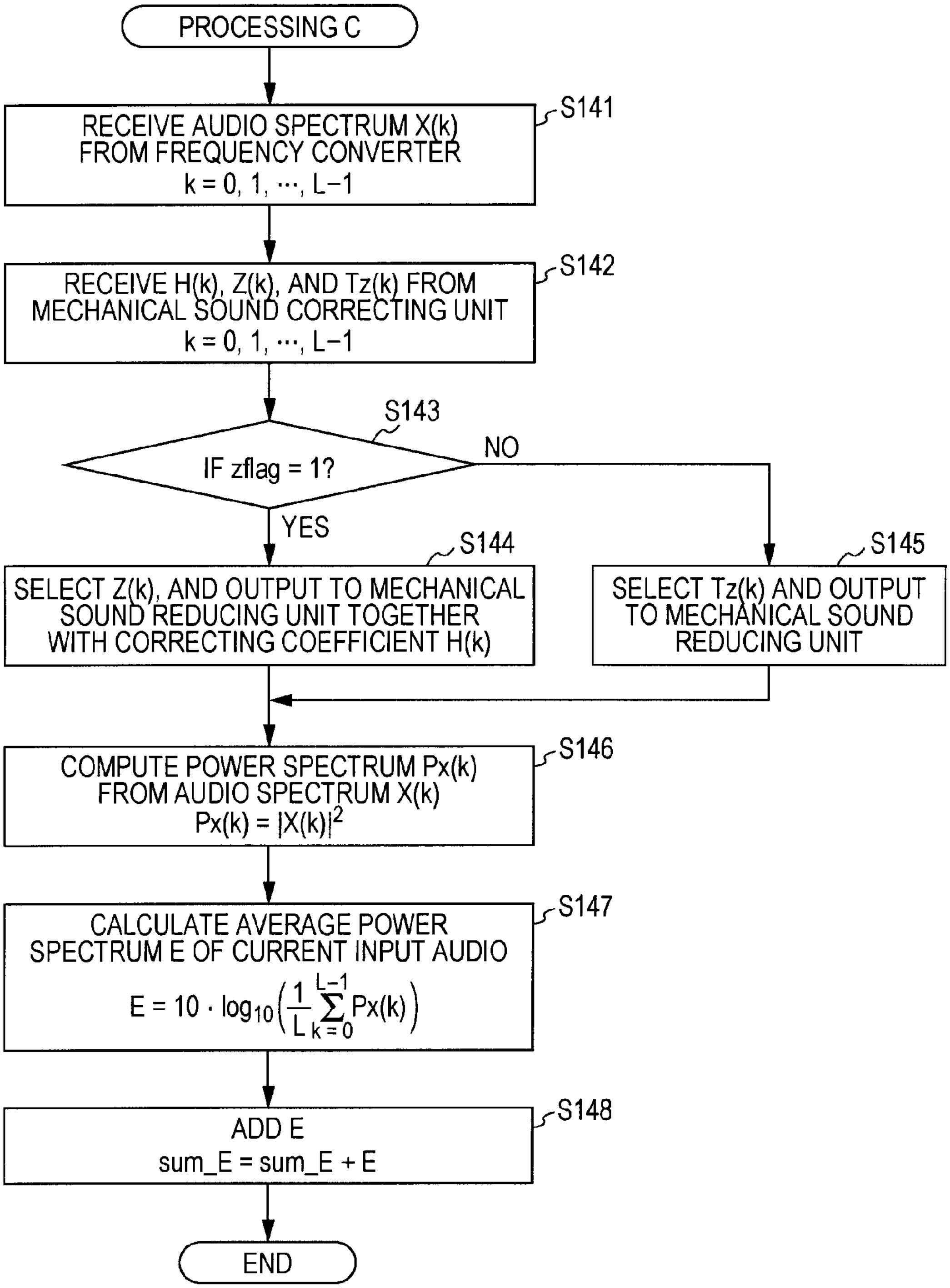
FIG. 40 is a flowchart describing a sub-routine of processing C in FIG. 39.

FIG. 40 is a flowchart showing a sub-routine of the processing C in FIG. 39. As shown in FIG. 40, first the mechanical sound selecting unit 66 receives an audio spectrum X(k) from the frequency converter 61 for each frequency component (step S141). Also, the mechanical sound selecting unit 66 receives a correcting coefficient H(k), estimated mechanical sound spectrum Z(k), and average mechanical sound spectrum Tz from the mechanical sound estimating unit 62, for each frequency component X(k) of the audio spectrum (step S142).

Next, the mechanical sound selecting unit 66 determines whether or not a flag zflag, stored in the storage unit 661, is 1 (step S143). The flag zflag is a flag to select the mechanical sound spectrum, and is set to 0 or 1 according to the feature amount P of the sound source environment by the later-described processing D.

As a result of the determination in S143, in the case that zflag=1, the mechanical sound selecting unit 66 selects the estimated mechanical sound spectrum Z(k) as the mechanical sound spectrum, and outputs the selected Z(k) together with the correcting coefficient H(k) to the mechanical sound reducing unit 64 (step S144). Thus, the mechanical sound reducing unit 64 uses the selected estimated mechanical sound spectrum Z(k) and the correcting coefficient H(k) to remove the mechanical sound components from the audio spectrum X(k).

On the other hand, in the case that zflag≠1, the mechanical sound selecting unit 66 selects the average mechanical sound spectrum Tz(k) as the mechanical sound spectrum, and outputs the selected Tz(k) to the mechanical sound reducing unit 64 (step S145). Thus, the mechanical sound reducing unit 64 uses the average mechanical sound spectrum Tz selected in S145 to remove the mechanical sound components from the audio spectrum X(k).

Next, the mechanical sound selecting unit 66 squares the audio spectrum X(k) for each of the frequency components X(k) of the audio spectrum X, and calculates the power spectrum Px(k) of the audio spectrum X(k) (step S146).

Further, the mechanical sound selecting unit 66 calculates the average of the Px(k) found in S146, and converts the increment thereof into decibels, thereby finding the average value E dB of the input audio power spectrum Px (step S147). The equation of the volume E of the input audio is expressed in Expression (16) below, for example. The average value E shows the volume of the input audio. Note that L is the number of blocks when the audio spectrum X is divided into multiple frequency blocks.

$$E = 10 \cdot \log_{10}\left(\frac{1}{L}\sum_{k=0}^{L-1} Px(k)\right) \tag{16}$$

Subsequently, the mechanical sound selecting unit 66 adds the average power spectrum E found in S147 to the integration value sum_E of the average power spectrum E stored in the storage unit 661 (step S148).

Thus, in processing C, the mechanical sound spectrum is selected, and the integration value sum_E of the average power spectrum E of the current input audio is calculated.

Next, returning to S150 in FIG. 39, description will be continued. As shown in FIG. 39, the mechanical sound selecting unit 66 counts the number of frames subjected to processing C in S140 (step S150). Specifically, in the counting processing, the number of processing frames cnt2 during operation of the zoom motor 15, and the number of processing frames cnt1 while the operation of the zoom motor 15 is stopped, are used. In the case that the operation of the zoom motor 15 is stopped (zoom_info=0) (step S151), the mechanical sound selecting unit 66 resets the cnt2 stored in the storage unit 661 to zero (step S152), an adds the cnt1 stored in the storage unit 661 to 1 (step s154). On the other hand, in the case the zoom motor 15 is operating (zoom_info=1) (step S151), the mechanical sound selecting unit 66 resets the cnt1 stored in the storage unit 661 to zero (step S156), and resets the sum_E stored in the storage unit 661 to zero (step S158).

Next, in the case that cnt1 has reached N1, and the operation of the zoom motor 15 is stopped (step S160), the mechanical sound selecting unit 66 performs processing D (step S170), and resets the cnt1 to zero (step S180).

Figure 41:
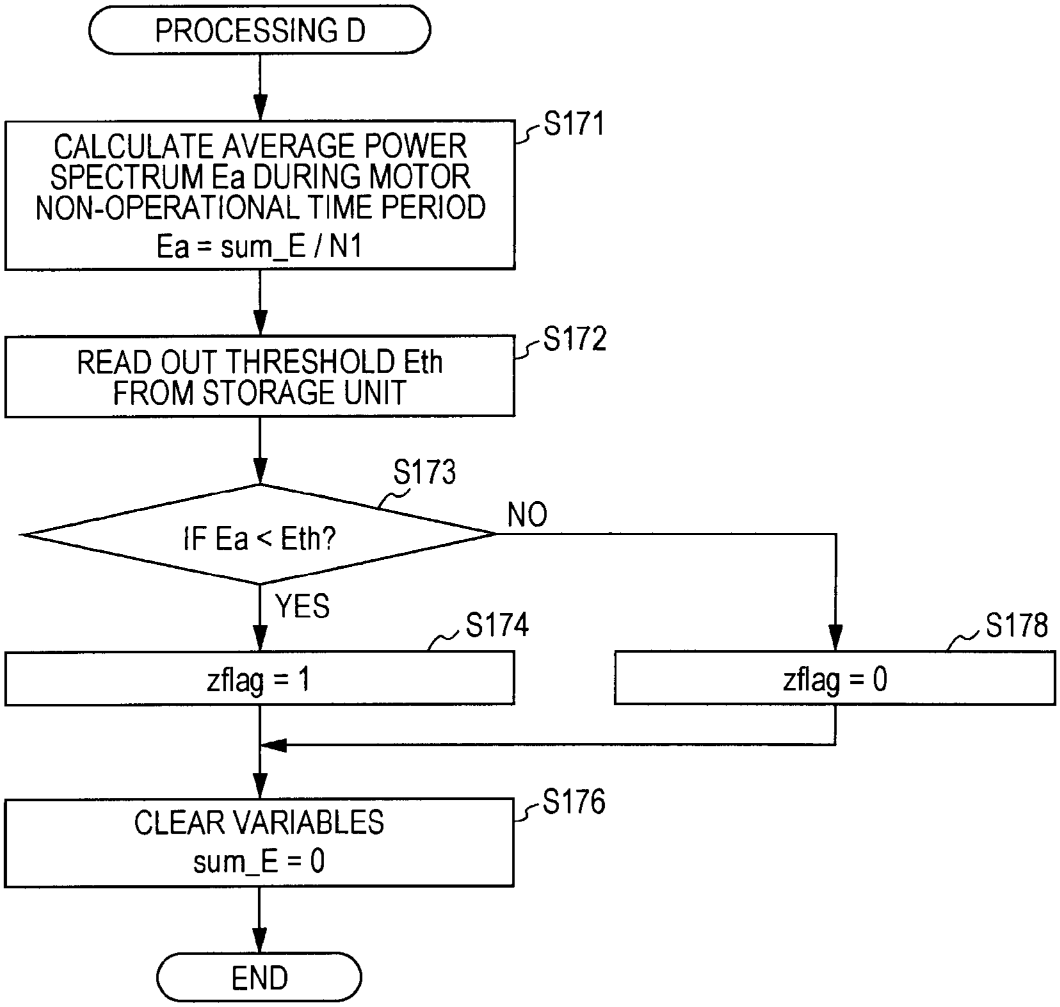
FIG. 41 is a flowchart describing a sub-routine of processing D in FIG. 39.

Now, details of the processing D performed while the operation of the zoom motor 15 is stopped (when the zooming sound is not emitted) will be described. FIG. 41 is a flowchart showing the sub-routine of the processing D in FIG. 39.

As shown in FIG. 41, first, the mechanical sound selecting unit 66 divides the integration value sum_E of the average power spectrum E by the number of frames N1, thereby calculating the average power spectrum Ea while the operation of the zoom motor 15 is stopped (step S171). Ea herein is an example of the feature amount P of the sound source environment. Further, the mechanical sound selecting unit 66 reads out the threshold Eth of the average power spectrum from the storage unit 661, as the threshold of the feature P of the sound source environment (step S172).

Next, the mechanical sound selecting unit 66 determines whether or not the average power spectrum Ea is below the threshold Eth (step S173). Consequently, in the case that Ea<Eth, the mechanical sound selecting unit 66 sets the flag zflag for mechanical sound spectrum selection to 1 (step S174), and in the case that Ea≥Eth, sets the flag zflag to 0 (step S175). Thereafter, the mechanical sound selecting unit 66 resets the integration value sum_E stored in the storage unit 661 to zero (step S176).

With the processing D above, the average power spectrum Ea is calculated as the feature amount P of the sound source environment, while the operation of the zoom motor 15 is stopped. When Ea is less than Eth, the estimated mechanical sound spectrum Z is selected, and when Ea is the same as or greater than Eth, the average mechanical sound spectrum Tz is selected.

Thus, according to the fourth embodiment, the average power spectrum Ea is calculated from the audio spectrum X while the operation of the driving device 14 is stopped, and the mechanical sound spectrum to be used is switched according to the size of the average power spectrum Ea.

The operations of the mechanical sound selecting unit 66 according to the fourth embodiment are described above. The mechanical sound selecting unit 66 calculates the average power spectrum Ea of the audio spectrum X as the feature amount P of the sound source environment, constantly, while the operation of the driving device 14 is stopped, and saves this in the storage unit 661. When the operation of the driving device 14 starts, the mechanical sound selecting unit 66 selects the estimated mechanical sound spectrum Z or the average mechanical sound spectrum Tz, according to the size of Ea.

Ea herein corresponds to the number of peripheral sound sources. Generally, when the number of sound sources increases, the sound from the multiple sound sources is added and picked up, whereby the level of external audio input into the microphones 51 and 52 increases. Therefore, the larger the average power spectrum Ea of the input audio is, the more sound sources there are in the periphery of the digital camera 1.

Accordingly, in the case of few sound sources (Ea<Eth), the estimated mechanical sound spectrum Z can be used to accurately estimate the actual mechanical sound spectrum Zreal. Thus, the mechanical sound selecting unit 66 selects an estimated mechanical sound spectrum Z that can follow the varied mechanical sounds for each device and each operation. Thus, the mechanical sound reducing unit 64 can use the estimated mechanical sound spectrum Z to adequately remove the mechanical sound from the input external audio.

On the other hand, in the case of many sound sources (Ea≥Eth), using the estimated mechanical sound spectrum Z can lead to deterioration of the desired sound, from overestimating. Thus, the mechanical sound selecting unit 66 selects the average mechanical sound spectrum Tz learned while the operation of the driving device 14 is stopped. Thus, the mechanical sound reducing unit 64 uses the average mechanical sound spectrum Tz, wherein the desired sound components are not included and only the mechanical sound components are included, to reduce the mechanical sound, whereby deterioration of the desired sound by overestimation can be prevented for certain.

5. Fifth Embodiment

Next, an overview of a mechanical sound reducing method by an audio signal processing device and method according to a fifth embodiment of the present disclosure will be described. The fifth embodiment differs from the fourth embodiment in that correlation of the signals obtained from the two microphones 51 and 52 is used as the feature amount P of the sound source environment. The other functional configurations of the fifth embodiment are substantially the same as the fourth embodiment, so detailed descriptions thereof will be omitted.

The mechanical sound selecting unit 66 according to the fourth embodiment uses the average power spectrum Ea of the audio spectrum X obtained from one of the microphones 51 or 52, as the feature amount P of the sound source environment, to select the mechanical sound spectrum. Conversely, the mechanical sound selecting unit 66 according to the fifth embodiment uses correlation of the audio spectrums $X_L$ and $X_R$ obtained from the two microphones 51 and 52, as the feature amount P of the sound source environment, to select the mechanical sound spectrum.

5.1. Functional Configuration of Audio Signal Processing Device

Figure 42:
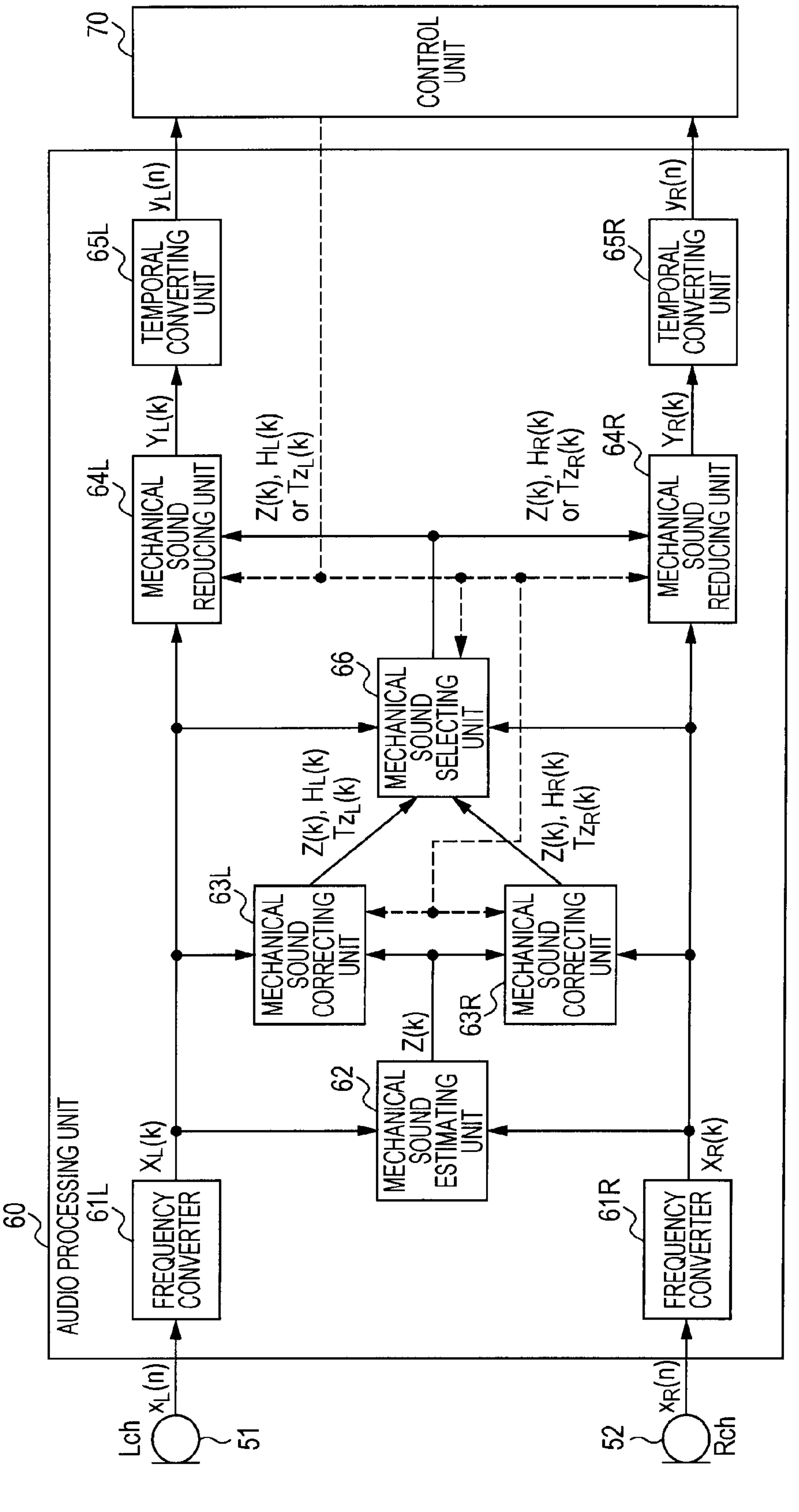
FIG. 42 is a block diagram illustrating a functional configuration of an audio signal processing device according to a fifth embodiment of the present disclosure.

First, a functional configuration example of the audio signal processing device applied to the digital camera 1 according to the fifth embodiment will be described with reference to FIG. 42. FIG. 42 is a block diagram showing a functional configuration of an audio signal processing device according to the present embodiment.

As shown in FIG. 42, the audio signal processing device according to the present embodiment has one common mechanical sound selecting unit 66 between the Left channel and Right channel. The average mechanical sound spectrum signals $Tz_L$ and $Tz_R$, estimated mechanical sound spectrum Z, and correcting coefficients $H_L$ and $H_R$ are input into the mechanical sound selecting unit 66 from the mechanical sound correcting units 63L and 63R, and the audio spectrums $X_L$ and $X_R$ are input from the frequency converters 61L and 61R.

The mechanical sound selecting unit 66 generates the feature amount P of the sound source environment common between the Left channel and Right channel, based on the correlation of the audio spectrums $X_L$ and $X_R$ input from both microphones 51 and 52, and selects one of the estimated mechanical sound spectrum Z or average mechanical sound spectrum Tz, based on the feature amount P. For example, the mechanical sound selecting unit 66 selects the mechanical sound spectrum to be used for Left channel mechanical sound reduction, and selects the mechanical sound spectrum to be used for Right channel mechanical sound reduction, based on the feature amount P of the sound source environment.

5.2. Principle of Mechanical Sound Selecting

Next, the principle for using the correlation (e.g. correlation C(k)) of the audio spectrums $X_L$ and $X_R$ as the feature P of the sound source environment will be described.

Figure 43:
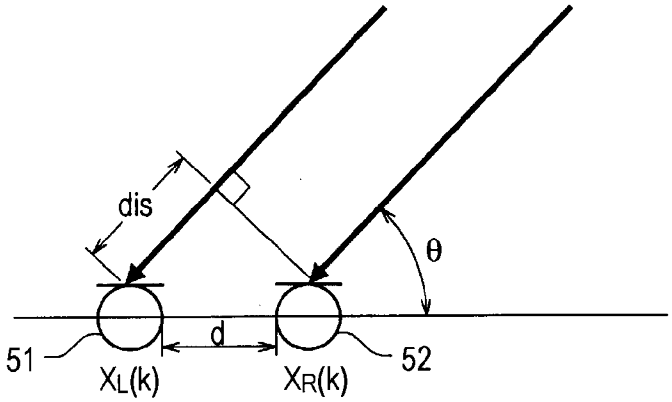
FIG. 43 is an explanatory diagram describing the correlation between two microphones according to the fifth embodiment.

FIG. 43 is an explanatory diagram showing the correlation between the two microphones 51 and 52 according to the present embodiment. As shown in FIG. 43, a case is considered wherein audio arrives at the two microphones 51 and 52 from the direction of a certain angle θ, as to the direction that the microphones 51 and 52 are arrayed. In this case, an arrival time difference occurs in the amount of an arrival distance difference dis, between the audio input into the microphone 51 and the audio input into the microphone 52. Now, the correlation value C(k) between the input audio signal $X_L(k)$ of the microphone 51 and the input audio signal $X_R(k)$ of the microphone 52 is shown in the following Expression (17).

$$C(k) = \frac{Re(E[X_R(k) \cdot X_L^*(k)])}{\sqrt{E[|X_L(k)|^2]}\sqrt{E[|X_R(k)|^2]}} \quad (17)$$

In a sound source environment having many sound sources in the periphery of the microphones 51 and 52, we may consider that audio arrives from all directions in the periphery of the microphones 51 and 52. Such a sound source environment state can be expressed by a diffuse sound field for example. The correlation value rC(k) of the diffuse sound field is calculated with the following Expression (18).

$$rC(k) = \frac{\sin(\omega(k)\cdot d/c)}{\omega(k)\cdot d/c} \tag{18}$$

In this Expression (18)

d: distance between microphones c: sound speed (e.g., 340 m/s)

ω(k): angular frequency.

Also, if we say that the sampling frequency as to a frequency bin k obtained as a result of an N-point FFT is Fs, then ω(k) can be expressed with the following Expression (19).

$$\omega(k) = 2\pi\cdot\frac{Fs}{N}\cdot k \tag{19}$$

Figure 44:
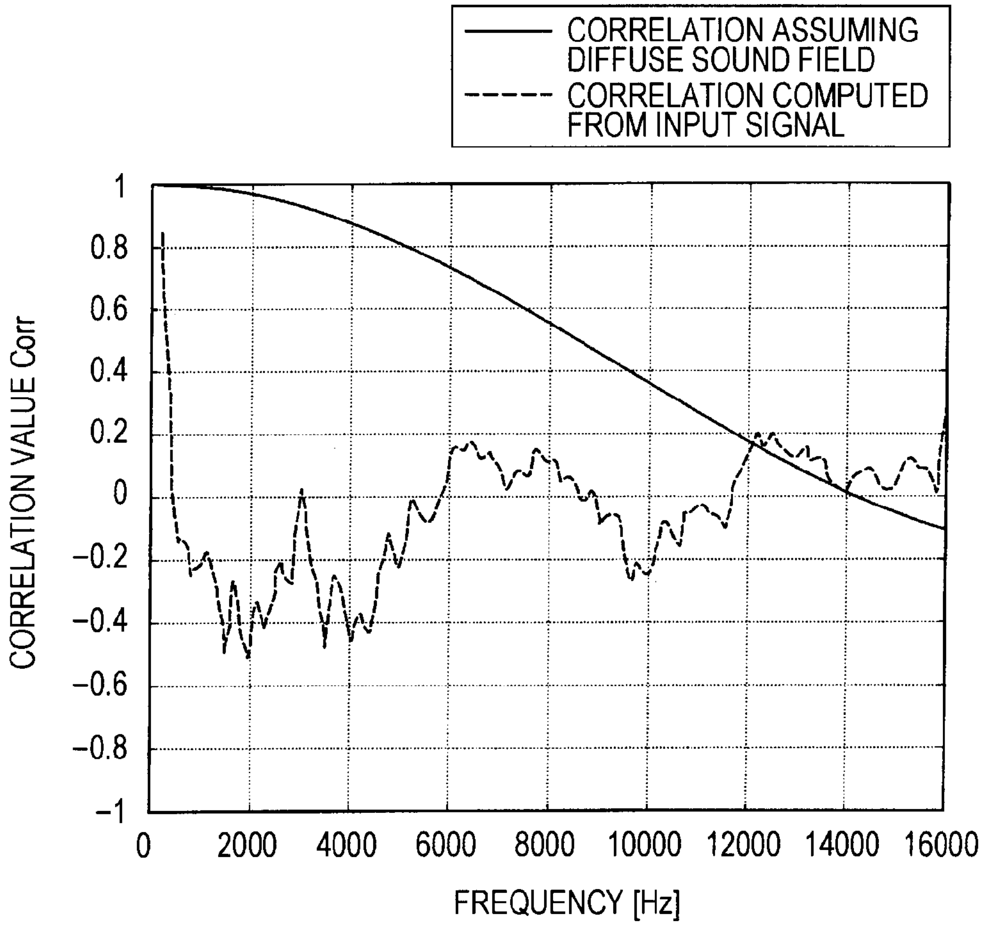
FIG. 44 is an explanatory diagram describing the correlation in the case that the mechanical sound spectrum can be adequately estimated.
Figure 45:
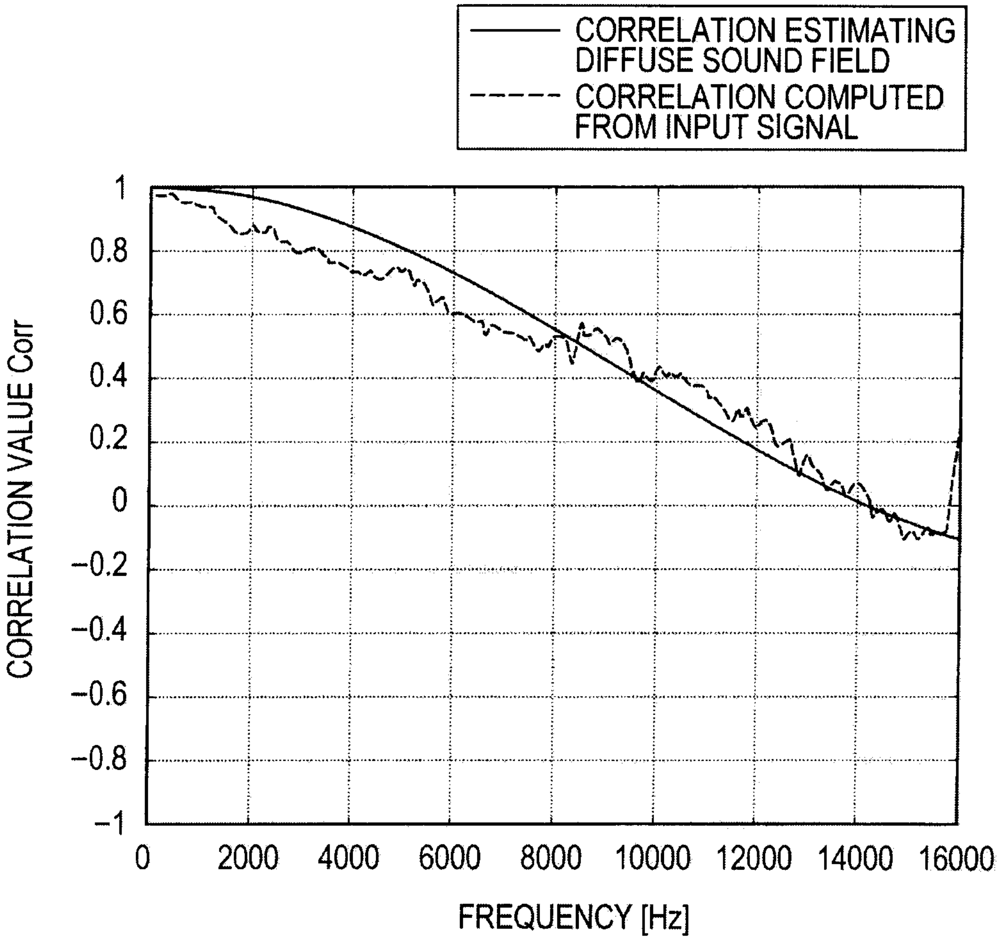
FIG. 45 is an explanatory diagram describing the correlation in the case that the mechanical sound spectrum is not adequately estimated.

Accordingly, as shown in FIGS. 44 and 45, by comparing the correlation value C(k) for each frequency computed from the actual audio signals $x_L(k)$ and $x_R(k)$ input into the microphones 51 and 52 with the correlation value rC(k) assuming the diffuse sound field as described above, the sound source environment in the periphery of the microphones 51 and 52 can be estimated. Note that FIGS. 44 and 45 show a correlation in the case that the distance between the two microphones is d=1.2 cm, θ=15°.

FIG. 44 shows a correlation in the case that the mechanical sound spectrum can be adequately estimated with the mechanical sound estimating unit 62. As shown in FIG. 44, in the case that the correlation value C(k) computed from the actual input audio signal and the correlation value rC(k) assuming the diffuse sound field differ, the sound source environment in the periphery of the microphones 51 and 52 is not a diffuse sound field, so the number of sound sources can be estimated to be small. Accordingly, in this case the estimated mechanical sound spectrum Z applied to the actual mechanical sound Zreal can be estimated with the mechanical sound estimating unit 62. Accordingly, in order to increase the removal precision of the mechanical sound, it is favorable to select the estimated mechanical sound spectrum Z with the mechanical sound correcting unit 63.

On the other hand, FIG. 45 shows the correlation in a case wherein the mechanical sound spectrum is not adequately estimated by the mechanical sound estimating unit 62. As shown in FIG. 45, in the case that the correlation value C(k) computed from the actual input audio signal and the correlation value rC(k) assuming a dispersion sound field match one another approximately, the sound source environment in the periphery of the microphones 51 and 52 is a diffuse sound field, so the number of sound sources can be estimated to be large. Accordingly, in this case, with the mechanical sound estimating unit 62, estimating the estimated mechanical sound spectrum Z applied to the actual mechanical sound Zreal is difficult, and the desired sound can deteriorate due to overestimation. Therefore, in order to prevent deterioration of the desired sound due to overestimation of the mechanical sound, it is favorable for the mechanical sound correcting unit 63 to select the average mechanical sound spectrum Tz.

5.3. Basic Operations of Mechanical Sound Selecting

Figure 46:
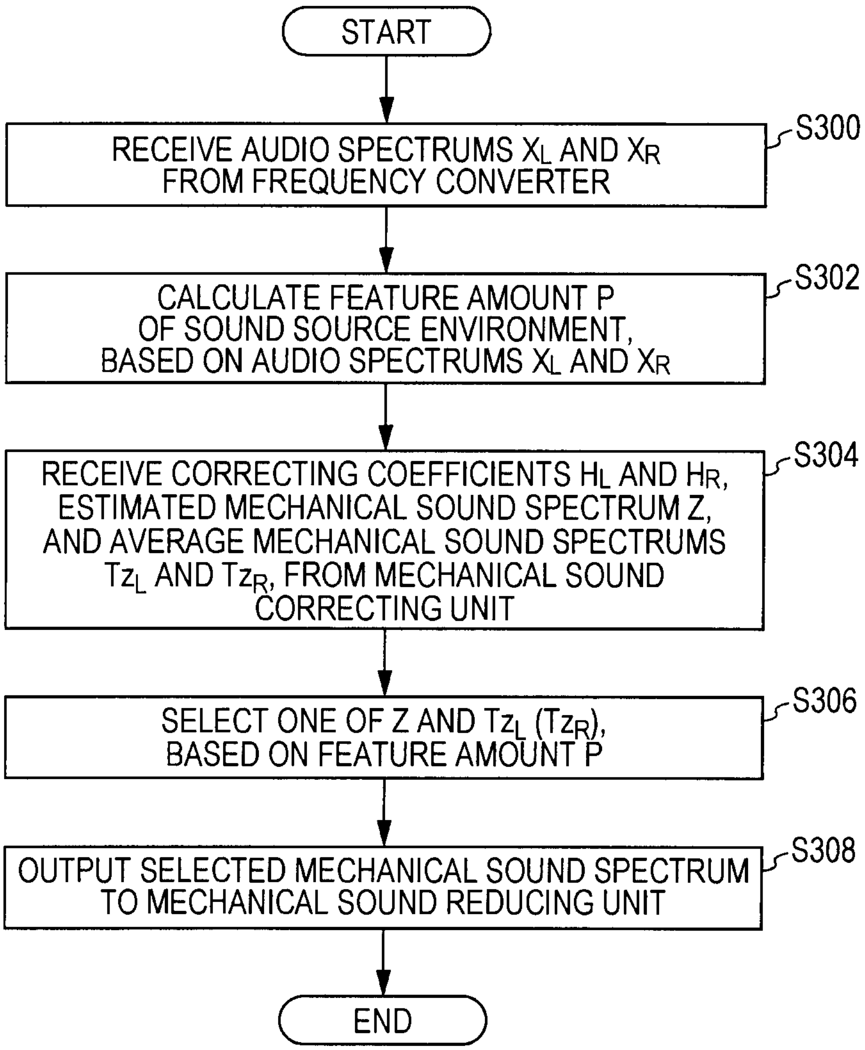
FIG. 46 is a flowchart showing operations of a mechanical sound selecting unit according to the fifth embodiment.

Next, operations of the mechanical sound selecting unit 66 according to the present embodiment will be described with reference to FIG. 46. FIG. 46 is a flowchart describing the operations of the mechanical sound selecting unit 66 according to the present embodiment. Note that with the present embodiment, a mechanical sound spectrum is selected for every frame subjected to frequency conversion. That is to say, with a certain frame, the average mechanical sound spectrums $Tz_L$, and $Tz_R$, and with another frame, the estimated mechanical sound spectrum Z obtained from the mechanical sound estimating unit, is used.

As shown in FIG. 46, first the mechanical selecting unit 66 receives the audio spectrums $X_L$ and $X_R$ (stereo signal) from the frequency converters 61L and 62R (step S300). Next, the mechanical selecting unit 66 calculates the correlation value C for example, as the feature amount P of the sound source environment, based on the audio spectrums $X_L$ and $X_R$ (step S302). Details of the calculation processing for the feature amount P (e.g., C) will be described later.

Further, the mechanical selecting unit 66 receives the estimated mechanical sound spectrum Z, correlating coefficients $H_L$ and $H_R$, and average mechanical sound spectrums $Tz_L$ and $Tz_R$ from the mechanical sound correcting units 63L and 63R (step S304). Next, the mechanical selecting unit 66 selects one of the estimated mechanical sound spectrum Z or average mechanical sound spectrums $Tz_L$ and $Tz_R$, based on the feature amount P of the sound source environment calculated in S302 (step S306). Subsequently, the mechanical selecting unit 66 outputs the Left channel mechanical sound spectrum Z or $Tz_L$ and correcting coefficient $H_L$ selected in S306 to the mechanical sound reducing unit 64L, and outputs the Right channel mechanical sound spectrum Z or $Tz_R$ and correcting coefficient $H_R$ selected in S306 to the mechanical sound reducing unit 64R (step S308).

5.4. Detailed Operations of Mechanical Sound Selecting

Next, the detailed operations of the mechanical sound selecting unit 66 according to the present embodiment will be described with reference to FIGS. 47 through 50. In the description below, Left channel and Right channel are not differentiated, but the mechanical sound selecting units 66L and 66R each perform processing using the signals and values for Left channel ($X_L$, $H_L$, $Tz_L$) or the signals and values for Right channel ($X_R$, $H_R$, $TZ_R$), respectively.

The operating timing of the mechanical sound selecting unit 66 according to the fifth embodiment are substantially the same as the operating timing of the mechanical sound correcting unit 63 according to the fourth embodiment described above (see FIG. 38). The mechanical sound selecting unit 66 executes processing D while the motor operation is stopped, while constantly performing processing C, and calculates the average power spectrum Ea of the audio spectrum X.

Also, the basic operating flow of the mechanical sound correcting unit 63 according to the fifth embodiment is similar to the fourth embodiment (see FIG. 39). However, the fifth embodiment differs from the fourth embodiment in the specific processing content of the processing C, processing D, and S158. In processing C and processing D according to the fifth embodiment, the mechanical sound spectrum is selected using not the average power spectrum Ea of the audio spectrum X as in the fourth embodiment, but rather the correlation value C(k) of the audio spectrums $X_L$ and $X_R$, as the feature amount P of the sound source environment. Also, with the fifth embodiment, in S158 in FIG. 39, a later-described sum_C(k) is reset instead of the sum_E. The flows of processing C and processing D according to the fifth embodiment will be described below.

Figure 47:
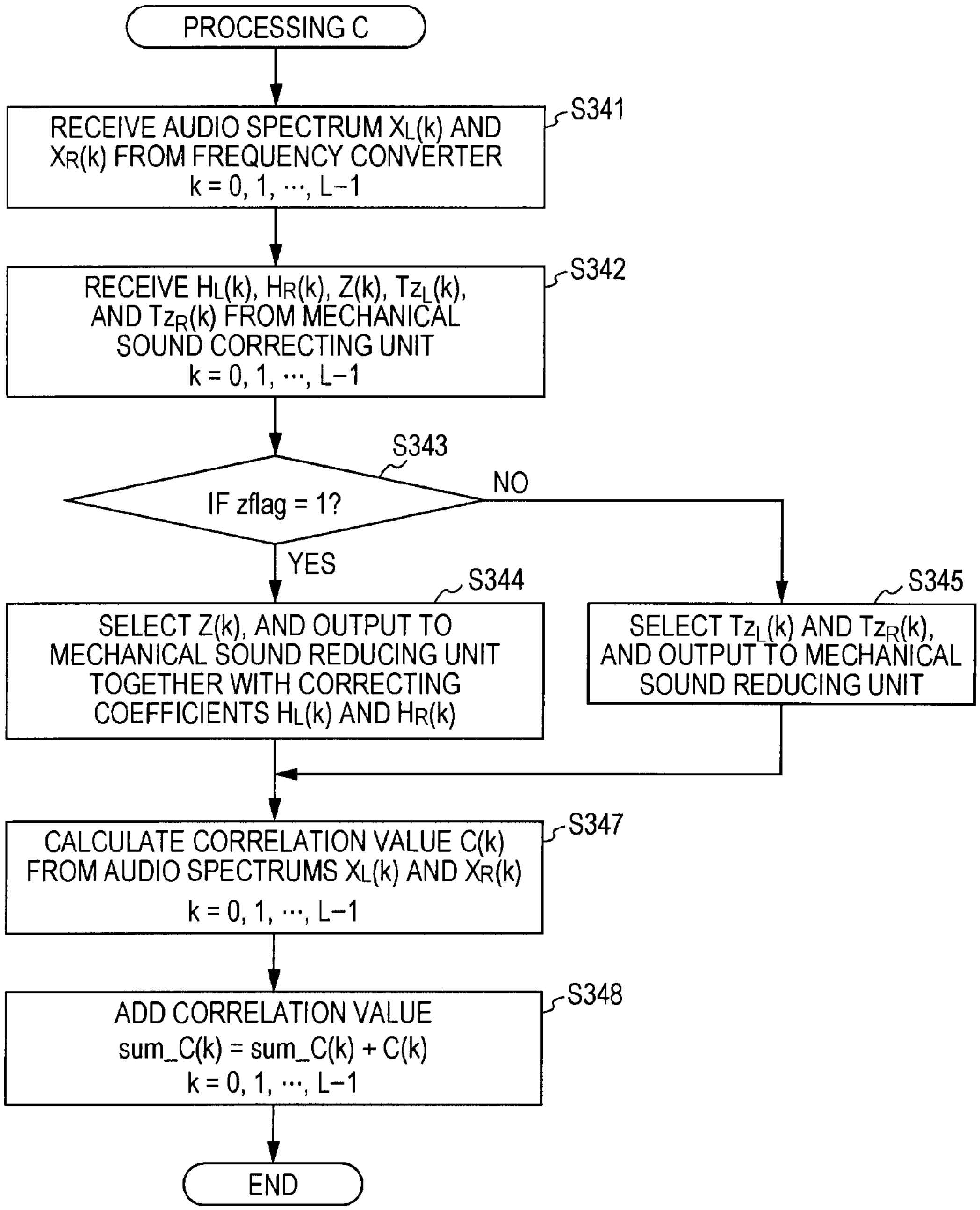
FIG. 47 is a flowchart describing a sub-routine of processing C in FIG. 39 according to the fifth embodiment.

FIG. 47 is a flowchart showing a sub-routine of processing C in FIG. 39 according to the fifth embodiment. In processing C, the mechanical sound selecting unit 66 selects a mechanical sound spectrum, based on the correlation value c(k) of the actual audio spectrums $X_L$ and $X_R$ input from the microphones 51 and 52, as the feature amount P of the sound source environment.

As shown in FIG. 47, first the mechanical sound selecting unit 66 receives the audio spectrums $X_L(k)$ and $X_R(k)$ from the two frequency converters 61L and 61R, for each of the audio spectrum frequency components (step S341). Also, the mechanical sound selecting unit 66 receives the correcting coefficients $H_L(k)$ and $H_R(k)$, the estimated mechanical sound spectrum Z(k), and average mechanical sound spectrum $Tz_L(k)$ and $Tz_R(k)$ from the mechanical sound estimating unit 62, for each of the frequency components X(k) of the audio spectrum (step S342).

Next, the mechanical sound selecting unit 66 determines whether or not the flag zflag for mechanical sound spectrum selecting, which is stored in the storage unit 661, is 1 (step s343). As a result of this determination, in the case that zflag=1, the mechanical sound selecting unit 66 selects the estimated mechanical sound spectrum Z(k) as the mechanical sound spectrum, and outputs the selected Z(k), together with the correcting coefficients $H_L(k)$ and $H_R(k)$, to the mechanical sound reducing units 64L and 64R, respectively (step S344). On the other hand, in the case that zflag≠1, the mechanical sound selecting unit 66 selects the average mechanical sound spectrum Tz as the mechanical sound spectrum, and outputs the selected $TZ_L(k)$ and $Tz_R(k)$ to the mechanical sound reducing units 64L and 64R, respectively (step S345).

Next, the mechanical sound selecting unit 66 calculates the correlation value C(k) of the audio spectrum XL(k) and audio spectrum XR(k), for each of the frequency components X(k) of the audio spectrum X (step S347). The correlation value C(k) herein is calculated using Expression (17) above. Thereafter, the mechanical sound selecting unit 66 adds the correlation value C(k) found in S347 to the integration value sum_C(k) of the correlation value C(k) stored in the storage unit 661 (step S348).

As shown above, in processing C, the mechanical sound spectrum is selected, and the integration value sum_C(k) of the correlation value C(k) of the audio spectrums XL(k) and XR(k) is calculated. The integration value sum_C(k) of the correlation value C(k) is used to find the feature amount P of the sound source environment in which the digital camera 1 exists, for the later-described processing D.

Figure 48:
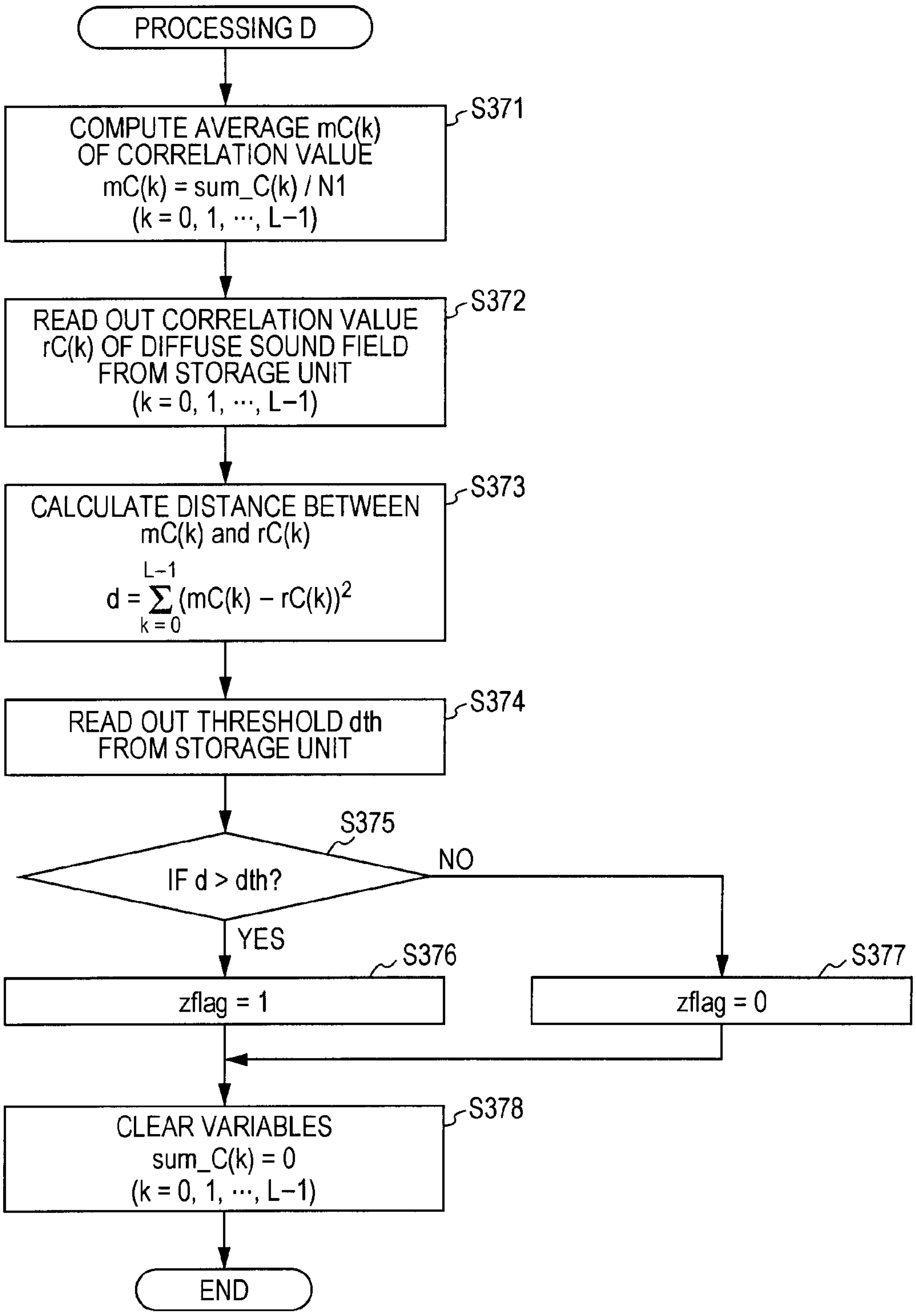
FIG. 48 is a flowchart describing a sub-routine of processing D in FIG. 39 according to the fifth embodiment.

Next, processing D which is performed while the operation of the zoom motor 15 is stopped (while the zooming sound is not emitted) will be described. FIG. 48 is a flowchart describing a sub-routine of the processing D in FIG. 39 according to the fifth embodiment.

As shown in FIG. 48, first the mechanical sound selecting unit 66 divides the integration value sum_C(k) of the correlation value C(k) obtained in processing C by the number of frames N1, thereby calculating the average value mC(k) of the correlation value C(k) while the operation of the zoom motor 15 is stopped (step S371). Further, the mechanical sound selecting unit 66 reads out the correlation value rC(k) in a diffuse sound field from the storage unit 661 (step S172). The correlation value rC(k) in the diffuse sound field is calculated with the above-described Expressions (18) and (19).

Next, the mechanical sound selecting unit 66 calculates the distance d between the average value mC(k) of the correlation value C(k) obtained in S371 and the correlation value rC(k) obtained in S372 (step S373). The distance d herein is calculated with the following Expression (2). The distance d herein is an example of the feature amount P of the sound source environment.

$$d = \sum_{k=0}^{L-1} (mC(k) - rC(k))^2 \tag{20}$$

Further, the mechanical sound selecting unit 66 reads out a threshold dth from the storage unit 661, as a threshold of the feature amount P of the sound source environment (step S374). The threshold dth is set to an appropriate value according to the specifications of the digital camera 1 and driving device 14, and sound source environment state and so forth, and is saved in the storage unit 661.

Next, the mechanical sound selecting unit 66 determines whether or not the distance d found in S373 is less than the threshold dth (step S375). As a result thereof, in the case that d>dth, the mechanical sound selecting unit 66 sets the flag zflag for mechanical sound spectrum selection to 1 (step S376), and in the case that d≤dth, sets the flag zflag to 0 (step S377). Subsequently, the mechanical sound selecting unit 66 rests the integration value sum_C(k) stored in the storage unit 661 to zero (step S378).

With the processing D above, the distance d between the average value mC(k) of the correlation value of the audio spectrums XL(k) and XR(k) and the correlation value rC(k) of a diffuse sound field is calculated as the feature amount P of the sound source environment, while the operation of the zoom motor 15 is stopped. When d exceeds dth, the estimated mechanical sound spectrum Z is selected, and when d is less than dth, the average mechanical sound spectrums $Tz_L$ and $Tz_R$ are selected.

Thus, according to the fifth embodiment, an average value mC(k) of the correlation value of the actual audio spectrums $X_L$ and $X_R$ is calculating while the operation of the driving device 14 is stopped, and the mechanical sound spectrum to be used is switched according to the distance d between the mC(k) and the correlation value rC(k) of the diffuse sound field.

The operation of the mechanical sound selecting unit 66 according to the fifth embodiment is described above. The mechanical sound selecting unit 66 calculates the average value mC(k) of the correlation value of the actual audio spectrums $X_L$ and $X_R$, constantly while the operation of the driving device 14 is stopped, as the feature amount P of the sound source environment, and stores this in the storage unit 661. When the operation of the driving device 14 starts, the mechanical sound selecting unit 66 selects the estimated mechanical sound spectrum Z or the average mechanical sound spectrum Tz, according to the distance d between mC(k) and C(k).

d herein indicates whether or not the sound source environment of the periphery of the digital camera 1 is a diffuse sound field. As described above, if the sound source environment is a diffuse sound field, there are many peripheral sound sources, and audio will be input from many directions into the microphones 51 and 52.

Accordingly, in the case that the sound source environment is not a diffuse sound field (d>dth), the actual mechanical sound spectrum Zreal can be accurately estimated, using the estimated mechanical sound spectrum Z. Thus, the mechanical sound selecting unit 66 selects an estimated mechanical sound spectrum Z that can follow the varied mechanical sounds for each device and each operation. Thus, the mechanical sound reducing unit 64 can use the estimated mechanical sound spectrum Z to adequately remove the mechanical sound from the input external audio.

On the other hand, in the case that the sound source environment is close to a diffuse sound field (d≤dth), using the estimated mechanical sound spectrum Z can lead to deterioration of the desired sound, from overestimating. Thus, the mechanical sound selecting unit 66 selects the average mechanical sound spectrum Tz learned while the operation of the driving device 14 is stopped. Thus, the mechanical sound reducing unit 64 uses the average mechanical sound spectrum Tz, wherein the desired sound components are not included and only the mechanical sound components are included, to reduce the mechanical sound, whereby deterioration of the desired sound by overestimation can be prevented for certain.

6. Sixth Embodiment

Next, an overview of a mechanical sound reduction method by an audio signal processing device and method according to a sixth embodiment of the present disclosure will be described. The sixth embodiment differs from the fourth embodiment in that that the mechanical sound spectrum Z estimated by the mechanical sound estimating unit 62 is used as the feature amount P of the sound source environment. The other functional configurations of the sixth embodiment are substantially the same as the fourth embodiment, so the detailed description thereof will be omitted.

6.1. Functional Configuration of Audio Signal Processing Device

Figure 49:
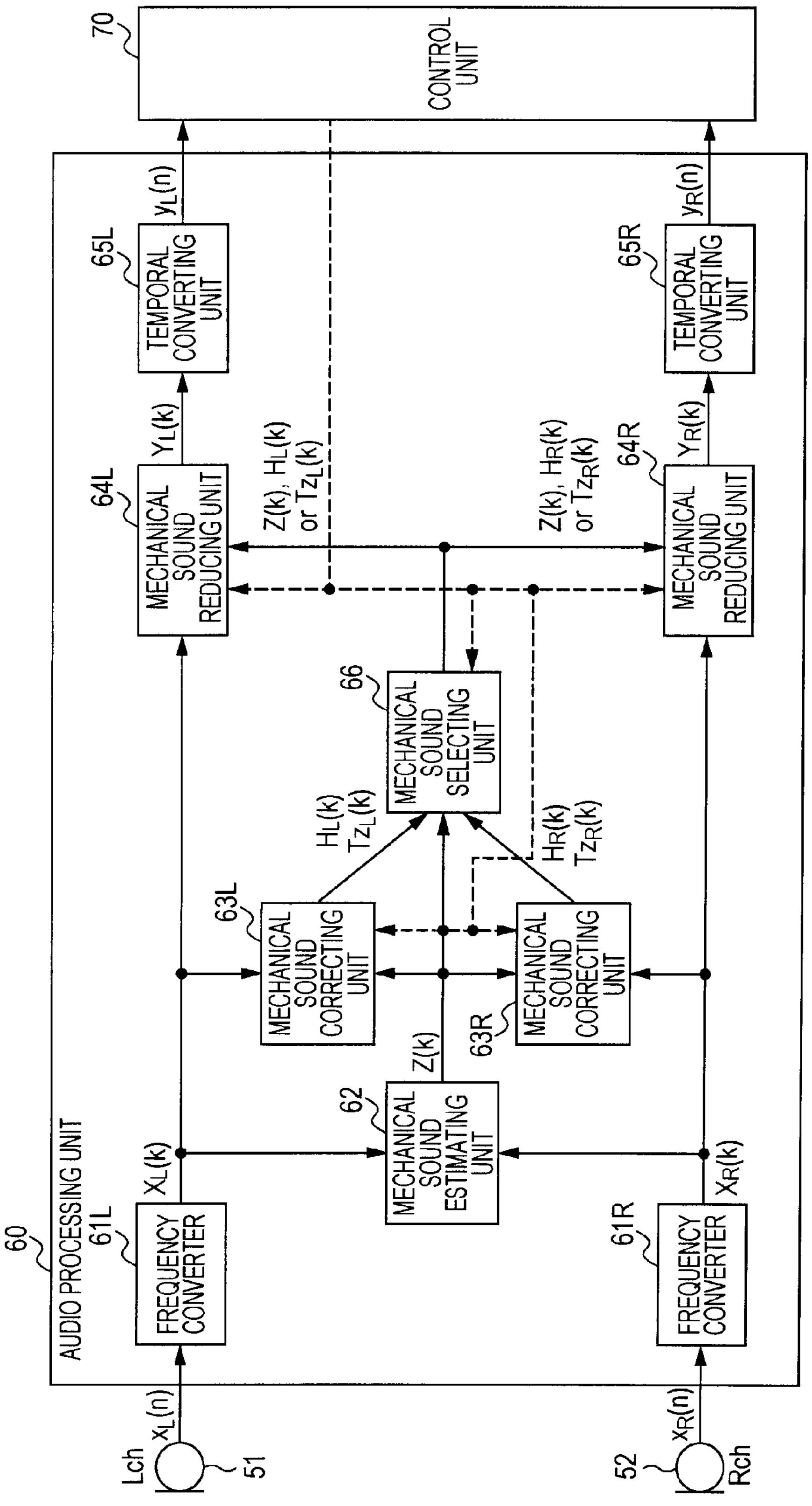
FIG. 49 is a block diagram illustrating a functional configuration of an audio signal processing device according to a sixth embodiment of the present disclosure.

First, a functional configuration example of the audio signal processing device applied to the digital camera 1 according to the sixth embodiment will be described with reference to FIG. 49. FIG. 49 is a block diagram showing a functional configuration of the audio signal processing device according to the present embodiment.

As shown in FIG. 42, the audio signal processing device according to the sixth embodiment has one common mechanical sound selecting unit 66 between the Left channel and Right channel. The average mechanical sound spectrum signals $Tz_L$ and $Tz_R$ and the correcting coefficients $H_L$ and $H_R$ are input into the mechanical sound selecting unit 66 from the mechanical sound correcting units 63L and 63R, and the audio spectrums $X_L$ and $X_R$ are input from the frequency converters 61L and 61R. Further, the estimated mechanical sound spectrum Z is input into the mechanical sound selecting unit 66 from the mechanical sound estimating unit 62. The mechanical sound selecting unit 66 selects the mechanical sound spectrum to be used by the mechanical sound reducing unit 64 from among the estimated mechanical sound spectrum Z or the average mechanical spectrum Tz, based on the signal level of the estimated mechanical spectrum Z.

6.2. Details of Mechanical Sound Selecting Unit

The mechanical sound selecting unit 66 generates a feature amount P of the sound source environment that is common to the Left channel and Right channel, based on the signal level of the estimated mechanical sound spectrum Z input from the mechanical sound estimating unit 62 (energy of Z), and selects one or the other of the estimated mechanical sound spectrum Z or the average mechanical spectrum Tz, based on the feature amount P. For example, the mechanical sound selecting unit 66 selects the mechanical sound spectrum to be used for Left channel mechanical sound reduction, and selects the mechanical sound spectrum to be used for Right channel mechanical sound reduction, based on the feature amount P of the sound source environment.

In the case that the signal level of the estimated sound spectrum Z obtained with the mechanical sound estimating unit 62 is low, we can estimate that the mechanical sound is not buried in the desired sound, and that peripheral sound sources are few. Now, in the case that the signal level of the estimated mechanical sound spectrum Z is lower than a predetermined threshold that has been set beforehand, the mechanical sound selecting unit 66 selects the estimated mechanical sound spectrum Z. Thus, the mechanical sound spectrum can be estimated with high precision and adequately be removed from the desired sound.

On the other hand, in the case that the signal level of the estimated sound spectrum Z obtained with the mechanical sound estimating unit 62 is high, there is a possibility that the mechanical sound is buried in the desired sound that that deterioration of the desired sound can occur from overestimation of the mechanical sound. Now, in the case that the signal level of the estimated mechanical sound spectrum Z is higher than a predetermined threshold that has been set beforehand, the mechanical sound selecting unit 66 selects the average mechanical sound spectrum Tz. Thus, the mechanical sound can be removed to a certain extent, and sound quality deterioration of the desired sound can be prevented for certain.

As described above, the mechanical sound selecting unit 66 according to the sixth embodiment calculates the feature amount P of the sound source environment, based on the output signal of the mechanical sound estimating unit 62, not on the input audio signal to the microphones 51 and 52. With this configuration, an audio signal processing device that is more practical than the fourth and fifth embodiments can be provided.

Note that the operating flow of the mechanical sound selecting unit 66 according to the sixth embodiment, other than using the average power spectrum of the estimating mechanical sound spectrum Z, can be realized similar to the fourth embodiment, so detailed description will be omitted (see FIGS. 38 through 41).

The configuration and operation of the mechanical sound selecting unit 66 according to the fourth through sixth embodiments are described above. According to the fourth through sixth embodiments, methods that select the estimated mechanical sound spectrum Z or the average mechanical sound spectrum Tz in order to suppress overestimation of the mechanical sound by the mechanical sound estimating unit 62 are described. However, the present disclosure is not limited to these examples, and the mechanical sound selecting unit 66 may calculate a weighted sum of both the mechanical sound spectrums Z and Tz, for example, as the mechanical sound spectrum used by the mechanical sound reducing unit 64. Also, the mechanical sound selecting unit 66 may multiply the estimated mechanical sound spectrum Z by k times ($0<k<1$), according to the peripheral sound source environment, and may use the Z that has been multiplied by k as the mechanical sound spectrum used by the mechanical sound reducing unit 64.

Also, the average mechanical sound spectrum Tz selected by the mechanical sound selecting unit 66 may use a template of an average mechanical sound spectrum measured beforehand (fixed template), instead of a template obtained by learning the mechanical sound spectrum with individual digital cameras 1 (dynamically changing template).

7. Conclusion

Details of audio signal processing devices and methods according to preferred embodiments of the present disclosure have been described above. According to the present embodiments, an audio signal input from two stereo microphones 51 and 52 can be used, the mechanical sound spectrum included in the external audio spectrum accurately estimated, and the mechanical sound adequately removed from the external audio, during recording of a moving picture and audio by the digital camera 1.

Accordingly, with the present embodiments, the mechanical sound can be removed even without using a mechanical sound spectrum template as had been used in the past. Therefore, the adjustment cost of measuring the mechanical sound using multiple cameras and creating a template, as had been done in the past, can be decreased.

Further, the mechanical sound spectrum is dynamically estimated and removed with each imaging operation wherein mechanical sound is emitted, whereby even if there is variance in the mechanical sounds due to individual differences in the digital cameras 1, the desired reduction effect can be achieved. Also, the mechanical sound spectrum is constantly estimated during recording, so temporal changes to the mechanical sound during operation of the driving device 14 can also be followed.

Also, the estimated mechanical sound spectrum is corrected with the mechanical sound correcting unit 63 so as to match the actual mechanical sound spectrum, thereby eliminating overestimating and underestimating of the mechanical sound. Accordingly, the mechanical sound reducing unit 64 can be prevented from erasing too much, or not enough of, the mechanical sound, so sound quality deterioration of the desired sound can be reduced.

Also, depending on the sound environment (sound source environment) of the camera periphery, the mechanical sound selecting unit 66 differentiates the estimated mechanical sound spectrum Z that is dynamically estimated which a mechanical sound is emitted, and an average mechanical sound spectrum Tz that is obtained beforehand, before the mechanical sound is emitted. For example, in a sound source environment where there are multiple sound sources, such as a busy crowd, and the mechanical sound will be buried in the desired sound, the average mechanical sound spectrum Tz is used, whereby deterioration of the desired sound by overestimating the mechanical sound can be prevented. On the other hand, in a sound source environment where the mechanical sound is noticeable, the estimated mechanical sound spectrum Z is used, whereby the mechanical sound is estimated with high precision by individual device and by operation, and can be adequately reduced from the desired sound.

Details of the preferred embodiments of the present disclosure have been described with reference to the appended diagrams, but the present disclosure is not limited to these examples. It goes without saying that one with ordinary skill in the art will be capable of various modifications and alterations without departing from the scope and technical idea as laid forth in the appended claims, which are also encompassed by the technical scope of the present disclosure.

For example, in the above-described embodiment, the digital camera 1 is exemplified as an audio signal processing device, and description is given of an example to reduce the mechanical noise at the time of recording together with moving picture imaging, but the present disclosure is not limited to this. The audio signal processing device according to the present disclosure can be applied to various devices, as long as the device has a recording function. The audio signal processing device can be applied to various electronic devices, such as a recording/playing device (e.g., Blu-ray disc/DVD recorder), television receiver, system stereo device, imaging device (e.g., digital camera, digital video camera), portable terminal (e.g., portable music/movie player, portable gaming device, IC recorder), personal computer, gaming device, car navigation device, digital photo frame, household electronic device, automatic vending machine, ATM, kiosk terminal, and so forth, for example.

The present disclosure contains subject matter related to that disclosed in Japanese Priority Patent Application JP 2010-293305 filed in the Japan Patent Office on Dec. 28, 2010, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An audio signal processing device comprising:

a first microphone configured to pick up audio and output a first audio signal;

a second microphone configured to pick up said audio and output a second audio signal;

a first frequency converter configured to convert said first audio signal to a first audio spectrum signal;

a second frequency converter configured to convert said second audio signal to a second audio spectrum signal;

an operating sound estimating unit configured to estimate, based on the correlation between a sound emitting member that emits an operating sound and said first and second microphones, an operating sound spectrum signal indicating said operating sound, by calculating said first and second audio spectrum signals; and an operating sound reducing unit configured to reduce said estimated operating sound spectrum signal from said first and second audio spectrum signals, wherein said sound emitting member is a driving device, wherein said operating sound is a mechanical sound emitted at the time of operation of said driving device, wherein said operating sound estimating unit estimates a mechanical sound spectrum signal that indicates said mechanical sound as said operating sound spectrum signal, and wherein said operating sound estimating unit calculates said first and second audio spectrum signals so as to attenuate audio components arriving to said first and second microphones from a direction other than said driving device, thereby dynamically estimating said mechanical sound spectrum signal during operation of said driving device.

2. The audio signal processing device according to claim 1, further comprising:

a mechanical sound correcting unit configured to correct said estimated mechanical sound spectrum signal for each frequency component of said first or second audio spectrum signal, based on the difference in frequency features of said first or second audio spectrum signal before and after the start of operation of said driving device.

3. The audio signal processing device according to claim 2, wherein said mechanical sound correcting unit includes a first mechanical sound correcting unit configured to calculate a first correcting coefficient for each frequency component of said first audio spectrum signal, based on the difference in frequency features of said first audio spectrum signal before and after the start of operation of said driving device, and a second mechanical sound correcting unit configured to calculate a second correcting coefficient for each frequency component of said second audio spectrum signal, based on the difference in frequency features of said second audio spectrum signal before and after the start of operation of said driving device;

and wherein said operating sound reducing unit includes a first mechanical sound reducing unit configured to reduce a signal wherein said estimated mechanical sound spectrum signal is multiplied by said first correcting coefficient, from said first audio spectrum signal, and a second mechanical sound reducing unit configured to reduce a signal wherein said estimated mechanical sound spectrum signal is multiplied by said second correcting coefficient, from said second audio spectrum signal.

4. The audio signal processing device according to claim 2, wherein said mechanical sound correcting unit updates a correcting coefficient for correcting said estimated mechanical sound spectrum signals, based on the difference in frequency features of said first or second audio spectrum signal before and after the start of operation of said driving device, each time the driving device is operating.

5. The audio signal processing device according to claim 4, wherein, when said driving device is operating, degree of change in said audio before and after the start of operation of said driving device is determined, based on comparison results of the frequency features of said first or second audio spectrum signal before and after the start of operation of said driving device, and comparison results of the frequency features of said first or second audio spectrum signal during the operation of said driving device;

and wherein determination is made as to whether or not to update said correcting coefficient, according to the degree of change of said audio; and and wherein said correcting coefficient is updated based on said difference, only in a case of determining to update said correcting coefficient.

6. The audio signal processing device according to claim 4, wherein, when said driving device is operating, said mechanical sound correcting unit controls the update amount of said correcting coefficient based on said difference, according to the level of said first or second audio signal or the level of the audio spectrum signal.

7. The audio signal processing device according to claim 1, further comprising:

a storage unit configured to store the average mechanical sound spectrum signal that indicates an average-type of spectrum of said mechanical sound; and a mechanical sound selecting unit configured to select one or the other of said estimated mechanical sound spectrum signal or said average mechanical sound spectrum signal;

wherein said operating sound reducing unit reduces the mechanical sound spectrum signal selected by said mechanical sound selecting unit from said first and second audio spectrum signals.

8. The audio signal processing device according to claim 7, wherein said mechanical sound selecting unit calculates a feature amount indicating the sound source environment of the periphery of said audio signal processing device, based on said first or second audio signal level, and selects one or the other of said estimated mechanical sound spectrum signal or said average mechanical sound spectrum signal.

9. The audio signal processing device according to claim 7, wherein said mechanical sound selecting unit calculates a feature amount indicating the sound source environment of the periphery of said audio signal processing device, based on the correlation of said first audio spectrum signal and said second audio spectrum signal, and selects one or the other of said estimated mechanical sound spectrum signal or said average mechanical sound spectrum signal, based on said feature amount.

10. The audio signal processing device according to claim 7, wherein said mechanical sound selecting unit calculates a feature amount indicating the sound source environment of the periphery of said audio signal processing device, based on the level of said estimated mechanical sound spectrum signal, and selects one or the other of said estimated mechanical sound spectrum signal or said average mechanical sound spectrum signal, based on said feature amount.

11. The audio signal processing device according to claim 1, wherein said audio signal processing device is provided to an imaging device having a function to record said audio together with a moving picture during imaging of said moving picture; and wherein said driving device is a motor that is provided within a housing of said imaging device, and mechanically moves an imaging optical system of said imaging device.

12. An audio signal processing method comprising:

converting a first audio signal output from a first microphone configured to pick up audio into a first audio spectrum signal and converting a second audio signal output from a second microphone configured to pick up said audio into a second audio spectrum signal;

estimating an operating sound spectrum signal that indicates said operating sound, by calculating said first and second audio spectrum signals, based on the relative position of a sound emitting member that emits an operating sound and said first and second microphones; and reducing said estimated operating sound spectrum signal from said first and second audio spectrum signals, wherein said sound emitting member is a driving device, wherein said operating sound is a mechanical sound emitted at the time of operation of said driving device, wherein a mechanical sound spectrum signal that indicates said mechanical sound is estimated as said operating sound spectrum signal, and wherein said first and second audio spectrum signals are calculated so as to attenuate audio components arriving to said first and second microphones from a direction other than said driving device, thereby dynamically estimating said mechanical sound spectrum signal during operation of said driving device.

13. A non-transitory computer-readable medium having embodied thereon a program, which when executed by a computer causes the computer to execute a method, the method comprising:

converting of a first audio signal output from a first microphone configured to pick up audio into a first audio spectrum signal and converting a second audio signal output from a second microphone configured to pick up said audio into a second audio spectrum signal;

estimating of an operating sound spectrum signal that indicates said operating sound, by calculating said first and second audio spectrum signals, based on the relative position of a sound emitting member that emits an operating sound and said first and second microphones; and reducing of said estimated operating sound spectrum signal from said first and second audio spectrum signals, wherein said sound emitting member is a driving device, wherein said operating sound is a mechanical sound emitted at the time of operation of said driving device, wherein a mechanical sound spectrum signal that indicates said mechanical sound is estimated as said operating sound spectrum signal, and wherein said first and second audio spectrum signals are calculated so as to attenuate audio components arriving to said first and second microphones from a direction other than said driving device, thereby dynamically estimating said mechanical sound spectrum signal during operation of said driving device.

* * * * *